United States Patent
Ishii

(10) Patent No.: US 11,812,143 B2
(45) Date of Patent: Nov. 7, 2023

(54) IMAGING APPARATUS, ACCESSORY APPARATUS, AND METHODS FOR CONTROLLING SAME

(71) Applicant: CANON KABUSHIKI KAISHA, Tokyo (JP)

(72) Inventor: Kazunori Ishii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 31 days.

(21) Appl. No.: 17/472,435

(22) Filed: Sep. 10, 2021

(65) Prior Publication Data

US 2022/0086332 A1 Mar. 17, 2022

(30) Foreign Application Priority Data

Sep. 16, 2020 (JP) .................. 2020-155590

(51) Int. Cl.
*H04N 23/663* (2023.01)
*G02B 7/14* (2021.01)
*H04N 23/55* (2023.01)
*H04N 23/62* (2023.01)
*H04N 23/63* (2023.01)

(52) U.S. Cl.
CPC ............ *H04N 23/663* (2023.01); *G02B 7/14* (2013.01); *H04N 23/55* (2023.01); *H04N 23/62* (2023.01); *H04N 23/633* (2023.01)

(58) Field of Classification Search
CPC ...... H04N 23/663; H04N 23/55; H04N 23/62; H04N 23/633; H04N 23/667; H04N 23/75; H04N 23/81; G02B 7/14
See application file for complete search history.

(56) References Cited

U.S. PATENT DOCUMENTS

| | | | | |
|---|---|---|---|---|
| 2012/0162492 | A1* | 6/2012 | Akamatsu | G02B 7/285 348/E5.042 |
| 2017/0289414 | A1* | 10/2017 | Komatsu | H04N 23/69 |
| 2017/0289431 | A1* | 10/2017 | Wada | G03B 17/18 |
| 2018/0224720 | A1* | 8/2018 | Pan | H04N 23/60 |
| 2018/0348475 | A1* | 12/2018 | Sugiyama | G03B 7/20 |
| 2018/0352139 | A1* | 12/2018 | Sugita | H04N 23/663 |
| 2019/0037127 | A1* | 1/2019 | Kawada | H04N 23/60 |
| 2019/0285967 | A1* | 9/2019 | Himei | H04N 23/68 |
| 2020/0004112 | A1* | 1/2020 | Sugita | H04N 23/69 |
| 2020/0007740 | A1* | 1/2020 | Sugita | H04N 23/55 |
| 2020/0007744 | A1* | 1/2020 | Sugiyama | H04N 23/6812 |
| 2020/0041876 | A1* | 2/2020 | Sugiyama | H04N 23/663 |

(Continued)

FOREIGN PATENT DOCUMENTS

EP 3229461 A2 10/2017
EP 3633972 A1 4/2020

(Continued)

*Primary Examiner* — John R Schnurr
(74) *Attorney, Agent, or Firm* — Canon U.S.A., Inc. IP Division

(57) ABSTRACT

A camera microcomputer transmits identification information about an interchangeable lens by peer-to-peer (P2P) communication. The camera microcomputer then receives an optical parameter for correcting lens state information about the interchangeable lens by P2P communication. After the reception, the camera microcomputer receives optical table information for correcting the lens state information about the interchangeable lens by P2P burst communication.

17 Claims, 35 Drawing Sheets

(56) References Cited

U.S. PATENT DOCUMENTS

| | | | |
|---|---|---|---|
| 2020/0096839 A1* | 3/2020 | Shigeta | H04N 23/6812 |
| 2020/0096840 A1* | 3/2020 | Kawada | H04N 23/663 |
| 2020/0120259 A1* | 4/2020 | Sugiyama | H04N 23/65 |
| 2021/0168278 A1* | 6/2021 | Takanashi | H04N 23/672 |
| 2022/0082904 A1* | 3/2022 | Tada | G03B 17/14 |
| 2022/0086331 A1* | 3/2022 | Sugiyama | H04N 23/57 |
| 2022/0086341 A1* | 3/2022 | Yonezawa | H04N 23/673 |

FOREIGN PATENT DOCUMENTS

| | | | |
|---|---|---|---|
| JP | H07107205 A | 4/1995 | |
| JP | 2018017867 A | 2/2018 | |
| JP | 6427287 B1 | 11/2018 | |
| JP | 2018205705 A | 12/2018 | |
| JP | 2018205720 A | 12/2018 | |
| WO | 2019244972 A1 | 12/2019 | |

\* cited by examiner

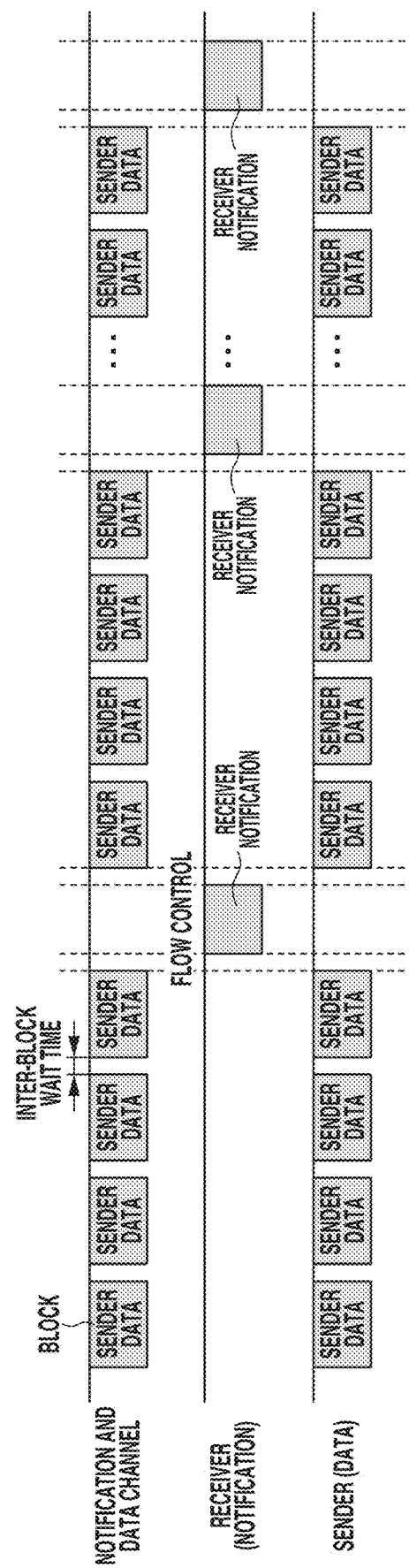

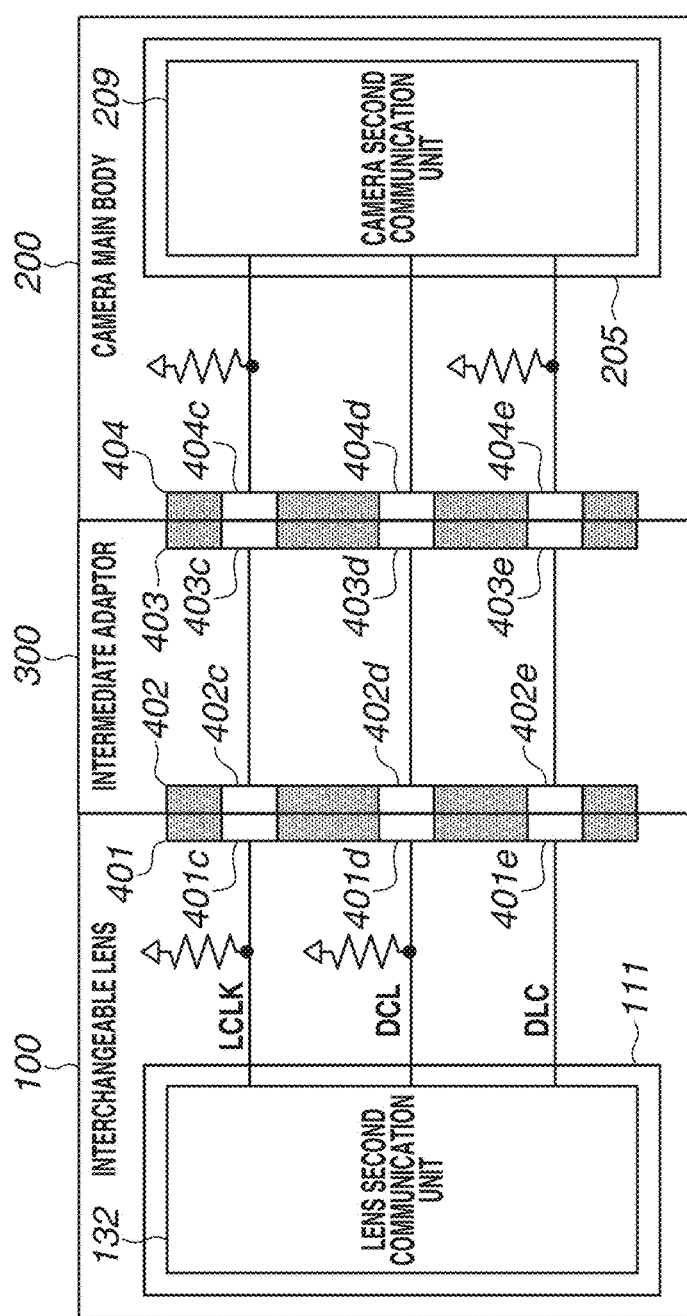
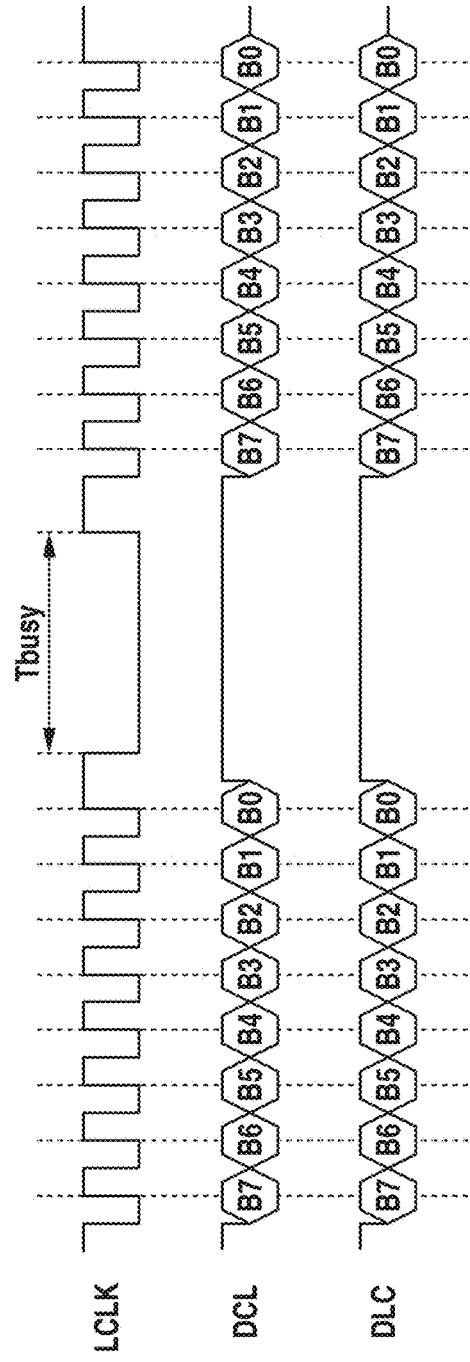
FIG.23A
FIG.23B

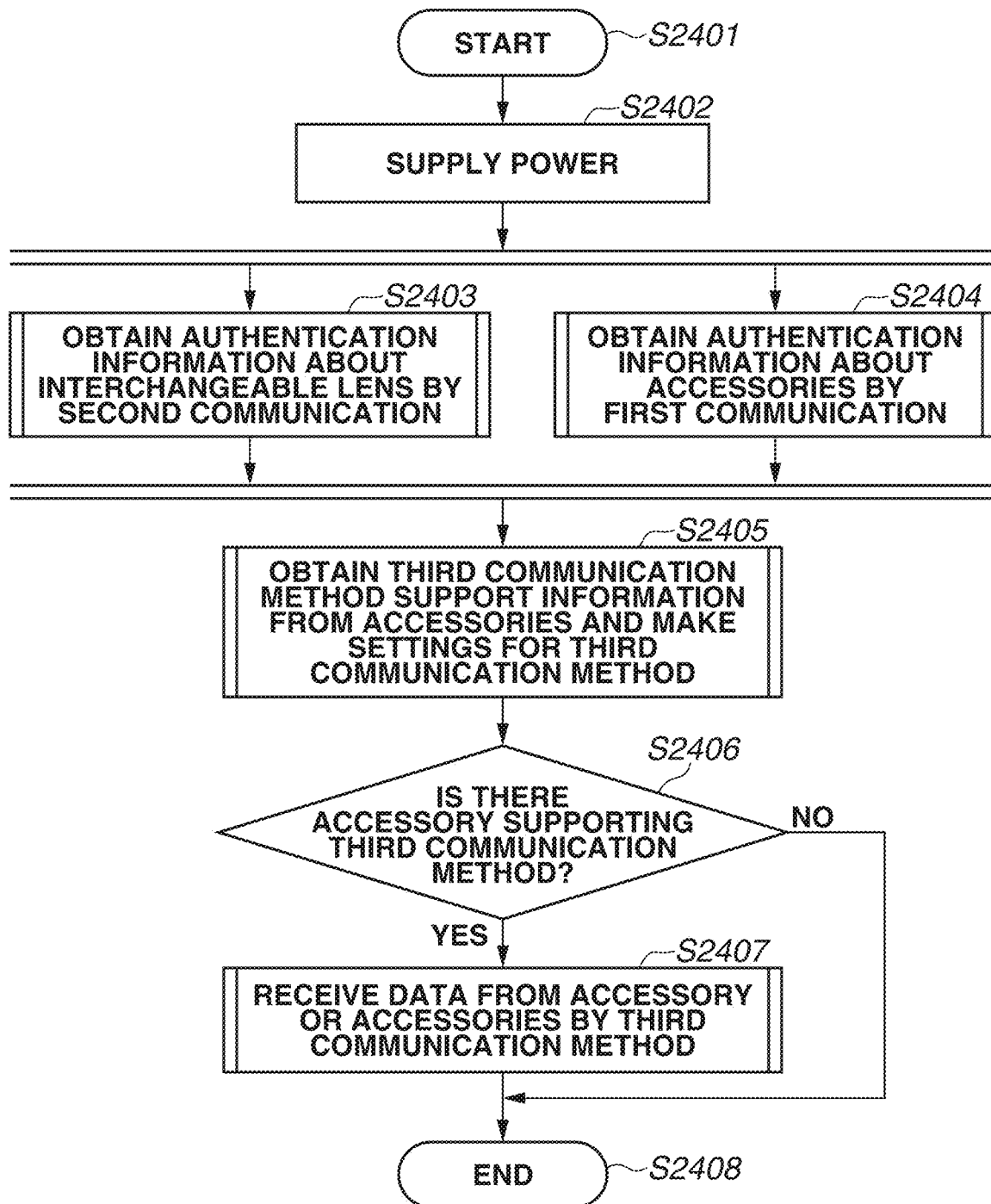

FIG.30A

|  | OPTICAL INFORMATION DATA LA | OPTICAL INFORMATION DATA LB | OPTICAL INFORMATION DATA LC |
|---|---|---|---|
| LENS SPECIFIC INFORMATION | LENS A | LENS B | LENS C |
| LENS STATE INFORMATION | OBJECT DISTANCE INFORMATION FA | OBJECT DISTANCE INFORMATION FB | OBJECT DISTANCE INFORMATION FC |
|  | SENSITIVITY INFORMATION SA | SENSITIVITY INFORMATION SB | SENSITIVITY INFORMATION SC |
|  | FOCAL LENGTH INFORMATION ZA | FOCAL LENGTH INFORMATION ZB | FOCAL LENGTH INFORMATION ZC |
|  | F-NUMBER INFORMATION IA | F-NUMBER INFORMATION IB | F-NUMBER INFORMATION IC |
| OPTICAL CORRECTION INFORMATION | OUT OF FOCUS CORRECTION INFORMATION PCA | OUT OF FOCUS CORRECTION INFORMATION PCB | OUT OF FOCUS CORRECTION INFORMATION PCC |
|  | MAGNIFICATION CHROMATIC ABERRATION CORRECTION INFORMATION ACA | MAGNIFICATION CHROMATIC ABERRATION CORRECTION INFORMATION ACB | MAGNIFICATION CHROMATIC ABERRATION CORRECTION INFORMATION ACC |
|  | MARGINAL ILLUMINATION CORRECTION INFORMATION SCA | MARGINAL ILLUMINATION CORRECTION INFORMATION SCB | MARGINAL ILLUMINATION CORRECTION INFORMATION SCC |
|  | DISTORTION CORRECTION INFORMATION DCA | DISTORTION CORRECTION INFORMATION DCB | DISTORTION CORRECTION INFORMATION DCC |

FIG.30B

| | |
|---|---|
| OPTICAL PARAMETERS | OPTICAL TABLE INFORMATION ADDRESSES |
|  | F-NUMBER CONVERSION CORRECTION VALUE |
|  | FOCUS DRIVING CONVERSION COEFFICIENT VALUE |
|  | FOCUS SPEED CONVERSION COEFFICIENT VALUE |

FIG. 31

| FOCUS POSITION | ZOOM POSITION | IRIS POSITION | OBJECT DISTANCE INFORMATION F | SENSITIVITY INFORMATION S | FOCAL LENGTH INFORMATION Z | F-NUMBER INFORMATION I | OUT OF FOCUS CORRECTION INFORMATION PC | MAGNIFICATION CHROMATIC ABERRATION CORRECTION INFORMATION AC | MARGINAL ILLUMINATION CORRECTION INFORMATION SC | DISTORTION CORRECTION INFORMATION DC |
|---|---|---|---|---|---|---|---|---|---|---|
| F1 | Z1 | 1 | F111 | S111 | Z111 | I111 | PC111 | AC111 | SC111 | DC111 |
|  |  | 2 | F112 | S112 | Z112 | I112 | PC112 | AC112 | SC112 | DC112 |
|  |  | ⋮ |  |  |  |  |  |  |  |  |
|  |  | N |  |  |  |  |  |  |  |  |
|  | Z2 | 1 |  |  |  |  |  |  |  |  |
|  |  | 2 |  |  |  |  |  |  |  |  |
|  |  | ⋮ |  |  |  |  |  |  |  |  |
|  |  | N |  |  |  |  |  |  |  |  |
|  | ⋮ | ⋮ |  |  |  |  |  |  |  |  |
|  | ZM | 1 |  |  |  |  |  |  |  |  |
|  |  | 2 |  |  |  |  |  |  |  |  |
|  |  | ⋮ |  |  |  |  |  |  |  |  |
|  |  | N |  |  |  |  |  |  |  |  |
| F2 | Z1 | 1 |  |  |  |  |  |  |  |  |
|  |  | 2 |  |  |  |  |  |  |  |  |
|  |  | ⋮ |  |  |  |  |  |  |  |  |
|  |  | N |  |  |  |  |  |  |  |  |
|  | Z2 | 1 |  |  |  |  |  |  |  |  |
|  |  | 2 |  |  |  |  |  |  |  |  |
|  |  | ⋮ |  |  |  |  |  |  |  |  |
|  |  | N |  |  |  |  |  |  |  |  |
|  | ⋮ | ⋮ |  |  |  |  |  |  |  |  |
|  | ZM | 1 |  |  |  |  |  |  |  |  |
|  |  | 2 |  |  |  |  |  |  |  |  |
|  |  | ⋮ |  |  |  |  |  |  |  |  |
|  |  | N |  |  |  |  |  |  |  |  |
| ⋮ | ⋮ | ⋮ |  |  |  |  |  |  |  |  |
| FL | Z1 | 1 |  |  |  |  |  |  |  |  |
|  |  | 2 |  |  |  |  |  |  |  |  |
|  |  | ⋮ |  |  |  |  |  |  |  |  |
|  |  | N |  |  |  |  |  |  |  |  |
|  | Z2 | 1 |  |  |  |  |  |  |  |  |
|  |  | 2 |  |  |  |  |  |  |  |  |
|  |  | ⋮ |  |  |  |  |  |  |  |  |
|  |  | N |  |  |  |  |  |  |  |  |
|  | ⋮ | ⋮ |  |  |  |  |  |  |  |  |
|  | ZM | 1 |  |  |  |  |  |  |  |  |
|  |  | 2 |  |  |  |  |  |  |  |  |
|  |  | ⋮ |  |  |  |  |  |  |  |  |
|  |  | N | FLMN | SLMN | ZLMN | ILMN | PCLMN | ACLMN | SCLMN | DCLMN |

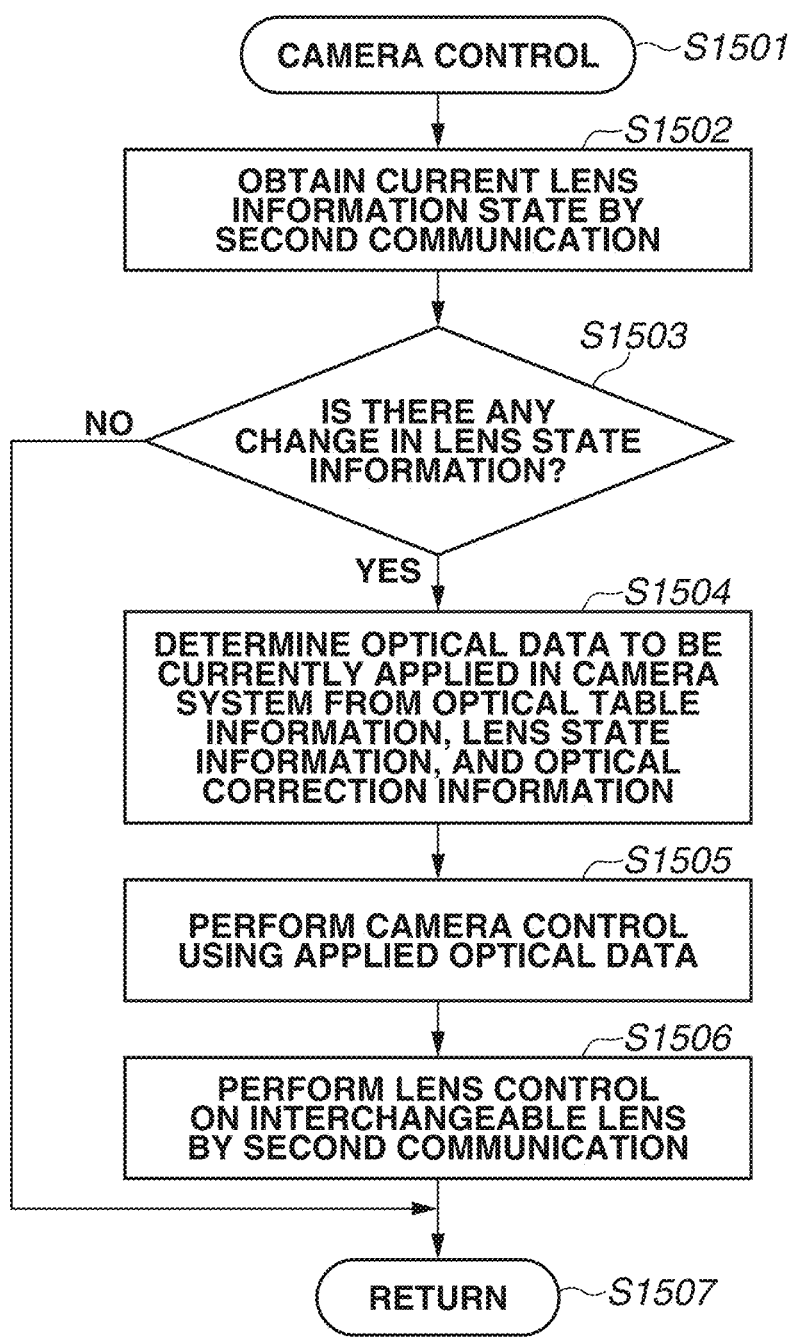

IMAGING APPARATUS, ACCESSORY APPARATUS, AND METHODS FOR CONTROLLING SAME

BACKGROUND OF THE INVENTION

Field of the Invention

The present invention relates to a camera main body and an accessory apparatus, such as an intermediate adaptor and an interchangeable lens, that communicate with each other, and methods for controlling the same.

Description of the Related Art

Techniques for performing communication between a camera main body and an accessory apparatus attached to the camera main body have been known.

Japanese Patent Application Laid-Open No. 2018-205705 discusses a technique where a camera main body communicates with an interchangeable lens mounted on the camera main body and an intermediate adaptor attached between the interchangeable lens and the camera main body via contacts disposed on a mount unit.

The amount of data to be communicated has been on the increase, due partly to advancement of imaging control and increase in frame rate, and communication control taking into account the case of communicating a large amount of data has been demanded.

SUMMARY OF THE INVENTION

The present invention is directed to providing an imaging apparatus and an accessory apparatus capable of communicating a great amount of data in a short time, and methods for controlling the same.

According to an aspect of the present invention, an imaging apparatus between an interchangeable lens and the imaging apparatus is detachably attached an accessory apparatus including an optical member. The imaging apparatus includes a control unit configured to communicate with the accessory apparatus by first communication via a first signal line and a second signal line, the first signal line being configured to communicate data via a first terminal, the second signal line being configured to communicate, via a second terminal, a signal for performing flow control on communication via the first terminal. The control unit is configured to perform the first communication in a first communication mode where the signal for performing the flow control is received via the second signal line if one frame of data is received, or a second communication mode where the signal for performing the flow control is transmitted via the second signal line each time a predetermined number of blocks of data is received. The control unit is configured to transmit identification information about the interchangeable lens in the first communication mode, receive an optical parameter for correcting lens state information about the interchangeable lens in the first communication mode, the optical parameter corresponding to the identification information about the interchangeable lens, and receive optical table information for correcting the lens state information about the interchangeable lens in the second communication mode after reception of the optical parameter.

According to another aspect of the present invention, an accessory apparatus detachably attached between an imaging apparatus and an interchangeable lens includes an optical member, and a control unit configured to communicate with the imaging apparatus via a first signal line and a second signal line, the first signal line being configured to communicate data via a first terminal, the second signal line being configured to communicate, via a second terminal, a signal for performing flow control on communication via the first terminal. The control unit is configured to perform first communication in a first communication mode where the signal for performing the flow control is transmitted via the second signal line if one frame of data is transmitted, or a second communication mode where the signal for performing the flow control is received via the second signal line each time a predetermined number of blocks of data is transmitted. The control unit is configured to receive identification information about the interchangeable lens in the first communication mode, transmit an optical parameter for correcting lens state information about the interchangeable lens in the first communication mode based on the identification information about the interchangeable lens, and transmit optical table information for correcting the lens state information about the interchangeable lens in the second communication mode after transmission of the optical parameter.

Further features of the present invention will become apparent from the following description of exemplary embodiments with reference to the attached drawings.

BRIEF DESCRIPTION OF THE DRAWINGS

FIG. 22 is a diagram illustrating communication waveforms in a communication method using a notification and data channel.

FIG. 23A is a conceptual diagram of second communication. FIG. 23B is a diagram illustrating communication waveforms thereof.

FIG. 24 is a flowchart illustrating a procedure from initial communication processing with accessory apparatuses to data reception from the accessory apparatuses using a third communication method.

FIGS. 30A and 30B are charts for describing structures of a plurality of pieces of optical information data.

FIG. 31 is a chart for describing a data structure of optical table information.

FIG. 32 is a flowchart illustrating processing by an imaging system according to a fifth exemplary embodiment.

DESCRIPTION OF THE EMBODIMENTS

Figure 1:
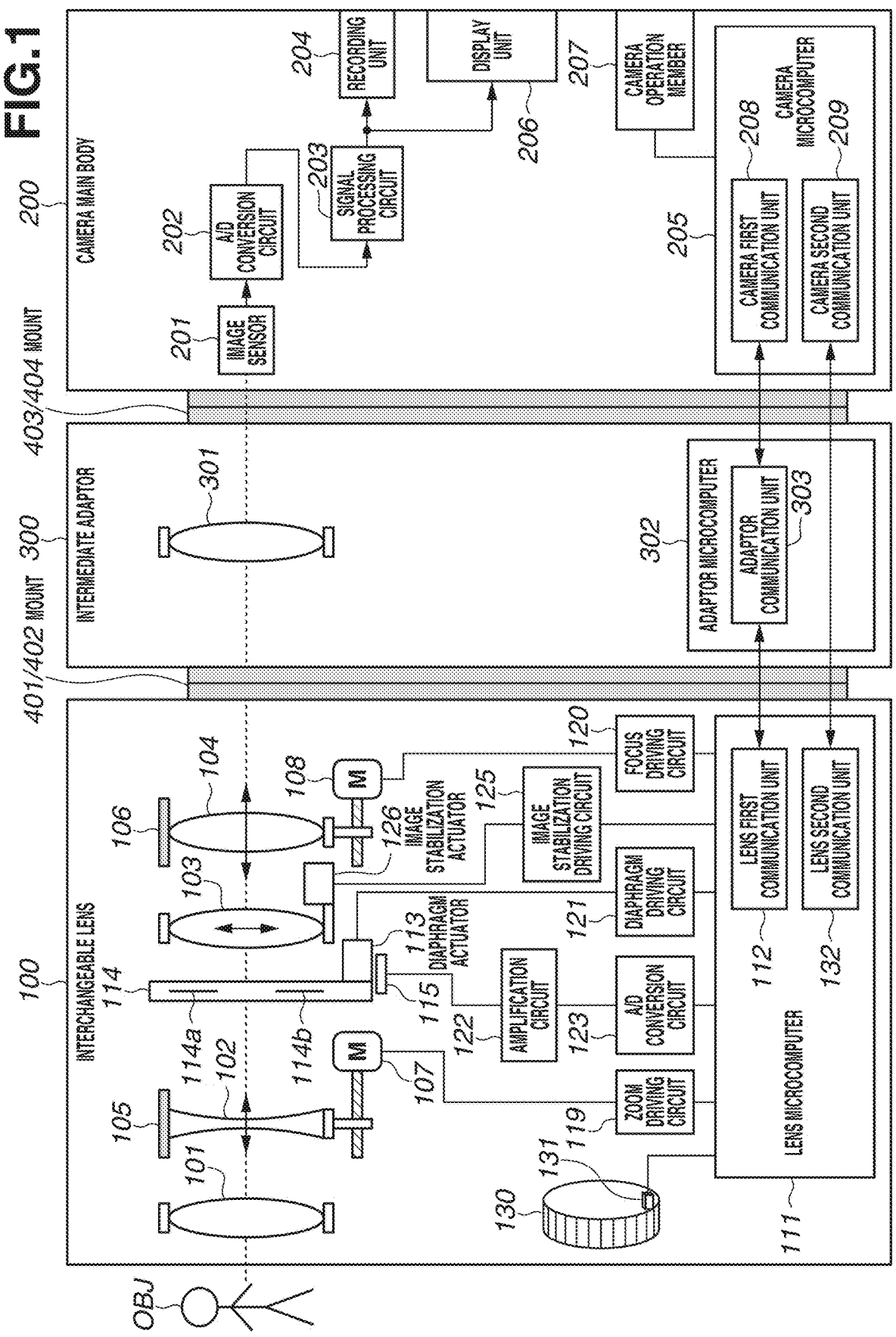
FIG. 1 is a block diagram illustrating a configuration of a camera system including an imaging apparatus and accessory apparatuses according to an exemplary embodiment of the present invention.

A first exemplary embodiment of the present invention will be described in detail below with reference to the drawings. In the drawings, similar members are designated by the same reference numerals, and redundant description will be omitted as much as possible. In the present exemplary embodiment, accessory apparatuses and an imaging apparatus communicate with each other based on a plurality of communication methods. As employed herein, the "communication methods" shall include a broadcast communication method (first communication method), a peer-to-peer (P2P) communication method (second communication method), and a P2P burst communication method (third communication method).

<Configuration of Camera System>

FIG. 1 is a block diagram illustrating a configuration of a camera system including an imaging apparatus (hereinafter, referred to as a camera main body) 200 according to the present invention, and an intermediate adaptor 300 and an interchangeable lens 100 serving as accessory apparatuses attachable to the camera main body 200. The camera main body 200, the interchangeable lens 100, and the intermediate adaptor 300 communicate control commands and internal information therebetween by using their respective communication units. The communication units support a plurality of communication methods each, and can select optimum communication modes for various situations by switching to the same communication method in a mutually synchronous manner depending on the type of data to be communicated and the purpose of communication. FIG. 1 illustrates a configuration where the intermediate adaptor 300 is attached to the camera main body 200 as an example. However, the present invention is not limited thereto. The interchangeable lens 100 may be directly mounted on the camera main body 200. A plurality of intermediate adaptors may be attached if physically attachable.

The interchangeable lens 100 and the intermediate adaptor 300 are mechanically and electrically connected via a coupling mechanism including a mount 400 of the interchangeable lens 100 and a mount 401 of the intermediate adaptor 300. Similarly, the intermediate adaptor 300 and the camera main body 200 are mechanically and electrically connected via a coupling mechanism including a mount 402 of the intermediate adaptor 300 and a mount 403 of the camera main body 200.

The interchangeable lens 100 is powered by the camera main body 200 via a power terminal portion (not illustrated) disposed on the mount 400, and supplies operating power to various actuators and microcomputers of various devices described below. The intermediate adaptor 300 is powered by the camera main body 200 via a power terminal portion (not illustrated) on the mount 402, and supplies operating power to various actuators and microcomputers of various devices described below.

The interchangeable lens 100, the camera main body 200, and the intermediate adaptor 300 communicate with each other via communication terminal portions (illustrated in FIG. 2) disposed on the mounts 400, 401, 402, and 403.

The interchangeable lens 100 includes an imaging optical system. The imaging optical system includes, in order from an object OBJ side, a field lens 101, a zoom lens (magnification lens) 102 for magnification, a diaphragm unit 114 for adjusting a light amount, an image stabilization lens 103, and a focus lens 104 for focus adjustment.

The zoom lens 102 and the focus lens 104 are held by lens holding frames 105 and 106, respectively. The lens holding frames 105 and 106 are guided by a not-illustrated guide shaft to be movable in an optical axis direction (illustrated by a broken line in the diagram). The lens holding frames 105 and 106 are driven in the optical axis direction by stepping motors 107 and 108. The stepping motors 107 and 108 move the zoom lens 102 and the focus lens 104, respectively, in synchronization with driving pulses.

The image stabilization lens 103 reduces image blurs due to camera shakes, by shifting in directions orthogonal to the optical axis of the imaging optical system.

A lens microcomputer 111 is a lens control unit (accessory control unit) that controls operation of various units in the interchangeable lens 100. The lens microcomputer 111 receives control commands and transmission request commands transmitted from a camera microcomputer 205 via a lens first communication unit 112 serving as an interchangeable lens-dedicated communication unit, or a lens second communication unit 132 serving as an accessory communication unit. The lens microcomputer 111 performs lens control corresponding to the communication commands, and transmits lens data corresponding to the transmission request commands to the camera microcomputer 205 via the lens first communication unit 112. The lens first communication unit 112 and the lens second communication unit 132 may be configured, for example, so that the lens second communication unit 132 is used for communication related to operation of members specific to the interchangeable lens 100, such as the focus lens 104 and the diaphragm unit 114. The lens first communication unit 112 may be used for communication related to controls common with the intermediate adaptor 300, such as the acquisition of the operating amount of a lens barrel operation member.

The lens microcomputer 111 outputs driving signals to a zoom driving circuit 119 and a focus driving circuit 120 to drive the stepping motors 107 and 108 in response to commands related to magnification and focusing among the control commands. Zoom processing for controlling a magnification operation by using the zoom lens 102 and autofocus (AF) processing for controlling a focus adjustment operation by using the focus lens 104 are thereby performed.

The diaphragm unit 114 includes diaphragm blades 114a and 114b. The state of the diaphragm blades 114a and 114b is detected by a Hall element 115 and input to the lens microcomputer 111 via an amplification circuit 122 and an analog-to-digital (A/D) conversion circuit 123. The lens microcomputer 111 outputs a driving signal to a diaphragm driving circuit 121 to drive a diaphragm actuator 113 based on the input signal from the A/D conversion circuit 123. A light amount adjustment operation by the diaphragm unit 114 is thereby controlled.

The lens microcomputer 111 further drives an image stabilization actuator (such as a voice coil motor) 126 via an image stabilization driving circuit 125 based on camera shakes detected by a vibration sensor (not illustrated), such as a vibration gyroscope, included in the interchangeable lens 100. Image stabilization processing for controlling a shift operation (image stabilization operation) of the image stabilization lens 103 is thereby performed.

The interchangeable lens 100 also includes an operation ring 130 and an operation ring detection unit 131. An example of the operation ring detection unit 131 is a pair of photointerrupters that outputs two-phase signals based on a relative movement of the operation ring 130. The lens microcomputer 111 can detect the operation of the operation ring 130. The lens microcomputer 111 can notify the camera microcomputer 205 of the operation amount of the operation ring 130 via the lens first communication unit 112.

The intermediate adaptor 300 is, for example, an extender for changing a focal length. The intermediate adaptor 300 includes a magnification lens 301 and an adaptor microcomputer 302. The adaptor microcomputer 302 is an intermediate adaptor control unit for controlling operation of various units in the intermediate adaptor 300. The adaptor microcomputer 302 receives control commands and transmission request commands transmitted from the camera microcomputer 205 via an adaptor communication unit 303 serving as an accessory communication unit. The adaptor microcomputer 302 performs intermediate adaptor control corresponding to the control commands, and transmits intermediate adaptor data corresponding to the transmission request commands to the camera microcomputer 205 via the adaptor communication unit 303.

The camera main body 200 includes an image sensor 201, such as a charge-coupled device (CCD) sensor and a complementary metal-oxide-semiconductor (CMOS) sensor, an A/D conversion circuit 202, a signal processing circuit 203, a recording unit 204, the camera microcomputer 205, and a display unit 206.

The image sensor 201 photoelectrically converts an object image formed by the imaging optical system in the interchangeable lens 100 and outputs an electrical signal (analog signal). The A/D conversion circuit 202 converts the analog signal from the image sensor 201 into a digital signal. The signal processing circuit 203 performs various types of image processing on the digital signal from the A/D conversion circuit 202 to generate a video signal. The signal processing circuit 203 also generates focus information indicating a contrast state of the object image (focus state of the imaging optical system) and luminance information indicating an exposure state from the video signal. The signal processing circuit 203 outputs the video signal to the display unit 206. The display unit 206 displays the video signal as a live view image to be used in checking composition and the focus state.

The camera microcomputer 205 serving as a camera control unit controls the camera main body 200 based on input from camera operation members, such as a not-illustrated imaging instruction switch and various setting switches. The camera microcomputer 205 also transmits a control command related to the magnification operation of the zoom lens 102 to the lens microcomputer 111 via a camera first communication unit 208 or a camera second communication unit 209. For example, the camera microcomputer 205 transmits the control signal based on an operation on a not-illustrated zoom switch. The camera microcomputer 205 also transmits a control command related to the light amount adjustment operation of the diaphragm unit 114 based on the luminance information to the lens microcomputer 111 via the camera first communication unit 208 or the camera second communication unit 209. The camera microcomputer 205 also transmits a control command related to the focus adjustment operation of the focus lens 104 based on the focus information to the lens microcomputer 111 via the camera first communication unit 208 or the camera second communication unit 209. The camera microcomputer 205 also transmits transmission request commands for obtaining control information and state information about the interchangeable lens 100 to the lens microcomputer 111, and transmits transmission request commands for obtaining control information and state information about the intermediate adaptor 300 to the adaptor microcomputer 302.

<First Communication (FIG. 2)>

Figure 2:
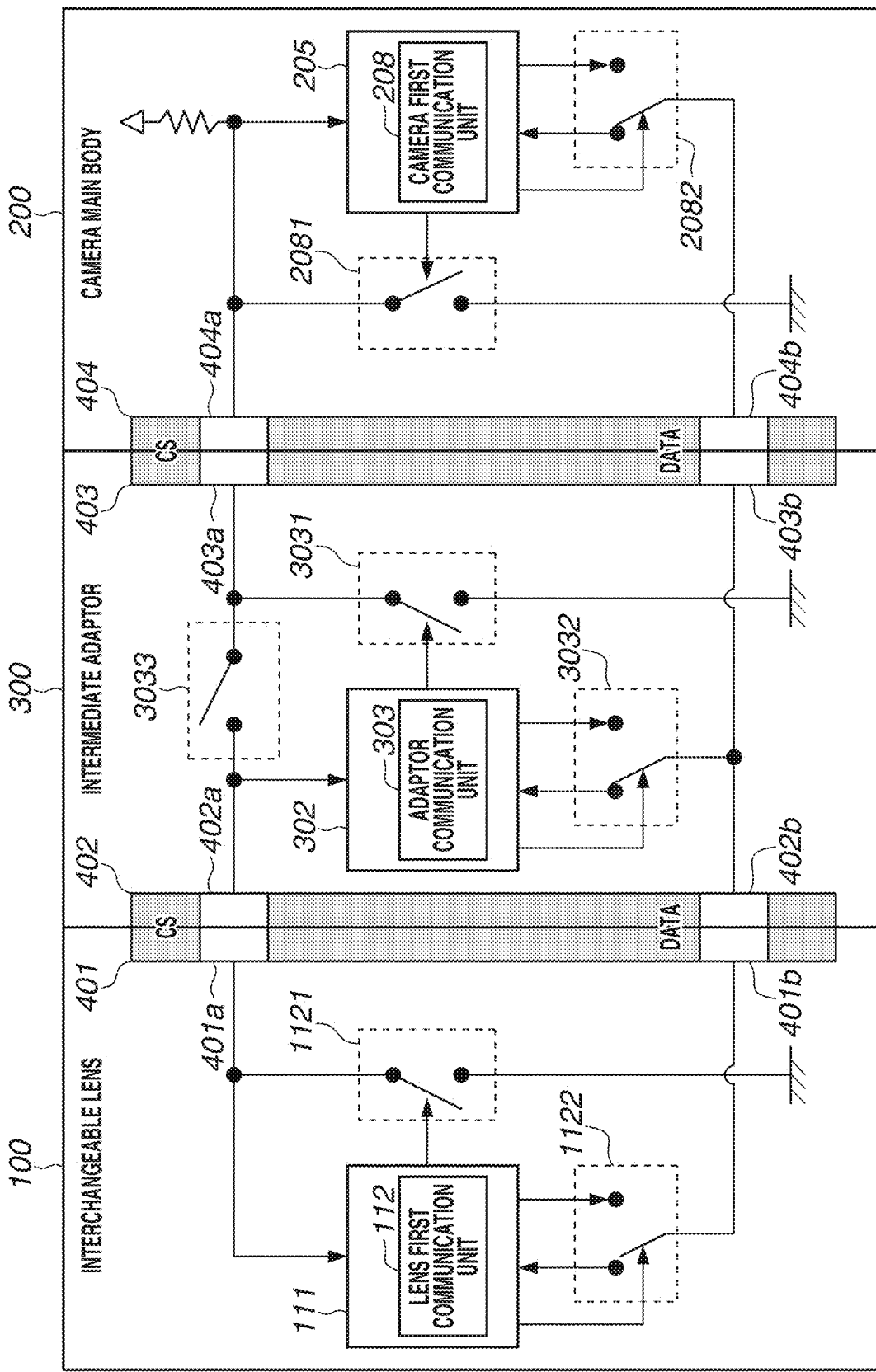
FIG. 2 is a schematic diagram illustrating a communication circuit in the camera system according to the exemplary embodiment.

A communication circuit constituted in the camera system including the camera first communication unit 208 of the camera main body 200, the lens first communication unit 112 of the interchangeable lens 100, and the adaptor communication unit 303 of the intermediate adaptor 300 will be described below with reference to FIG. 2. FIG. 2 is a schematic diagram illustrating the communication circuit in the camera system according to the present exemplary embodiment.

The camera microcomputer 205, the lens microcomputer 111, and the adaptor microcomputer 302 communicate using signal lines connected via communication terminal portions disposed on the mounts 400, 401, 402, and 403. The signal lines include two signal lines CS and DATA. The signal line CS transfers a signal for performing communication flow control and is used to make a notification of communication timing. The signal line DATA transfers data to be transmitted and received and is used for data communication. Communication using the signal lines CS and DATA will be referred to as first communication.

Communication using the signal line CS (second signal line) is performed via CS terminals 401a, 402a, 403a, and 404a. Communication using the signal line DATA is performed by using DATA terminals 401b, 402b, 403b, and 404b.

The signal line CS is connected to the camera microcomputer 205, the lens microcomputer 111, and the adaptor microcomputer 302. These microcomputers can detect the signal level (voltage level) of the signal line CS.

The signal line CS is connected to the power supply in the camera main body 200 in a pull-up manner, and connected to a ground (GND) via a GND switch 1121 of the interchangeable lens 100, a GND switch 2081 of the camera main body 200, and a GND switch 3031 of the intermediate adaptor 300. In other words, the signal line CS is in an open-drain connection. With such a configuration, the lens microcomputer 111, the camera microcomputer 205, and the adaptor microcomputer 302 can each set the signal level of the signal line CS to a low level (Low) by turning on (connecting) the respective GND switches. The signal level of the signal line CS can be set to a high level (Hi) by all the lens microcomputer 111, the camera microcomputer 205, and the adaptor microcomputer 302 turning off (disconnecting) the respective GND switches. Details of the content and operation procedures of the control signal to be transferred using the signal line CS during communication will be described below.

A CS switch 3033 is a switch for performing authentication communication described below. The CS switch 3033 is short-circuited in a steady state.

The signal line DATA (first signal line) is a single bidirectional data transmission line that can be used while switching the direction of data propagation. The signal line DATA can be connected to the lens microcomputer 111 via an input/output selection switch 1122 of the interchangeable lens 100. The signal line DATA can be connected to the camera microcomputer 205 via an input/output selection switch 2082 of the camera main body 200. The signal line DATA can be connected to the adaptor microcomputer 302 via an input/output selection switch 3032 of the intermediate adaptor 300. Each microcomputer includes a data output unit (CMOS system) for transmitting data and a data input unit (CMOS system) for receiving data. Each microcomputer can select whether to connect the signal line DATA to the data output unit or the data input unit by operating the input/output selection switch. With such a configuration, the lens microcomputer 111, the camera microcomputer 205, and the adaptor microcomputer 302 can transmit data by operating their input/output selection switch to connect the signal line DATA to the data output unit. In contrast, the lens microcomputer 111, the camera microcomputer 205, and the adaptor microcomputer 302 can receive data by operating their input/output selection switch to connect the signal line DATA to the data input unit. Details of the input/output switching procedure for the signal line DATA during communication will be described below.

While an example of the communication circuit according to the present exemplary embodiment has been described with reference to FIG. 2, the present invention is not limited thereto. For example, the signal line CS may be connected to the GND in the camera main body 200 in a pull-down manner, and may be connected to a not-illustrated power supply via the GND switches 1121, 2081, and 3031. The signal line DATA may be constantly connected to the data input units of the microcomputers, and the signal line DATA and the data output units may be configured to be connectable and disconnectable by switch operations.

<Description of Communication Data Format (Broadcast Communication and P2P Communication)>

Figure 3:
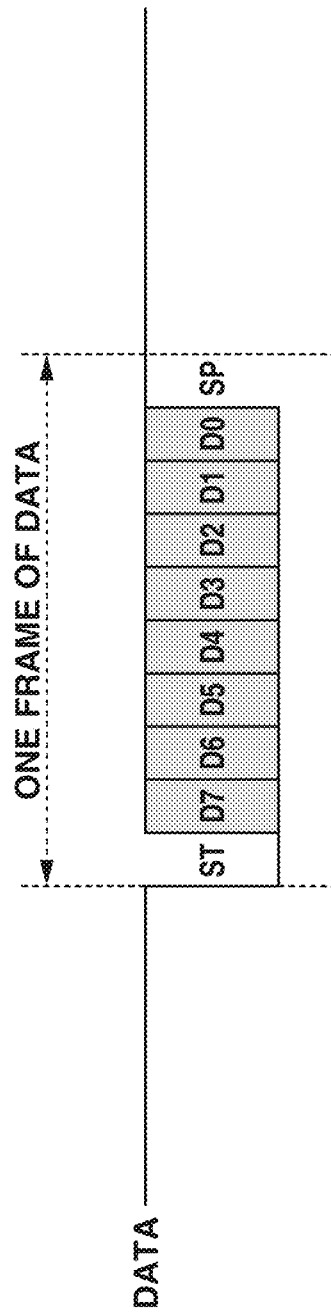
FIG. 3 is a diagram illustrating the format of data to be transmitted and received in the exemplary embodiment.

The format of data to be exchanged between the camera microcomputer 205, the lens microcomputer 111, and the adaptor microcomputer 302 will be described with reference to FIG. 3. FIG. 3 is a diagram illustrating the format of data to be transmitted and received using the signal line DATA in the present exemplary embodiment. This format (communication data format) is common between broadcast communication and P2P communication to be described below.

The communication data format is based on asynchronous communication, where communication speed for mutual communication is defined in advance and data is transmitted and received at a communication bitrate according to the definition. The signal level is maintained at Hi in a non-transmission state where no data transmission is being performed. To notify the data receiver of a start of data transmission, the signal level is set to Low only in the first bit period (start bit ST). One byte of data is transmitted in the following second to ninth, eight bit periods. The data bits are arranged in a most significant bit (MSB) first format, starting with MSB data D7, successively followed by data D6, data D5, . . . , with least significant bit data D0 at the end. To indicate the end of the transmission data, the signal level is set to Hi for one bit period (stop bit SP), whereby the transmission period of one frame of data starting with the start bit ST ends. While an example of the communication data format according to the present exemplary embodiment has been described with reference to FIG. 3, the present invention is not limited thereto. For example, the data bits may be arranged in a least significant bit (LSB) first format or in nine bits. Parity PA information may be added between the LSB data D0 and the stop bit SP. Communication data formats may be switched between broadcast communication and P2P communication to be described below.

<Broadcast Communication (First Communication Method)>

Figure 4:
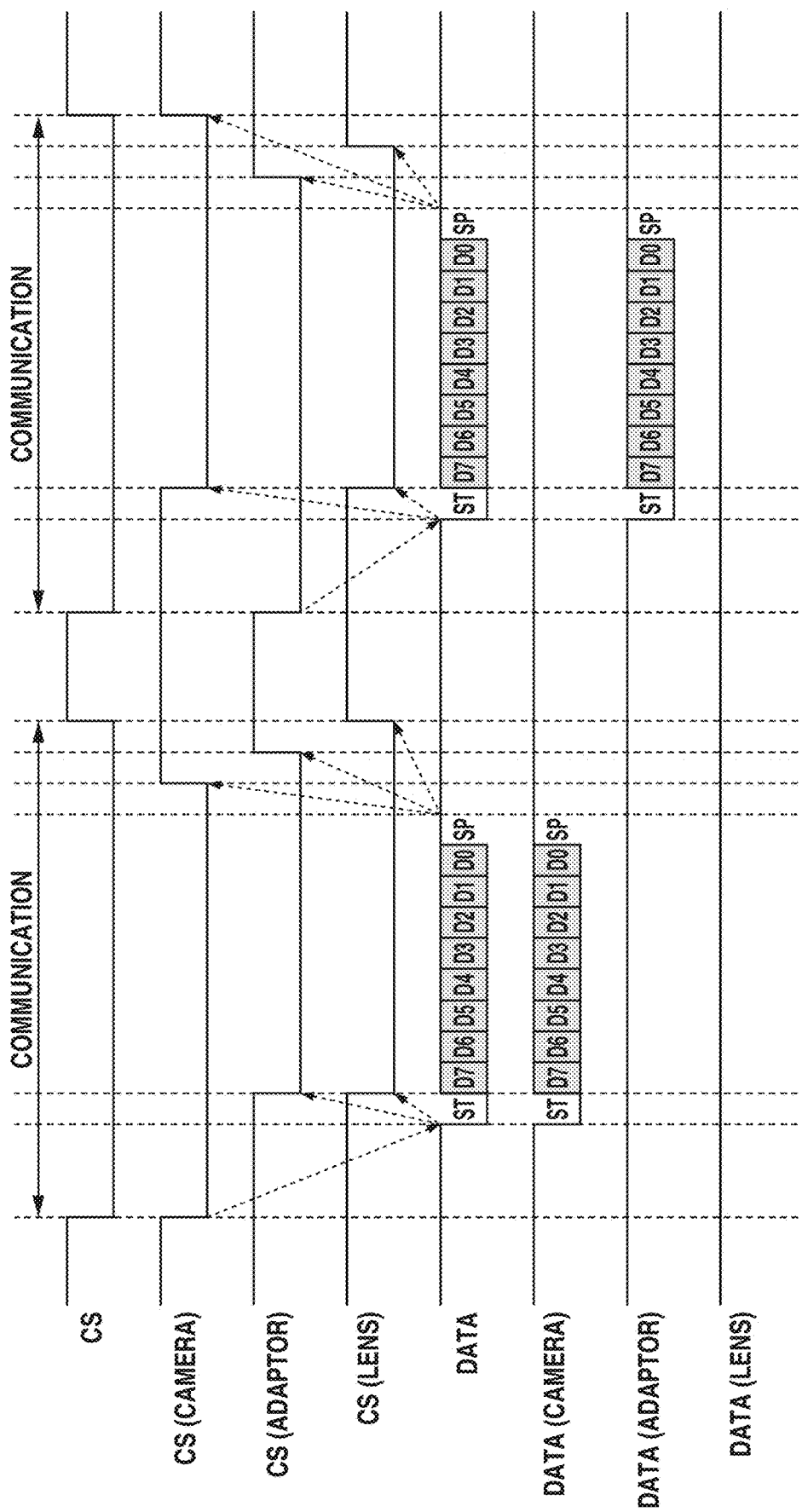
FIG. 4 is a diagram illustrating communication waveforms in broadcast communication.

An example of broadcast communication (first communication method) performed between the camera microcomputer 205, the lens microcomputer 111, and the adaptor microcomputer 302 will be described with reference to FIG. 4. FIG. 4 is a diagram illustrating communication waveforms in broadcast communication. Broadcast communication refers to a one-to-many simultaneous distribution mode where one of the camera microcomputer 205, the lens microcomputer 111, and the adaptor microcomputer 302 simultaneously transmits data to the other microcomputers. FIG. 4 illustrates a case where the camera microcomputer 205 performs broadcast communication with the lens microcomputer 111 and the adaptor microcomputer 302, and then the adaptor microcomputer 302 performs broadcast communication with the camera microcomputer 205 and the lens microcomputer 111 in response.

Initially, the camera microcomputer 205 serving as a communication master starts to output Low to the signal line CS to notify the lens microcomputer 111 and the adaptor microcomputer 302 that are communication slaves of a start of broadcast communication. Next, the camera microcomputer 205 outputs data to be transmitted to the signal line DATA. Meanwhile, the lens microcomputer 111 and the adaptor microcomputer 302 start to output Low to the signal line CS at timing when the start bit ST input from the signal line DATA is detected. The signal level of the signal line CS does not change at this point in time since the camera microcomputer 205 has already started outputting Low to the signal line CS.

The camera microcomputer 205 finishes outputting the data up to the stop bit SP, and then ends outputting Low from the signal line CS. The lens microcomputer 111 and the adaptor microcomputer 302 receive the data input to the signal line DATA up to the stop bit SP, and then analyze the received data and perform internal processing linked with the received data. The lens microcomputer 111 and the adaptor microcomputer 302 then make preparations to receive next data, and then end outputting Low to the signal line CS. As described above, the signal level of the signal line CS becomes Hi if all the camera microcomputer 205, the lens microcomputer 111, and the adaptor microcomputer 302 end outputting Low to the signal line CS. The signal level of the signal line CS being Hi can thus be checked to determine that all the microcomputers have finished processing related to the current communication and are ready for the next communication.

The adaptor microcomputer 302 checks that the signal level of the signal line CS has returned to Hi, and starts to output Low to the signal line CS to notify the camera microcomputer 205 and the lens microcomputer 111 of a start of broadcast communication. Next, the adaptor microcomputer 302 outputs data to be transmitted to the signal line DATA. Meanwhile, the camera microcomputer 205 and the lens microcomputer 111 start to output Low to the signal line CS at timing when the start bit ST input from the signal line DATA is detected. The signal level of the signal line CS does not change at this point in time since the adaptor microcomputer 302 has already started outputting Low to the signal line CS.

The adaptor microcomputer 302 finishes outputting the data up to the stop bit SP, and then stops outputting Low to the signal line CS. The camera microcomputer 205 and the lens microcomputer 111 receive the data input from the signal line DATA up to the stop bit SP, and then analyzes the received data and perform internal processing linked with the received data. The camera microcomputer 205 and the lens microcomputer 111 then makes preparations to receive next data, and stop outputting Low to the signal line CS.

As described above, the signal transferred by using the signal line CS during broadcast communication acts as a control signal indicating a start of broadcast communication and that communication processing is in process.

While an example of the communication waveforms in broadcast communication has been described with reference to FIG. 4, the present invention is not limited thereto. For example, while the data to be transmitted by a single broadcast communication is described to be one byte, two or three bytes of data may be transmitted. The broadcast communication may be unidirectional communication from the camera microcomputer 205, or communication master, to the lens microcomputer 111 and the adaptor microcomputer 302, or communication slaves.

<P2P Communication (Second Communication Method)>

Figure 5:
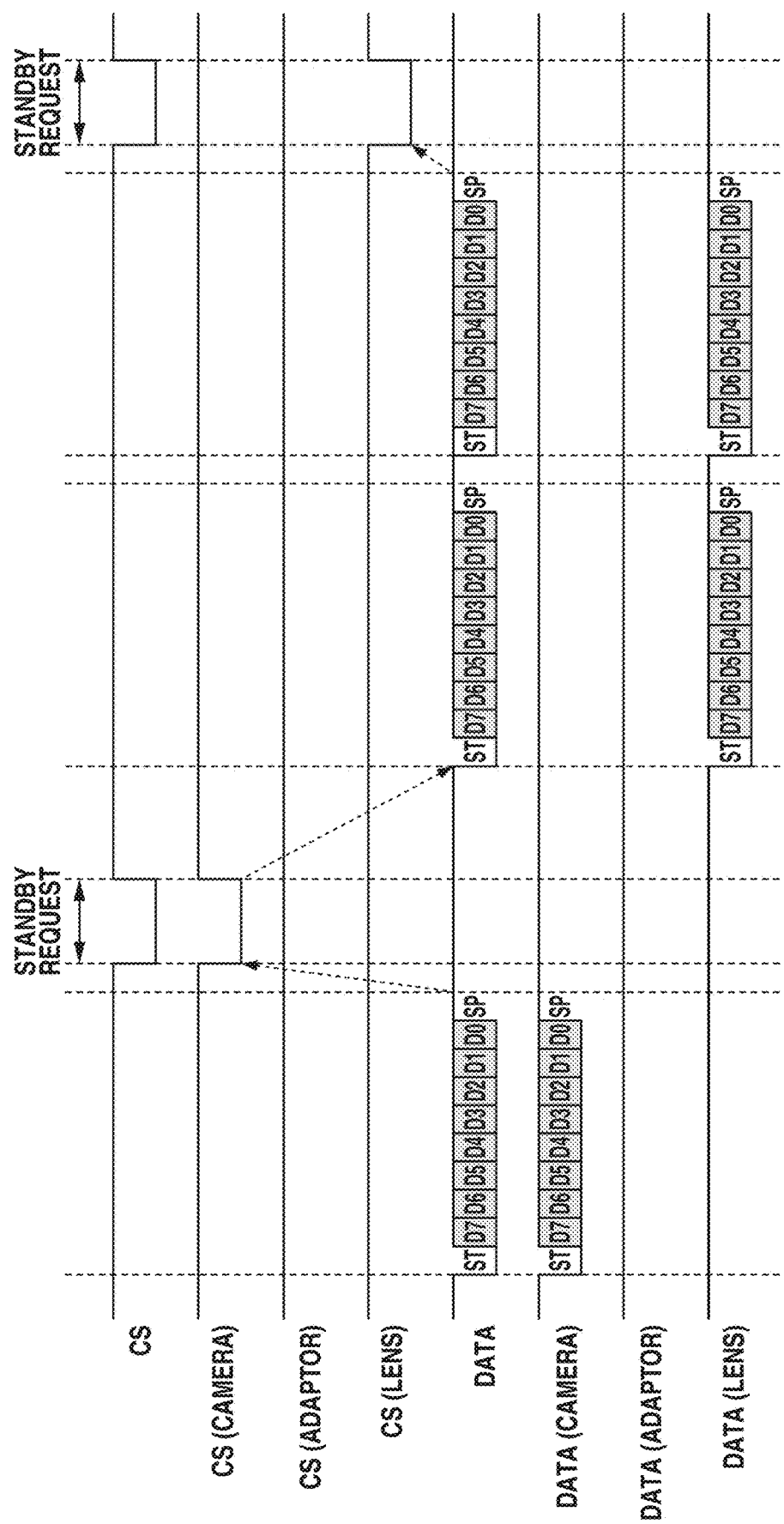
FIG. 5 is a diagram illustrating communication waveforms in peer-to-peer (P2P) communication.

An example of P2P communication (second communication method) performed between the camera microcomputer 205, the lens microcomputer 111, and the adaptor microcomputer 302 will be described with reference to FIG. 5. FIG. 5 is a diagram illustrating communication waveforms in P2P communication. P2P communication refers to a one-to-one individual communication mode where the camera microcomputer 205 transmits and receives data to/from either one of the lens and adaptor microcomputers 111 and 302 that is specified by the camera microcomputer 205. FIG. 5 illustrates a case where the lens microcomputer 111 is specified as a communication partner by the camera microcomputer 205, and the lens microcomputer 111 transmits two bytes of data to the camera microcomputer 205 in response to one-byte data transmission from the camera microcomputer 205. Procedures for specifying and switching communication partners will be described below.

Initially, the camera microcomputer 205 that is the communication master outputs data to be transmitted to the signal line DATA. The camera microcomputer 205 finishes outputting the data up to the stop bit SP, and then starts to output Low to the signal line CS. The camera microcomputer 205 subsequently makes preparations to receive next data, and then stops outputting Low to the signal line CS.

The lens microcomputer 111 detects the Low signal input from the signal line CS, and then analyzes the received data input from the signal line DATA and performs internal processing linked with the received data. The lens microcomputer 111 checks that the signal level of the signal line CS has returned to Hi, and then outputs two bytes of data to be transmitted to the signal line DATA in succession. The lens microcomputer 111 finishes outputting the data up to the stop bit SP of the second byte, and then starts to output Low to the signal line CS. The lens microcomputer 111 subsequently makes preparations to receive next data, and then stops outputting Low to the signal line CS.

Meanwhile, the adaptor microcomputer 302 not specified as a communication partner of the P2P communication does not participate in the operations of the signal line CS and the signal line DATA.

As described above, the signal transferred by using the signal line CS in P2P communication acts as a control signal indicating the end of transmission by the sender apparatus and a standby request for next data transmission.

While an example of the communication waveforms in P2P communication has been described with reference to FIG. 5, the present invention is not limited thereto. For example, data may be transmitted byte by byte or in units of other numbers of bytes.

<Communication Mode Switching>

Figure 6:
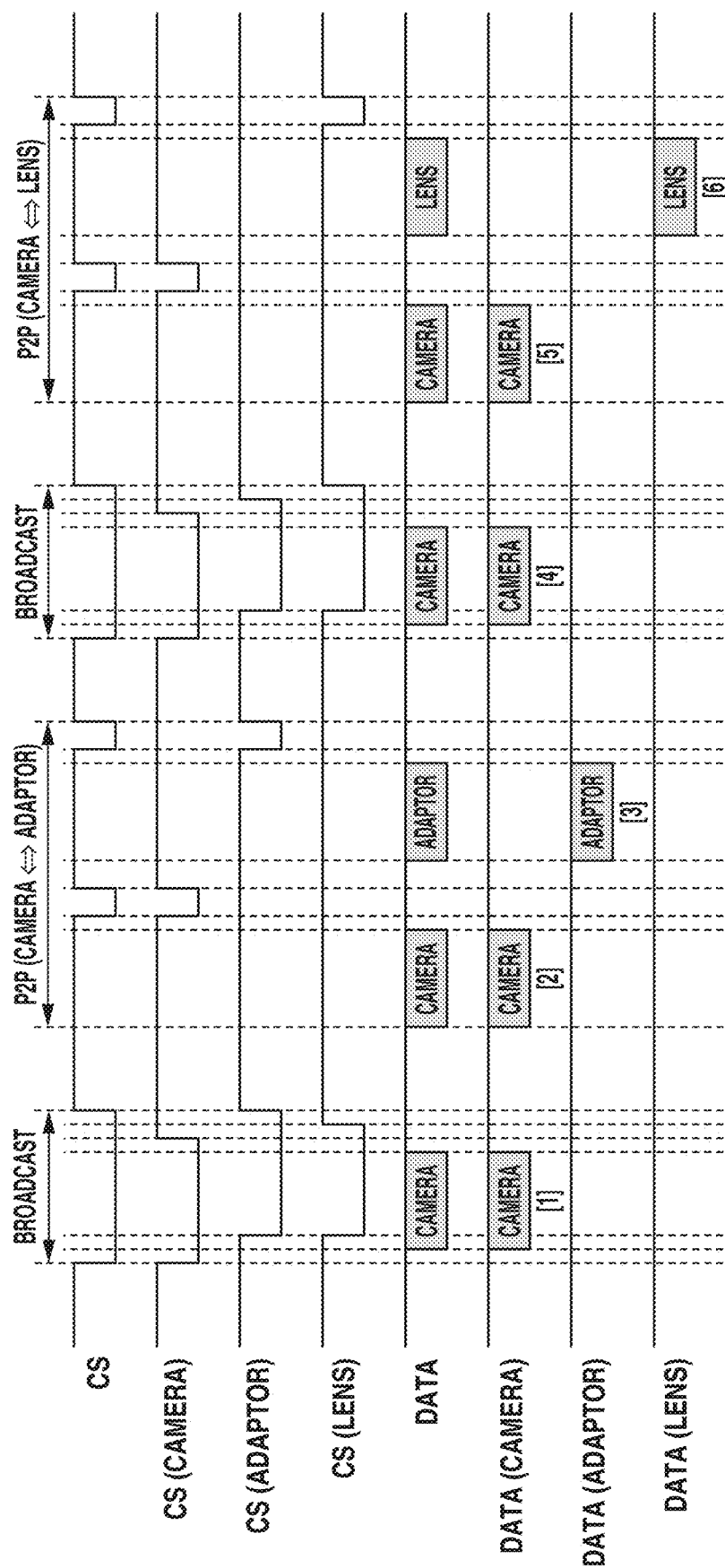
FIG. 6 is a diagram illustrating communication waveforms in switching communication methods.

An example of a method for switching broadcast communication and P2P communication performed between the camera microcomputer 205, the lens microcomputer 111, and the adaptor microcomputer 302, and specifying a communication partner in P2P communication will be described with reference to FIG. 6. FIG. 6 is a diagram illustrating communication waveforms in switching the communication methods. The communication partner of P2P communication is specified ([1]) by broadcast communication. In the following description, the camera microcomputer 205 transmits data ([2]) by P2P communication, after the camera microcomputer 205 specifies the adaptor microcomputer 302 as the communication partner of P2P communication by using broadcast communication. In response to this transmission, the adaptor microcomputer 302 sends a reply ([3]) by P2P communication. Next, the camera microcomputer 205 specifies the lens microcomputer 111 as the communication partner of P2P communication ([4]) by using broadcast communication. The camera microcomputer 205 then transmits data ([5]) and the lens microcomputer 111 sends a reply ([6]) by P2P communication.

The camera microcomputer 205, or communication master, initially performs broadcast communication by the procedure described with reference to FIG. 4. This broadcast communication notifies the communication slaves of slave specification data (communication partner specification data) for specifying the partner for the camera microcomputer 205 to communicate with in the subsequent P2P communication. The lens microcomputer 111 and the adaptor microcomputer 302, or communication slaves, each determine whether they are specified as the communication partner of the P2P communication based on the slave specification data received by the broadcast communication. Based on the broadcast communication, the camera microcomputer 205 and the communication slave specified switch to P2P communication. Since the adaptor microcomputer 302 is specified as the communication partner in this case, the camera microcomputer 205 and the adaptor microcomputer 302 transmit and receive data therebetween by P2P communication based on the procedure described with reference to FIG. 5. As described above, the camera microcomputer 205 initially transmits data to the adaptor microcomputer 302, and then the adaptor microcomputer 302 transmits data to the camera microcomputer 205.

After the P2P communication between the camera microcomputer 205 and the adaptor microcomputer 302 ends, the camera microcomputer 205 specifies the lens microcomputer 111 as the communication partner to communicate with in P2P communication by using broadcast communication. Based on this broadcast communication, the adaptor microcomputer 302 ends P2P communication, and the lens microcomputer 111 switches to P2P communication. If the broadcast communication is not executed, the P2P communication between the camera microcomputer 205 and the adaptor microcomputer 302 is continued. In P2P communication, the camera microcomputer 205 and the lens microcomputer 111 transmit and receive data with each other by the procedure described with reference to FIG. 5. As described above, the camera microcomputer 205 transmits data to the lens microcomputer 111, and then the lens microcomputer 111 transmits data to the camera microcomputer 205.

<Communication Flow Control in Broadcast Communication>

Communication flow control that is a communication procedure performed between the camera microcomputer 205, the lens microcomputer 111, and the adaptor microcomputer 302 in broadcast communication and P2P communication will be described.

Figure 7:
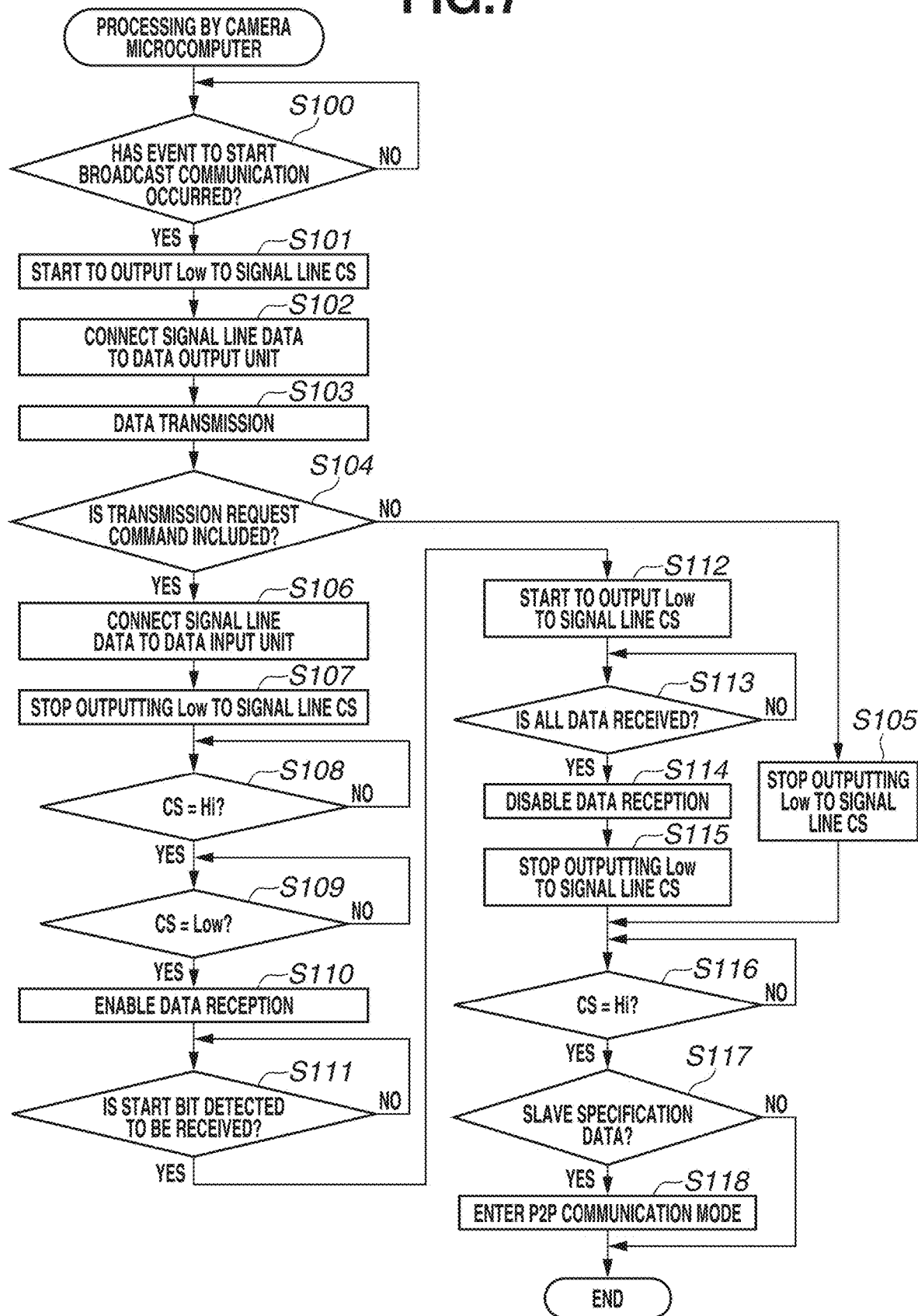
FIG. 7 is a flowchart for describing a communication procedure of a communication master in broadcast communication.
Figure 8:
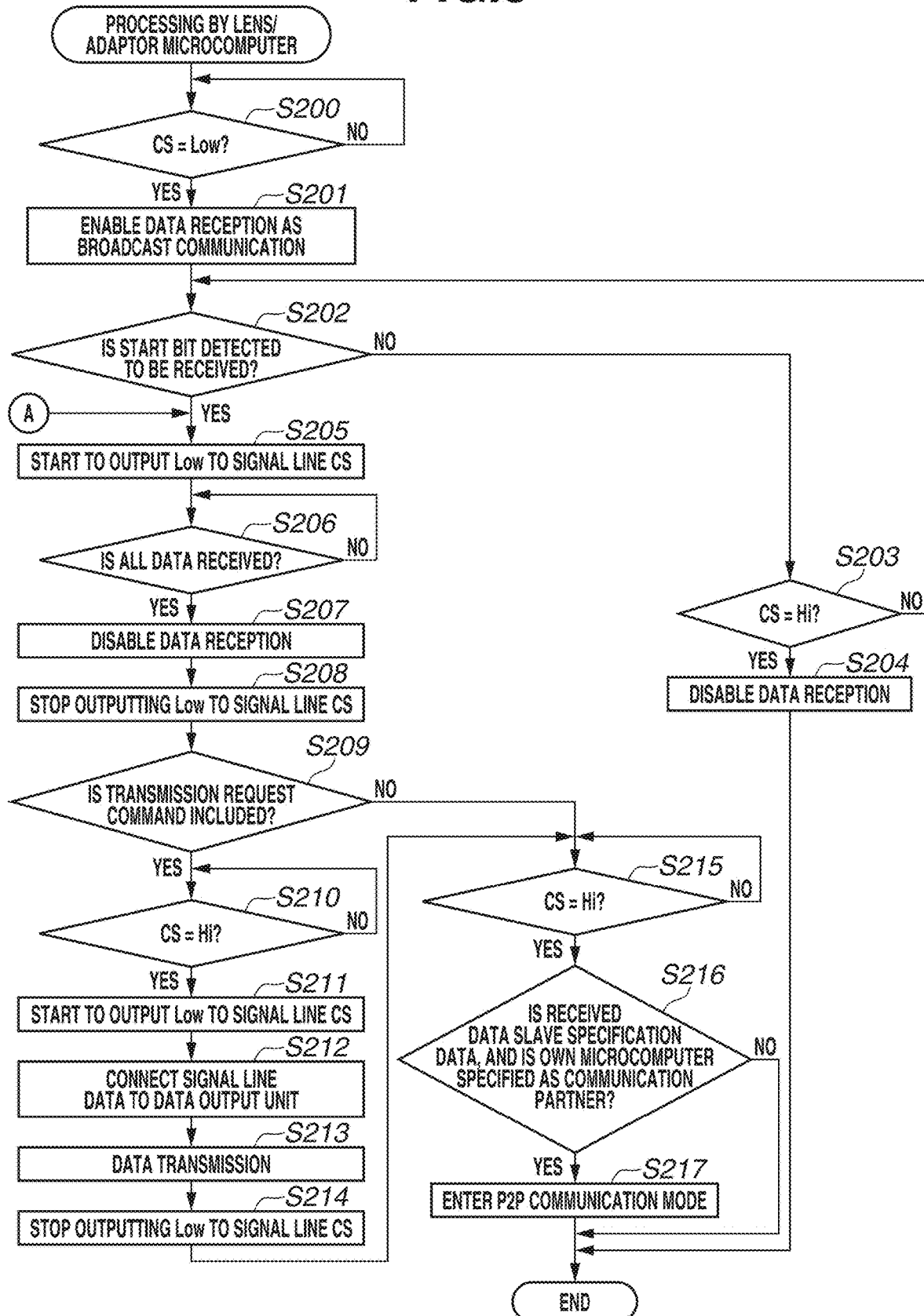
FIG. 8 is a flowchart for describing a communication procedure of a communication slave in broadcast communication.

A communication procedure in broadcast communication will be described with reference to FIGS. 7 and 8. FIG. 7 is a flowchart for describing a communication procedure of the camera microcomputer 205, or communication master, in broadcast communication. FIG. 8 is a flowchart for describing a communication procedure of the lens microcomputer 111 and the adaptor microcomputer 302, or communication slaves, in broadcast communication.

The communication procedure of the camera microcomputer 205 will initially be described.

In step S100, the camera microcomputer 205 determines whether an event to start broadcast communication has occurred. If the event has occurred (YES in step S100), the processing proceeds to step S101. If the event has not occurred (NO in step S100), the processing returns to step S100 and the camera microcomputer 205 repeats the determination.

In step S101, the camera microcomputer 205 turns on (connects) the GND switch 2081 to start outputting Low to the signal line CS. This notifies the lens microcomputer 111 and the adaptor microcomputer 302 of a start of broadcast communication.

In step S102, the camera microcomputer 205 operates the input/output selection switch 2082 to connect the signal line DATA to the data output unit of the camera microcomputer 205.

In step S103, the camera microcomputer 205 starts data transmission.

In step S104, the camera microcomputer 205 determines whether the data transmitted in step S103 includes a transmission request command. The transmission request command is a command for requesting a communication slave receiving the data transmitted from the camera microcomputer 205, or communication master, to transmit data to the camera microcomputer 205. If the transmission request command is included (YES in step S104), the processing proceeds to step S106. If the transmission request command is not included (NO in step S104), the processing proceeds to step S105.

In step S105, the camera microcomputer 205 turns off (disconnects) the GND switch 2081 to stop outputting Low to the signal line CS.

In step S106, the camera microcomputer 205 operates the input/output selection switch 2082 to connect the signal line DATA to the data input unit of the camera microcomputer 205.

In step S107, the camera microcomputer 205 turns off (disconnects) the GND switch 2081 to stop outputting Low to the signal line CS.

In step S108, the camera microcomputer 205 determines whether the signal level of the signal line CS is Hi. If the signal level is Hi (YES in step S108), the processing proceeds to step S109. If the signal level is not Hi (NO in step S108), the processing returns to step S108 and the camera microcomputer 205 repeats the determination.

In step S109, the camera microcomputer 205 determines whether the signal level of the signal line CS is Low. If the signal level is Low (YES in step S109), the processing proceeds to step S110. If the signal level is not Low (NO in step S109), the processing returns to step S109 and the camera microcomputer 205 repeats the determination.

In step S110, the camera microcomputer 205 enables data reception from the signal line DATA.

In step S111, the camera microcomputer 205 determines whether the start bit ST is detected to be received from the signal line DATA. If the start bit ST is detected to be received (YES in step S111), the processing proceeds to step S112. If the start bit ST is not detected to be received (NO in step S111), the processing returns to step S111 and the camera microcomputer 205 repeats the determination.

In step S112, the camera microcomputer 205 turns on (connects) the GND switch 2081 to start outputting Low to the signal line CS.

In step S113, the camera microcomputer 205 determines whether all the data has been received. If all the data has been received (YES in step S113), the processing proceeds to step S114. If not all the data has been received (NO in step S113), the processing returns to step S113 and the camera microcomputer 205 repeats the determination.

In step S114, the camera microcomputer 205 disables data reception from the signal line DATA.

In step S115, the camera microcomputer 205 turns off (disconnects) the GND switch 2081 to stop outputting Low to the signal line CS.

In step S116, the camera microcomputer 205 determines whether the signal level of the signal line CS is Hi. If the signal level is Hi (YES in step S116), the processing proceeds to step S117. If the signal level is not Hi (NO in step S116), the processing returns to step S116 and the camera microcomputer 205 repeats the determination.

In step S117, the camera microcomputer 205 determines whether the data transmitted in step S103 is slave specification data for specifying a communication partner. If the data is slave specification data (YES in step S117), the processing proceeds to step S118. If the data is not slave specification data (NO in step S117), the processing ends.

In step S118, the camera microcomputer 205 enters a P2P communication mode.

The communication procedure of the adaptor microcomputer 302 will now be described with reference to FIG. 8. Since the communication procedure of the lens microcomputer 111 is almost the same as that of the adaptor microcomputer 302, a description thereof will be omitted in the present exemplary embodiment.

In step S200, the adaptor microcomputer 302 determines whether the signal level of the signal line CS is Low. If the signal level is Low (YES in step S200), the processing proceeds to step S201. If the signal level is not Low (NO in step S200), the processing returns to step S200 and the adaptor microcomputer 302 repeats the determination.

In step S201, the adaptor microcomputer 302 enables data reception from the signal line DATA as broadcast communication.

In step S202, the adaptor microcomputer 302 determines whether the start bit ST is detected to be received from the signal line DATA. If the start bit ST is detected to be received (YES in step S202), the processing proceeds to step S205. If the start bit ST is not detected to be received (NO in step S202), the processing proceeds to step S203.

In step S203, the adaptor microcomputer 302 determines whether the signal level of the signal line CS is Hi. If the signal level is Hi (YES in step S203), the processing proceeds to step S204. If the signal level is not Hi (NO in step S203), the processing returns to step S202.

In step S204, the adaptor microcomputer 302 disables data reception from the signal line DATA.

The reason why the processing of steps S203 and S204 is performed here is to accommodate a situation where the camera microcomputer 205 and the lens microcomputer 111 perform P2P communication therebetween and only the adaptor microcomputer 302 performs broadcast communication. In such a situation, the adaptor microcomputer 302 does not receive data from the camera microcomputer 205.

In step S205, the adaptor microcomputer 302 turns on (connects) the GND switch 3031 to start outputting Low to the signal line CS.

In step S206, the adaptor microcomputer 302 determines whether all the data has been received. If all the data has been received (YES in step S206), the processing proceeds to step S207. If not all the data has been received (NO in step S206), the processing returns to step S206 and the adaptor microcomputer 302 repeats the determination.

In step S207, the adaptor microcomputer 302 disables data reception from the signal line DATA.

In step S208, the adaptor microcomputer 302 turns off (disconnects) the GND switch 3031 to stop outputting Low to the signal line CS.

In step S209, the adaptor microcomputer 302 determines whether the data received in step S206 includes the transmission request command. If the transmission request command is included (YES in step S209), the processing proceeds to step S210. If the transmission request command is not included (NO in step S209), the processing proceeds to step S215.

In step S210, the adaptor microcomputer 302 determines whether the signal level of the signal line CS is Hi. If the signal level is Hi (YES in step S210), the processing proceeds to step S211. If the signal level is not Hi (NO in step S210), the processing returns to step S210 and the adaptor microcomputer 302 repeats the determination.

In step S211, the adaptor microcomputer 302 turns on (connects) the GND switch 3031 to start outputting Low to the signal line CS.

In step S212, the adaptor microcomputer 302 operates the input/output selection switch 3032 to connect the signal line DATA to the data output unit of the adaptor microcomputer 302.

In step S213, the adaptor microcomputer 302 starts data transmission.

In step S214, the adaptor microcomputer 302 turns off (disconnects) the GND switch 3031 to stop outputting Low to the signal line CS.

In step S215, the adaptor microcomputer 302 determines whether the signal level of the signal line CS is Hi. If the signal level is Hi (YES in step S215), the processing proceeds to step S216. If the signal level is not Hi (NO in step S215), the processing returns to step S215 and the adaptor microcomputer 302 repeats the determination.

In step S216, the adaptor microcomputer 302 determines whether the data received in step S206 is slave specification data and the adaptor microcomputer 302 is specified as the communication partner of the camera microcomputer 205 in P2P communication. If the data is slave specification data and the adaptor microcomputer 302 is specified as the communication partner (YES in step S216), the processing proceeds to step S217. If the data is not slave specification data or the adaptor microcomputer 302 is not specified as the communication partner (NO in step S216), the processing ends.

In step S217, the adaptor microcomputer 302 enters the P2P communication mode.

<Communication Flow Control in P2P Communication>

Figure 9A:
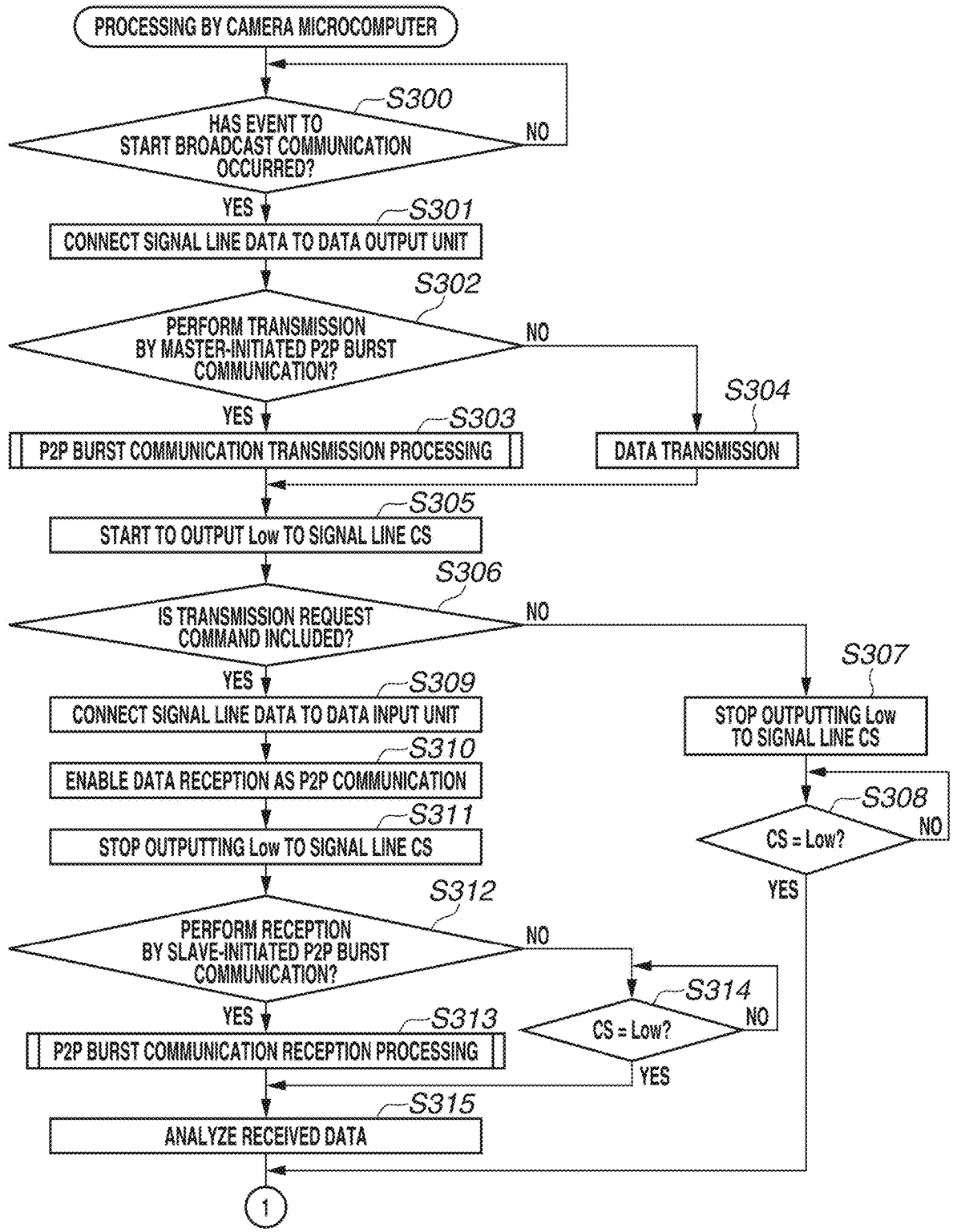
FIGS. 9A and 9B are a flowchart for describing a communication procedure of the communication master in P2P communication.
Figure 9B:
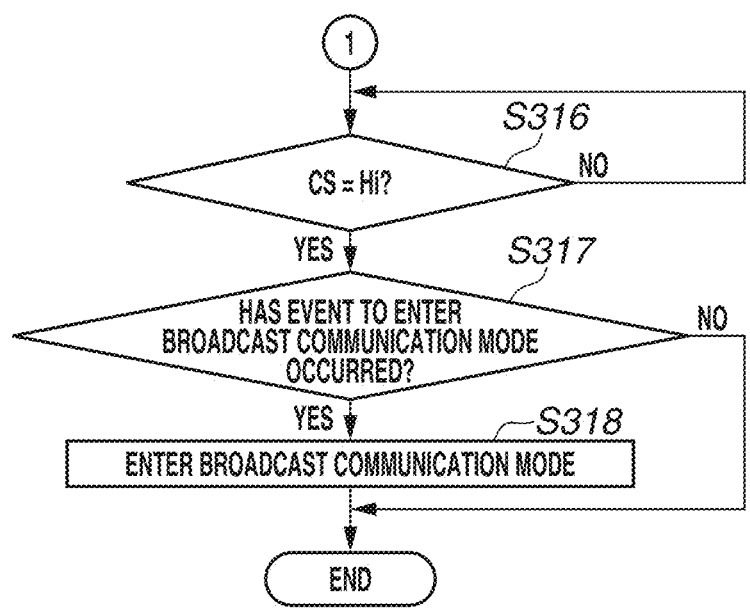

Communication procedures in P2P communication will be described with reference to FIGS. 9A to 10B. FIGS. 9A and 9B are a flowchart for describing the communication procedure of the camera microcomputer 205, or communication master, in P2P communication.

In step S300, the camera microcomputer 205 determines whether an event to start P2P communication has occurred. If the event has occurred (YES in step S300), the processing proceeds to step S301. If the event has not occurred (NO in step S300), the processing returns to step S300 and the camera microcomputer 205 repeats the determination.

In step S301, the camera microcomputer 205 operates the input/output selection switch 2082 to connect the signal line DATA to the data output unit of the camera microcomputer 205.

In step S302, the camera microcomputer 205 determines whether to perform master-initiated P2P burst communication transmission. If master-initiated P2P burst communication transmission is to be performed (YES in step S302), the processing proceeds to step S303. If not (NO in step S302), the processing proceeds to step S304.

In step S303, the camera microcomputer 205 performs master-initiated P2P burst communication transmission. The processing proceeds to step S305. Details of the master-initiated P2P burst communication transmission processing will be described below.

In step S304, the camera microcomputer 205 starts data transmission.

In step S305, the camera microcomputer 205 turns on (connects) the GND switch 2081 to start outputting Low to the signal line CS.

In step S306, the camera microcomputer 205 determines whether the data transmitted in step S304 includes the transmission request command. If the transmission request command is included (YES in step S306), the processing proceeds to step S309. If the transmission request command is not included (NO in step S306), the processing proceeds to step S307.

In step S307, the camera microcomputer 205 turns off (disconnects) the GND switch 2081 to stop outputting Low to the signal line CS.

In step S308, the camera microcomputer 205 determines whether the signal level of the signal line CS is Low. If the signal level is Low (YES in step S308), the processing proceeds to step S316. If the signal level is not Low (NO in step S308), the processing returns to step S308 and the camera microcomputer 205 repeats the determination.

In step S309, the camera microcomputer 205 operates the input/output selection stich 2082 to connect the signal line DATA to the data input unit of the camera microcomputer 205.

In step S310, the camera microcomputer 205 enables data reception from the signal line DATA as P2P communication.

In step S311, the camera microcomputer 205 turns off (disconnects) the GND switch 2081 to stop outputting Low to the signal line CS.

In step S312, the camera microcomputer 205 determines whether to perform slave-initiated P2P burst communication reception. If slave-initiated P2P burst communication reception is to be performed (YES in step S312), the processing proceeds to step S313. If not (NO in step S312), the processing proceeds to step S314.

In step S313, the camera microcomputer 205 performs slave-initiated P2P burst communication reception. The processing proceeds to step S315. Details of the slave-initiated P2P burst communication reception processing will be described below.

In step S314, the camera microcomputer 205 determines whether the signal level of the signal line CS is Low. If the signal level is Low (YES in step S314), the processing proceeds to step S315. If the signal level is not Low (NO in step S314), the processing returns to step S314 and the camera microcomputer 205 repeats the determination.

In step S315, the camera microcomputer 205 analyzes the data received from the signal line DATA.

In step S316, the camera microcomputer 205 determines whether the signal level of the signal line CS is Hi. If the signal level is Hi (YES in step S316), the processing proceeds to step S317. If the signal level is not Hi (NO in step S316), the processing returns to step S316 and the camera microcomputer 205 repeats the determination.

In step S317, the camera microcomputer 205 determines whether an event to enter a broadcast communication mode has occurred. If such an event has occurred (YES in step S317), the processing proceeds to step S318. If no such event has occurred (NO in step S317), the processing ends.

In step S318, the camera microcomputer 205 enters the broadcast communication mode.

Figure 10A:
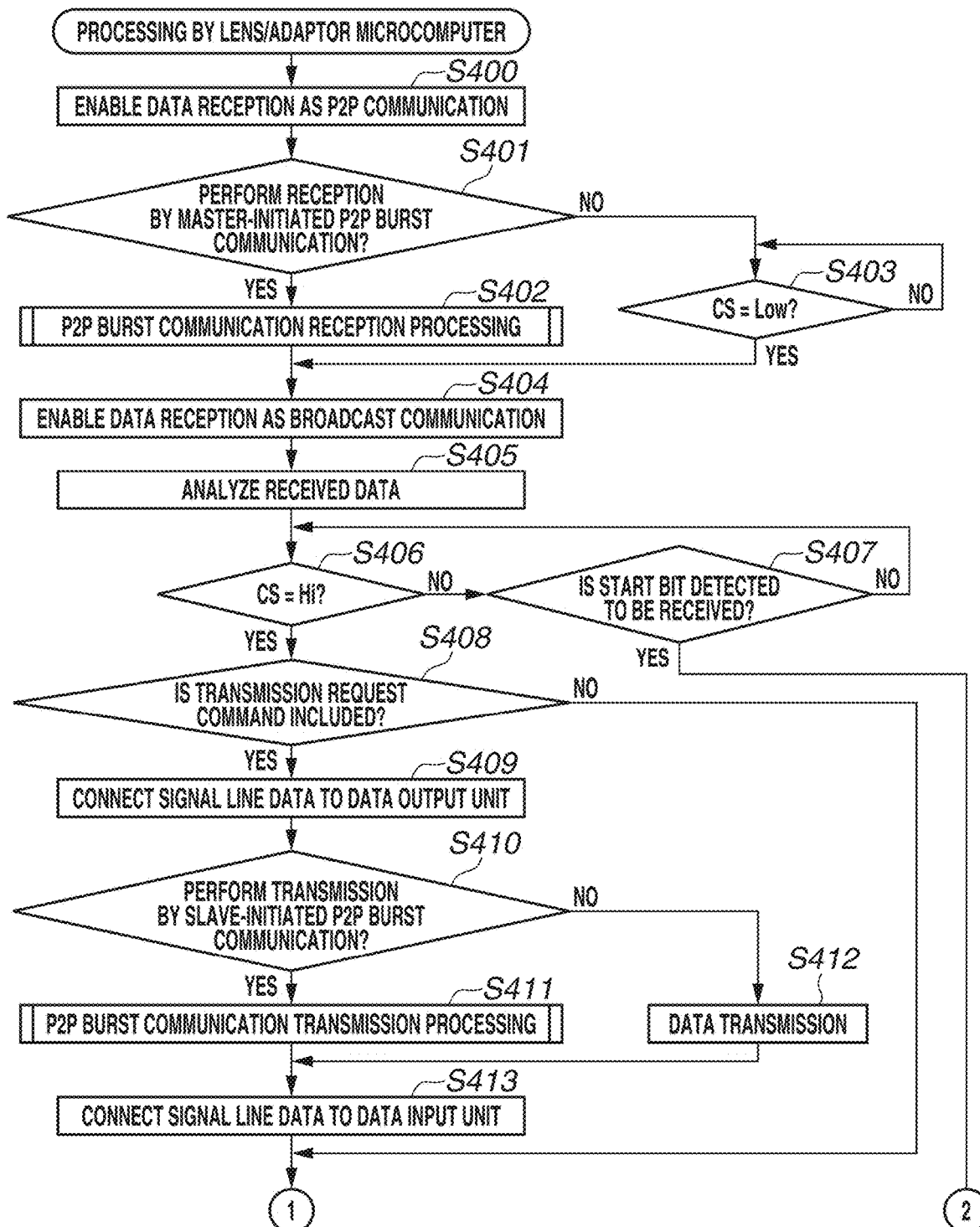
FIGS. 10A and 10B are a flowchart for describing a communication procedure of a communication slave in P2P communication.
Figure 10B:
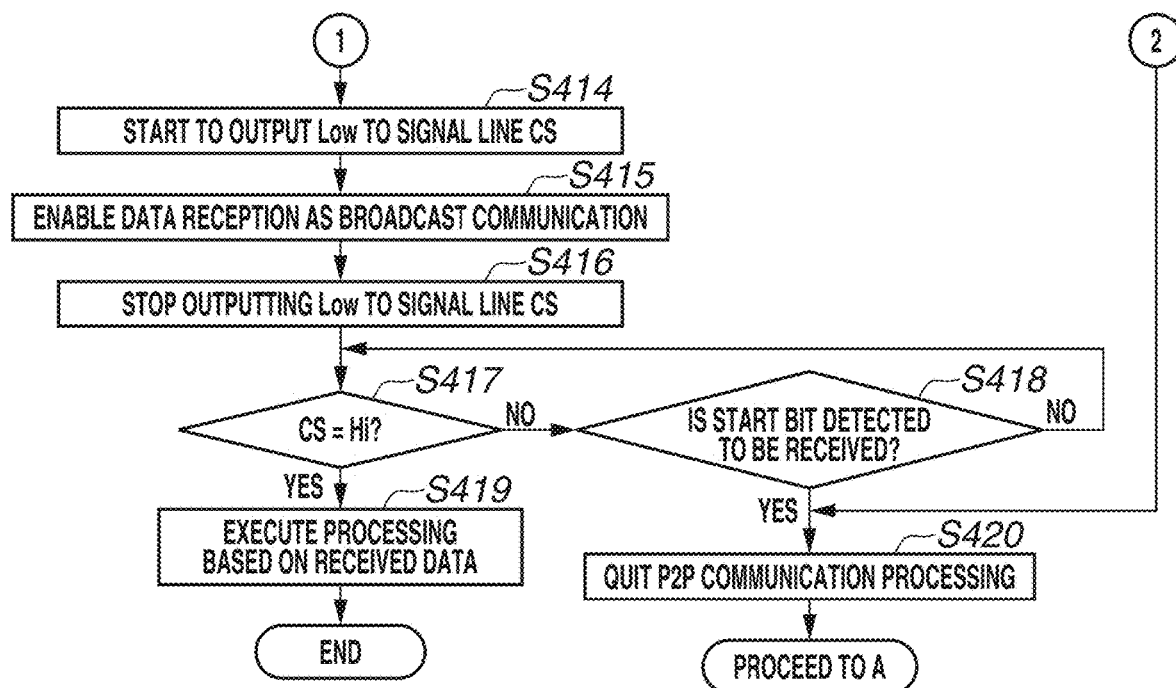

FIGS. 10A and 10B are a flowchart for describing the communication procedure of the adaptor microcomputer 302, or communication slave, in P2P communication. Since the communication procedure of the lens microcomputer 111 is almost the same as that of the adaptor microcomputer 302, a description thereof will be omitted in the present exemplary embodiment.

In step S400, the adaptor microcomputer 302 enables data reception from the signal line DATA as P2P communication.

In step S401, the adaptor microcomputer 302 determines whether to perform master-initiated P2P burst communication reception. If master-initiated P2P burst communication reception is to be performed (YES in step S401), the processing proceeds to step S402. If not (NO in step S401), the processing proceeds to step S403.

In step S402, the adaptor microcomputer 302 performs master-initiated P2P burst communication reception. The processing then proceeds to step S404. Details of the master-initiated P2P burst communication reception processing will be described below.

In step S403, the adaptor microcomputer 302 determines whether the signal level of the signal line CS is Low. If the signal level is Low (YES in step S403), the processing proceeds to step S404. If the signal level is not Low (NO in step S403), the processing returns to step S403 and the adaptor microcomputer 302 repeats the determination.

In step S404, the adaptor microcomputer 302 enables data reception from the signal line DATA as broadcast communication.

In step S405, the adaptor microcomputer 302 analyzes the data received from the signal line DATA.

In step S406, the adaptor microcomputer 302 determines whether the signal level of the signal line CS is Hi. If the signal level is Hi (YES in step S406), the processing proceeds to step S408. If the signal level is not Hi (NO in step S406), the processing proceeds to step S407.

In step S407, the adaptor microcomputer 302 determines whether the start bit ST is detected to be received from the signal line DATA. If the start bit ST is detected to be received (YES in step S407), the processing proceeds to step S420. If the start bit ST is not detected to be received (NO in step S407), the processing proceeds to step S406.

In step S408, the adaptor microcomputer 302 determines whether the data received in step S405 includes the transmission request command. If the transmission request command is included (YES in step S408), the processing proceeds to step S409. If the transmission request command is not included (NO in step S408), the processing proceeds to step S414.

In step S409, the adaptor microcomputer 302 operates the input/output selection switch 3032 to connect the signal line DATA to the data output unit of the adaptor microcomputer 302.

In step S410, the adaptor microcomputer 302 determines whether to perform slave-initiated P2P burst communication transmission. If slave-initiated P2P burst communication transmission is to be performed (YES in step S410), the processing proceeds to step S411. If not (NO in step S410), the processing proceeds to step S412.

In step S411, the adaptor microcomputer 302 performs slave-initiated P2P burst communication transmission. The processing proceeds to step S413. Details of the slave-initiated P2P burst communication transmission processing will be described below.

In step S412, the adaptor microcomputer 302 starts data transmission.

In step S413, the adaptor microcomputer 302 operates the input/output selection switch 3032 to connect the signal line DATA to the data input unit of the adaptor microcomputer 302.

In step S414, the adaptor microcomputer 302 turns on (connects) the GND switch 3031 to start outputting Low to the signal line CS.

In step S415, the adaptor microcomputer 302 enables data reception from the signal line DATA as broadcast communication.

In step S416, the adaptor microcomputer 302 turns off (disconnects) the GND switch 3031 to stop outputting Low to the signal line CS.

In step S417, the adaptor microcomputer 302 determines whether the signal level of the signal line CS is Hi. If the signal level is Hi (YES in step S417), the processing proceeds to step S419. If the signal level is not Hi (NO in step S417), the processing proceeds to step S418.

In step S418, the adaptor microcomputer 302 determines whether the start bit ST is detected to be received from the signal line DATA. If the start bit ST is detected to be received (YES in step S418), the processing proceeds to step S420. If the start bit ST is not detected to be received (NO in step S418), the processing proceeds to step S417.

In step S419, the adaptor microcomputer 302 executes processing based on the data received in step S405. After the execution of the processing of step S419, P2P communication can be continued by starting the present procedure again.

In step S420, the adaptor microcomputer 302 quits P2P communication processing. The processing then proceeds to step S205 of FIG. 8 to perform broadcast communication.

In such a manner, the communication partner of P2P communication can be specified by broadcast communication, and broadcast communication and P2P communication can be switched at the same time.

An enormous amount of data is difficult to communicate by P2P communication at a time since the size of data that can be transmitted by one session of P2P communication is limited due to the reception buffer size of the receiver apparatus. An enormous amount of data can be transferred by repeating P2P communication over and over. This, however, increases the transfer time since the communication master and the communication slave alternately transfer data and issue notifications using the signal line CS in P2P communication. To solve such an issue, an enormous amount of data is transferred by P2P burst communication described next.

<Switching to Slave-Initiated P2P Burst Communication Mode>

Switching to P2P burst communication performed between the camera microcomputer 205 and the adaptor microcomputer 302 and an example of the P2P burst communication will be described with reference to FIGS. 11 to 13.

Figure 11:
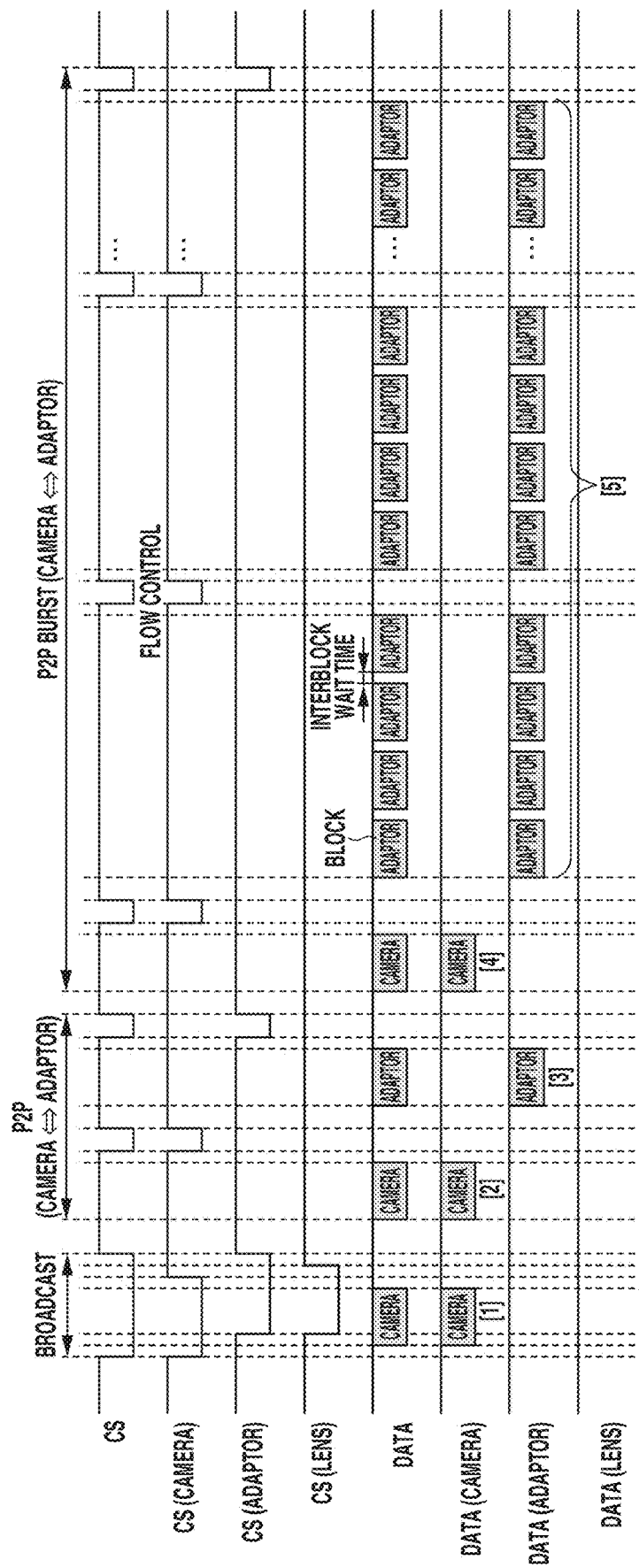
FIG. 11 is a diagram illustrating communication waveforms in slave-initiated P2P burst communication.

FIG. 11 is a diagram illustrating communication waveforms in slave-initiated P2P burst communication where data is transferred from the adaptor microcomputer 302 to the camera microcomputer 205. In the following description, the camera microcomputer 205 specifies the adaptor microcomputer 302 as the communication partner of P2P communication ([1]) by broadcast communication. The camera microcomputer 205 then transmits data ([2]) and the adaptor microcomputer 302 sends a reply ([3]) by P2P communication. The transmission ([2]) from the camera microcomputer 205 transmits burst communication information about P2P burst communication (corresponding to step S2802 of FIG. 28). The burst communication information is setting information about slave-initiated P2P burst communication to be performed afterward. When receiving the burst communication information, the adaptor microcomputer 302 sends a reply ([3]) in response (corresponding to step S2805 of FIG. 28). Examples of the information transmitted by the reply ([3]) include information indicating the reception of the burst communication information. The camera microcomputer 205 then transmits a command to enter slave-initiated P2P burst communication ([4]), and the adaptor microcomputer 302 performs slave-initiated P2P burst communication with the camera microcomputer 205 ([5]).

The adaptor microcomputer 302 may transmit burst communication information about the intermediate adaptor 300 to the camera microcomputer 205. In such a case, for example, the camera microcomputer 205 transmits a command for requesting burst communication information (corresponding to step S2807 of FIG. 28) after the reply ([3]) from the adaptor microcomputer 302. The adaptor microcomputer 302 receives the command, and transmits the burst communication information in response (corresponding to step S2809 of FIG. 28). With such a configuration, P2P burst communication can be performed by using settings executable by both the apparatuses even if the camera main body 200 and the intermediate adaptor 300 have different burst communication information.

The processing for specifying the communication partner of P2P communication and the P2P communication are similar to those described with reference to FIG. 6. A description thereof will thus be omitted.

The burst communication information for slave-initiated P2P burst communication according to the present exemplary embodiment includes a block size, an interblock wait time, the number of blocks ahead of flow control, and a total size.

A block refers to a group of data to be continuously communicated by slave-initiated P2P burst communication. The block size is the number of bytes of data included in a block. For example, the block size in the present exemplary embodiment refers to the size of data that the camera microcomputer 205, or receiver of slave-initiated P2P burst communication, can continuously receive. In the present exemplary embodiment, the block size is 16 bytes. In such a case, each block includes 16 consecutive frames of data. As described above, one frame of data includes the start bit ST of Low level, eight bits (one byte) of data, and the stop bit SP of Hi level. If the block size is 16 bytes, each block includes a total of 16 start bits ST and 16 stop bits in addition to 16 bytes of data.

The interblock wait time refers to a time for which the adaptor microcomputer 302, or sender of slave-initiated P2P burst communication, waits before starting to transmit the next block after the completion of transmission of one block. In the present exemplary embodiment, the interblock wait time refers to the time from when the camera microcomputer 205, or the receiver of slave-initiated P2P burst communication, completes receiving one block to when the camera microcomputer 205 becomes ready to receive the next block. Specifically, the interblock wait time is 100 µs.

In the present exemplary embodiment, flow control is implemented by the camera microcomputer 205, or the receiver of slave-initiated P2P burst communication, making a notification of communication timing using the signal line CS. For example, time for processing other than the slave-initiated P2P burst communication can be secured by making the notification of the communication timing after the completion of the processing other than the communication.

The number of blocks ahead of flow control is the number of blocks to be accepted between one session of flow control and the next. The number of blocks ahead of flow control according to the present exemplary embodiment refers to an interval for the camera microcomputer 205, or receiver of slave-initiated P2P burst communication, to secure time for processing other than slave-initiated P2P burst communication. Specifically, the number of blocks ahead of flow control is four. The number of blocks ahead of flow control may also be referred to as a predetermined number of blocks.

The total size refers to the size of data for the adaptor microcomputer 302, or the sender of slave-initiated P2P burst communication, to transmit by the slave-initiated P2P burst communication. For example, if the total size is 128 bytes and the block size is 16 bytes, a total of eight blocks are transmitted.

Next, the camera microcomputer 205 transmits a command to enter slave-initiated P2P burst communication, and the adaptor microcomputer 302 performs slave-initiated P2P burst communication with the camera microcomputer 205 based on the foregoing burst communication information.

Specifically, the camera microcomputer 205 transmits the command to enter slave-initiated P2P burst communication to the adaptor microcomputer 302, and notifies the adaptor microcomputer 302 of an end of transmission and a standby request for next data transmission by using the signal line CS. When receiving the command to enter slave-initiated P2P burst communication, the adaptor microcomputer 302 generates data to be transmitted by the slave-initiated P2P burst communication.

The camera microcomputer 205 completes preparations for the reception of slave-initiated P2P burst communication, and cancels the standby request for data transmission by using the signal line CS.

If the generation of the data to be transmitted is completed and the standby request from the camera microcomputer 205 is cancelled, the adaptor microcomputer 302 transmits a block of data having the block size of 16 bytes. The adaptor microcomputer 302 then suspends communication for the interblock wait time of 100 μs or more. The camera microcomputer 205 receives the one block of data, and performs processing for receiving the next one block of data within the interblock wait time of 100 μs.

The camera microcomputer 205 and the adaptor microcomputer 302 perform the foregoing processing for transferring one block of data until as many blocks as the number of blocks ahead of flow control, or four blocks, are transferred.

The adaptor microcomputer 302 completes transmitting as many blocks as the number of blocks ahead of flow control, and waits for flow control by the camera microcomputer 205.

The camera microcomputer 205 completes receiving as many blocks as the number of blocks ahead of flow control, and notifies the adaptor microcomputer 302 of suspension of reception and a standby request for next data transmission by using the signal line CS. The camera microcomputer 205 then completes preparations for the reception of slave-initiated P2P burst communication, and cancels the standby request for data transmission, which means cancellation of the flow control, by using the signal line CS.

The camera microcomputer 205 and the adaptor microcomputer 302 perform the foregoing flow control processing until as much data as the total size has been transferred.

The camera microcomputer 205 completes receiving as much data as the total size, and waits for a notification of an end of transmission and a standby request for next data transmission, given by the adaptor microcomputer 302 using the signal line CS.

The adaptor microcomputer 302 completes transmitting as much data as the total size, notifies the camera microcomputer 205 of the end of transmission and a standby request for next data transmission via the signal line CS, and then cancels the standby request for data transmission. This ends the slave-initiated P2P burst communication.

If not as much data as the total size is transferred from the adaptor microcomputer 302, the camera microcomputer 205 determines that a communication error has occurred due to reception timeout. The camera microcomputer 205 then make a retry from the transmission of a command to enter slave-initiated P2P burst communication ([4]) or the specification of the communication partner of P2P communication ([1]) by broadcast communication.

If the adaptor microcomputer 302 transmits data more than the total size notified in advance, the camera microcomputer 205 is unable to receive the data. If the camera microcomputer 205 waits for the notification of the end of transmission from the adaptor microcomputer 302 via the signal line CS and the wait time expires, the camera microcomputer 205 determines that a communication error has occurred. If the adaptor microcomputer 302 waits for the notification of the communication timing from the camera microcomputer 205 via the signal line CS and the wait time expires, the adaptor microcomputer 302 determines that a communication error has occurred. To recover from such errors related to the signal line CS, the camera microcomputer 205 desirably makes a retry from the specification of the communication partner of P2P communication ([1]) by broadcast communication, or by resetting the power supply.

<Slave-Initiated P2P Burst Communication Procedures>

Communication procedures in slave-initiated P2P burst communication will be described with reference to FIGS. 12 and 13. FIG. 12 is a flowchart for describing the communication procedure of the camera microcomputer 205, or communication master, in slave-initiated P2P burst communication.

In step S500, the camera microcomputer 205 performs data reception processing. The processing proceeds to step S501.

In step S501, the camera microcomputer 205 determines whether as much data as the total size has been received. If as much data has been received (YES in step S501), the processing proceeds to step S511. If not as much data has been received (NO in step S501), the processing proceeds to step S502.

In step S502, the camera microcomputer 205 determines whether the signal level of the signal line CS is Low. If the signal level is Low (YES in step S502), the processing ends. If the signal level is not Low (NO in step S502), the processing proceeds to step S503.

In step S503, the camera microcomputer 205 determines whether as much data as the block size has been received. If as much data has been received (YES in step S503), the processing proceeds to step S504. If not as much data has been received (NO in step S503), the processing proceeds to step S500.

In step S504, the camera microcomputer 205 determines whether as much data as the number of blocks ahead of flow control has been received. If as much data has been received (YES in step S504), the processing proceeds to step S507. If not as much data has been received (NO in step S504), the processing proceeds to step S505.

In step S505, the camera microcomputer 205 determines whether to perform processing other than communication. If processing other than communication is to be performed (YES in step S505), the processing proceeds to step S507. If no processing other than communication is to be performed (NO in step S505), the processing proceeds to step S506.

In step S506, the camera microcomputer 205 performs reception data processing for burst communication. The processing proceeds to step S500. The reception data processing is processing for saving received data to enable reception of the next block. This processing is desirably completed within the foregoing interblock wait time.

In step S507, the camera microcomputer 205 turns on (connects) the GND switch 2081 to start outputting Low to the signal line CS.

In step S508, the camera microcomputer 205 performs reception data processing similar to that performed in step S506.

In step S509, the camera microcomputer 205 performs the processing other than communication.

In step S510, the camera microcomputer 205 turns off (disconnects) the GND switch 2081 to stop outputting Low to the signal line CS.

In step S511, the camera microcomputer 205 determines whether the signal level of the signal line CS is Low. If the signal level is Low (YES in step S511), the processing ends. If the signal level is not Low (NO in step S511), the processing returns to step S511 and the camera microcomputer 205 repeats the determination.

Figure 13:
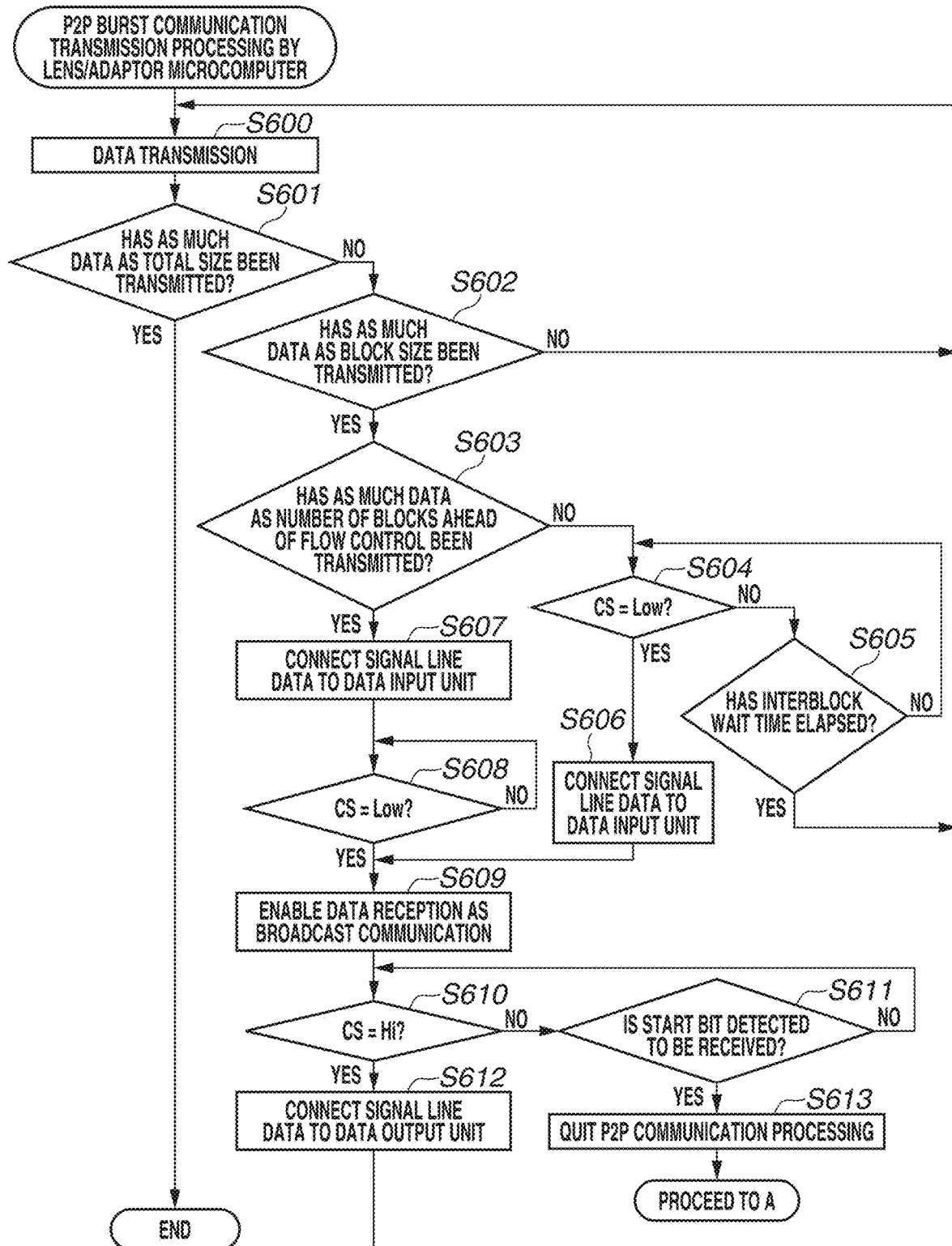
FIG. 13 is a flowchart for describing a communication procedure of a communication slave in slave-initiated P2P burst communication.

FIG. 13 is a flowchart for describing the communication procedure of the adaptor microcomputer 302, or communication slave, in slave-initiated P2P burst communication. Since the communication procedure of the lens microcomputer 111 is almost the same as that of the adaptor microcomputer 302, a description thereof will be omitted in the present exemplary embodiment.

In step S600, the adaptor microcomputer 302 starts data transmission.

In step S601, the adaptor microcomputer 302 determines whether as much data as the total size has been transmitted. If as much data has been transmitted (YES in step S601), the processing ends. If not as much data has been transmitted (NO in step S601), the processing proceeds to step S602.

In step S602, the adaptor microcomputer 302 determines whether as much data as the block size has been transmitted. If as much data has been transmitted (YES in step S602), the processing proceeds to step S603. If not as much data has been transmitted (NO in step S602), the processing proceeds to step S600.

In step S603, the adaptor microcomputer 302 determines whether as much data as the number of blocks ahead of flow control has been transmitted. If as much data has been transmitted (YES in step S603), the processing proceeds to step S607. If not as much data has been transmitted (NO in step S603), the processing proceeds to step S604.

In step S604, the adaptor microcomputer 302 determines whether the signal level of the signal line CS is Low. If the signal level is Low (YES in step S604), the processing proceeds to step S606. If the signal level is not Low (NO in step S604), the processing proceeds to step S605.

In step S605, the adaptor microcomputer 302 determines whether the interblock wait time has elapsed. If the interblock wait time has elapsed (YES in step S605), the processing proceeds to step S600. If the interblock wait time has not elapsed (NO in step S605), the processing proceeds to step S604.

In step S606, the adaptor microcomputer 302 operates the input/output selection switch 3032 to connect the signal line DATA to the data input unit of the adaptor microcomputer 302. The processing proceeds to step S609.

In step S607, the adaptor microcomputer 302 operates the input/output selection switch 3032 to connect the signal line DATA to the data input unit of the adaptor microcomputer 302.

In step S608, the adaptor microcomputer 302 determines whether the signal level of the signal line CS is Low. If the signal level is Low (YES in step S608), the processing proceeds to step S609. If the signal level is not Low (NO in step S608), the processing returns to step S608 and the adaptor microcomputer 302 repeats the determination.

In step S609, the adaptor microcomputer 302 enables data reception from the signal line DATA as broadcast communication.

In step S610, the adaptor microcomputer 302 determines whether the signal level of the signal line CS is Hi. If the signal level is Hi (YES in step S610), the processing proceeds to step S612. If the signal level is not Hi (NO in step S610), the processing proceeds to step S611.

In step S611, the adaptor microcomputer 302 determines whether the start bit ST is detected to be received from the signal line DATA. If the start bit ST is detected to be received (YES in step S611), the processing proceeds to step S613. If the start bit ST is not detected to be received (NO in step S611), the processing proceeds to step S610.

In step S612, the adaptor microcomputer 302 operates the input/output selection switch 3032 to connect the signal line DATA to the data output unit of the adaptor microcomputer 302.

In step S613, the adaptor microcomputer 302 quits P2P communication processing. The processing then proceeds to step S205 of FIG. 8 to perform broadcast communication.

An operation of the lens microcomputer 111 while the camera microcomputer 205 and the adaptor microcomputer 302 are performing P2P burst communication will now be described with reference to FIG. 8.

Suppose that the camera microcomputer 205 specifies the adaptor microcomputer 302 as the communication partner of P2P communication by using broadcast communication. In step S216, the lens microcomputer 111 determines that it is not specified as a slave (NO in step S216), and does not enter the P2P communication mode.

In the subsequent P2P communication and the subsequent P2P burst communication, the signal line DATA remains Hi when the signal line CS is Low. In step S202, the lens microcomputer 111 therefore does not determine that the start bit ST is received, and the processing goes through steps S200, S201, S202, S203, and S204 repeatedly. In other words, the camera microcomputer 205 and the adaptor microcomputer 302 can perform P2P burst communication without a problem despite the connection of a communication slave that is not the partner of the P2P burst communication like the lens microcomputer 111. Moreover, the processing of the lens microcomputer 111 does not include making a determination about P2P burst communication. The camera microcomputer 205 and the adaptor microcomputer 302 can thus perform P2P burst communication even if the connected lens microcomputer 111 that supports only the conventional broadcast communication and P2P communication.

As described above, in the present exemplary embodiment, the camera system that performs communication using two lines, e.g., the signal line CS and the signal line DATA, appropriately switches information to be transferred through the signal line CS in the broadcast communication mode and the P2P communication mode. Communications between the camera microcomputer 205 and the lens microcomputer 111 and between the camera microcomputer 205 and the adaptor microcomputer 302 can thus be implemented with a small number of signal lines. In addition, slave-initiated P2P burst communication different from P2P communication can be implemented with a small number of signal lines.

<Switching to Master-Initiated P2P Burst Communication Mode>

Switching of P2P burst communication between the camera microcomputer 205 and the adaptor microcomputer 302 and another example of the P2P burst communication will be described with reference to FIGS. 14 to 16.

Figure 14:
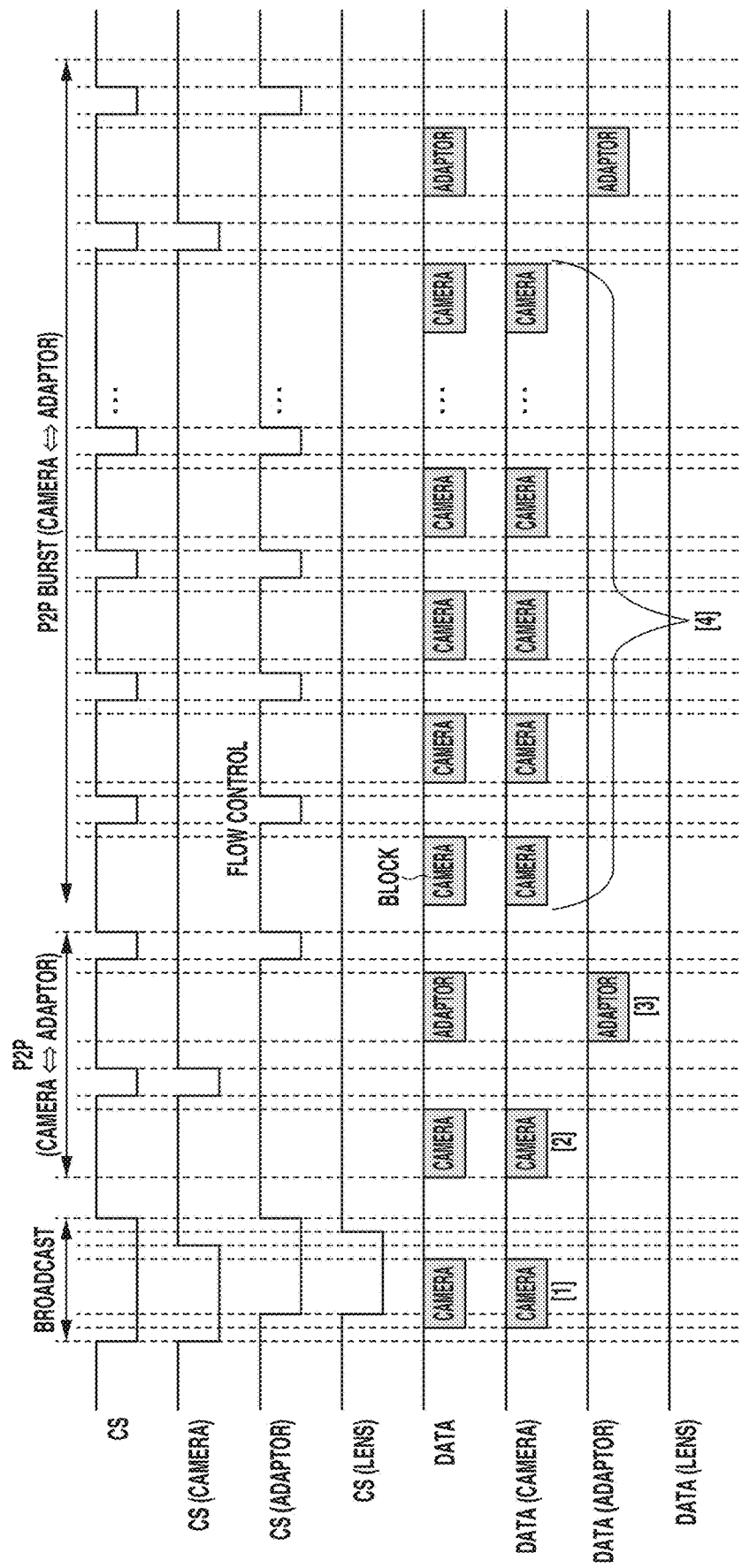
FIG. 14 is a diagram illustrating communication waveforms in master-initiated P2P burst communication.
Figure 15:
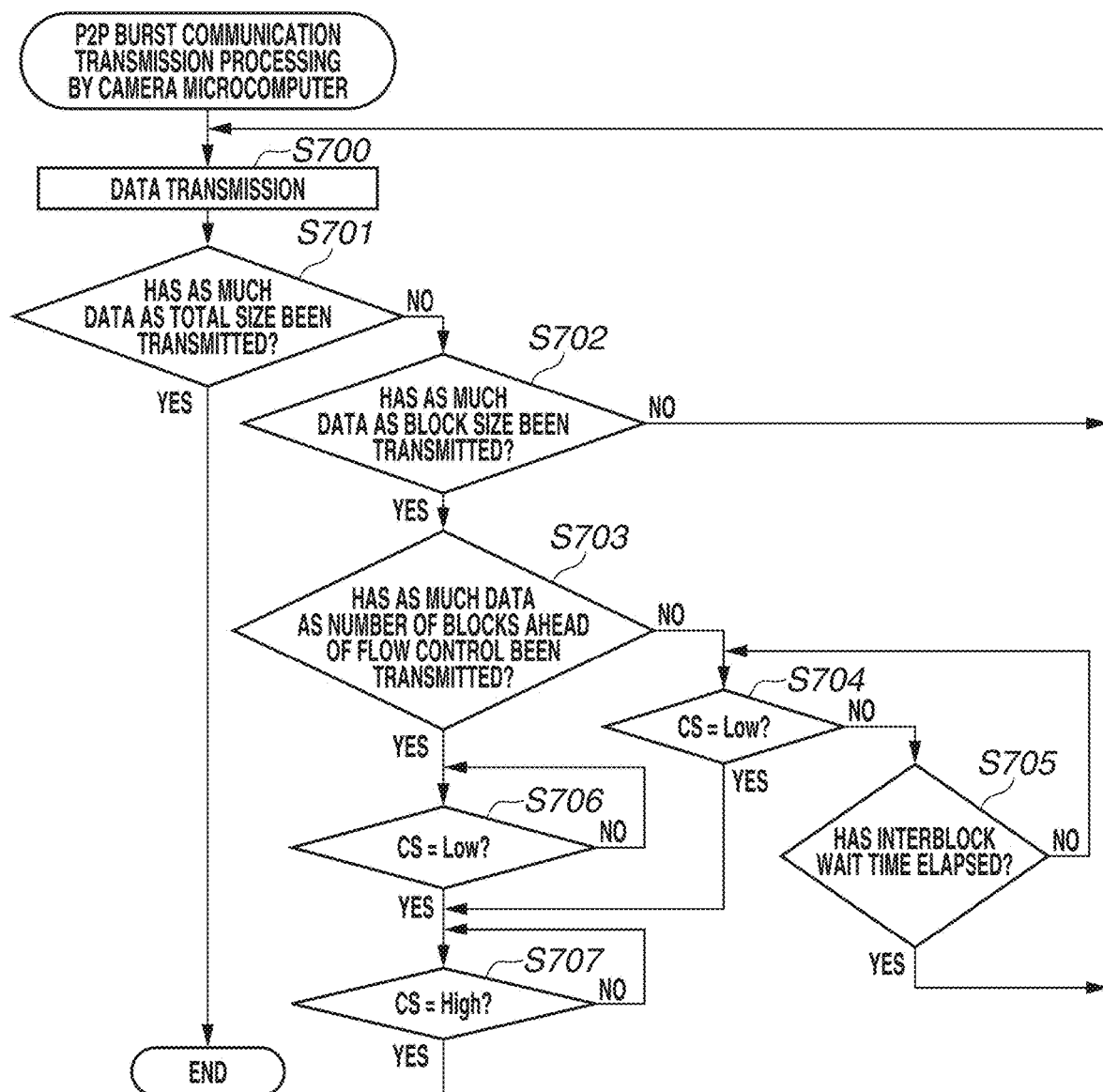
FIG. 15 is a flowchart for describing a communication procedure of the communication master in master-initiated P2P burst communication.

FIG. 14 is a diagram illustrating master-initiated P2P burst communication waveforms in transferring data from the camera microcomputer 205 to the adaptor microcomputer 302, i.e., in a reverse direction to that of FIG. 11. In the following description, the camera microcomputer 205 specifies the adaptor microcomputer 302 as the communication partner of P2P communication ([1]) by broadcast communication. The camera microcomputer 205 then transmits data ([2]) and the adaptor microcomputer 302 sends a reply ([3]) by P2P communication. The camera microcomputer 205 then transfers data ([4]) by master-initiated P2P burst communication, and the adaptor microcomputer 302 returns a result to the camera microcomputer 205 ([5]).

Since the processing for specifying the communication partner of P2P communication and the P2P communication are performed as described with reference to FIG. 6, a description thereof will be omitted. Burst communication information for use in master-initiated P2P burst communication to be performed afterward is shared by this P2P communication. The burst communication information for master-initiated P2P burst communication according to the present exemplary embodiment is similar to that for slave-initiated P2P burst communication. The burst communication information includes a block size, an interblock wait time, the number of blocks ahead of flow control, and a total size.

For example, the block size according to the present exemplary embodiment is the size of data that the adaptor microcomputer 302, or receiver of master-initiated P2P burst communication, can continuously receive. In the present exemplary embodiment, the block size is eight bytes.

The interblock wait time according to the present exemplary embodiment refers to a time from the completion of reception of a block to when the adaptor microcomputer 302, or receiver of master-initiated P2P burst communication, becomes ready to receive the next block. In the present exemplary embodiment, the interblock wait time is 150 µs. Note that in the present exemplary embodiment, the transmission of each block is always followed by flow control, and the interblock wait time is therefore not used.

The number of blocks ahead of flow control according to the present exemplary embodiment refers to an interval for the adaptor microcomputer 302, or receiver of the master-initiated P2P burst communication, to secure time for processing other than the master-initiated P2P burst communication. The number of blocks ahead of flow control is one. In other words, the transmission of one block is always followed by flow control.

The total size refers to the size of data for the camera microcomputer 205, or sender of master-initiated P2P burst communication, to transfer by the master-initiated P2P burst communication.

Next, the camera microcomputer 205 transfers data by master-initiated P2P burst communication, after the completion of which the adaptor microcomputer 302 sends a reply.

Specifically, the adaptor microcomputer 302 sends a reply to the P2P communication for sharing the burst communication information, and makes preparations for the reception of master-initiated P2P burst communication. After the reception preparations are completed, the adaptor microcomputer 302 cancels the standby request for data transmission by using the signal line CS.

After receiving the cancellation of the standby request from the adaptor microcomputer 302, the camera microcomputer 205 starts master-initiated P2P burst communication and initially transmits one block of data, i.e., as much as the block size of eight bytes. Since the number of blocks ahead of flow control is one, the camera microcomputer 205 waits for the flow control by the adaptor microcomputer 302 after the transmission of one block without waiting the interblock wait time.

The adaptor microcomputer 302 completes receiving one block of data, i.e., as much as the number of blocks ahead of flow control, and notifies the camera microcomputer 205 of suspension of reception and a standby request for next data transmission by using the signal line CS. The adaptor microcomputer 302 then completes preparations for the reception of master-initiated P2P burst communication, and cancels the standby request for data transmission, which means cancellation of the flow control, by using the signal line CS.

The camera microcomputer 205 and the adaptor microcomputer 302 perform the foregoing flow control processing until as much data as the total size has been transferred.

The adaptor microcomputer 302 completes receiving as much data as the total size, and waits for a notification made by the camera microcomputer 205 via the signal line CS of an end of transmission and a standby request for next data transmission.

The camera microcomputer 205 completes transmitting as much data as the total size, notifies the adaptor microcomputer 302 of the end of transmission and a standby request for next data transmission via the signal line CS, and then cancels the standby request for data transmission.

The adaptor microcomputer 302 receives the notification made by the camera microcomputer 205 via the signal line CS of the end of transmission and the cancellation of the standby request for next data transmission, and transmits a reception result of the master-initiated P2P burst communication. The adaptor microcomputer 302 then makes a notification of an end of transmission and a standby request for next data transmission by using the signal line CS, and cancels the standby request for next data transmission. This ends the master-initiated P2P burst communication.

<Procedures for Master-Initiated P2P Burst Communication>

Communication procedures for master-initiated P2P burst communication will be described with reference to FIGS. 15 and 16. FIG. 15 is a flowchart for describing a communication procedure of the camera microcomputer 205, or communication master, in master-initiated P2P burst communication.

In step S700, the camera microcomputer 205 starts data transmission.

In step S701, the camera microcomputer 205 determines whether as much data as the total size has been transmitted. If as much data has been transmitted (YES in step S701), the processing ends. If not as much data has been transmitted (NO in step S701), the processing proceeds to step S702.

In step S702, the camera microcomputer 205 determines whether as much data as the block size has been transmitted. If as much data has been transmitted (YES in step S702), the processing proceeds to step S703. If not as much data has been transmitted (NO in step S702), the processing proceeds to step S700.

In step S703, the camera microcomputer 205 determines whether as much data as the number of blocks ahead of flow control has been transmitted. If as much data has been transmitted (YES in step S703), the processing proceeds to step S706. If not as much data has been transmitted (NO in step S703), the processing proceeds to step S704.

In step S704, the camera microcomputer 205 determines whether the signal level of the signal line CS is Low. If the signal level is Low (YES in step S704), the processing proceeds to step S707. If the signal level is not Low (NO in step S704), the processing proceeds to step S705.

In step S705, the camera microcomputer 205 determines whether the interblock wait time has elapsed. If the interblock wait time has elapsed (YES in step S705), the processing proceeds to step S700. If the interblock wait time has not elapsed (NO in step S705), the processing proceeds to step S704.

In step S706, the camera microcomputer 205 determines whether the signal level of the signal line CS is Low. If the signal level is Low (YES in step S706), the processing proceeds to step S707. If the signal level is not Low (NO in step S706), the processing returns to step S706 and the camera microcomputer 205 repeats the determination.

In step S707, the camera microcomputer 205 determines whether the signal level of the signal line CS is Hi. If the signal level is Hi (YES in step S707), the processing proceeds to step S700. If the signal level is not Hi (NO in step S707), the processing returns to step S707 and the camera microcomputer 205 repeats the determination.

Figure 16:
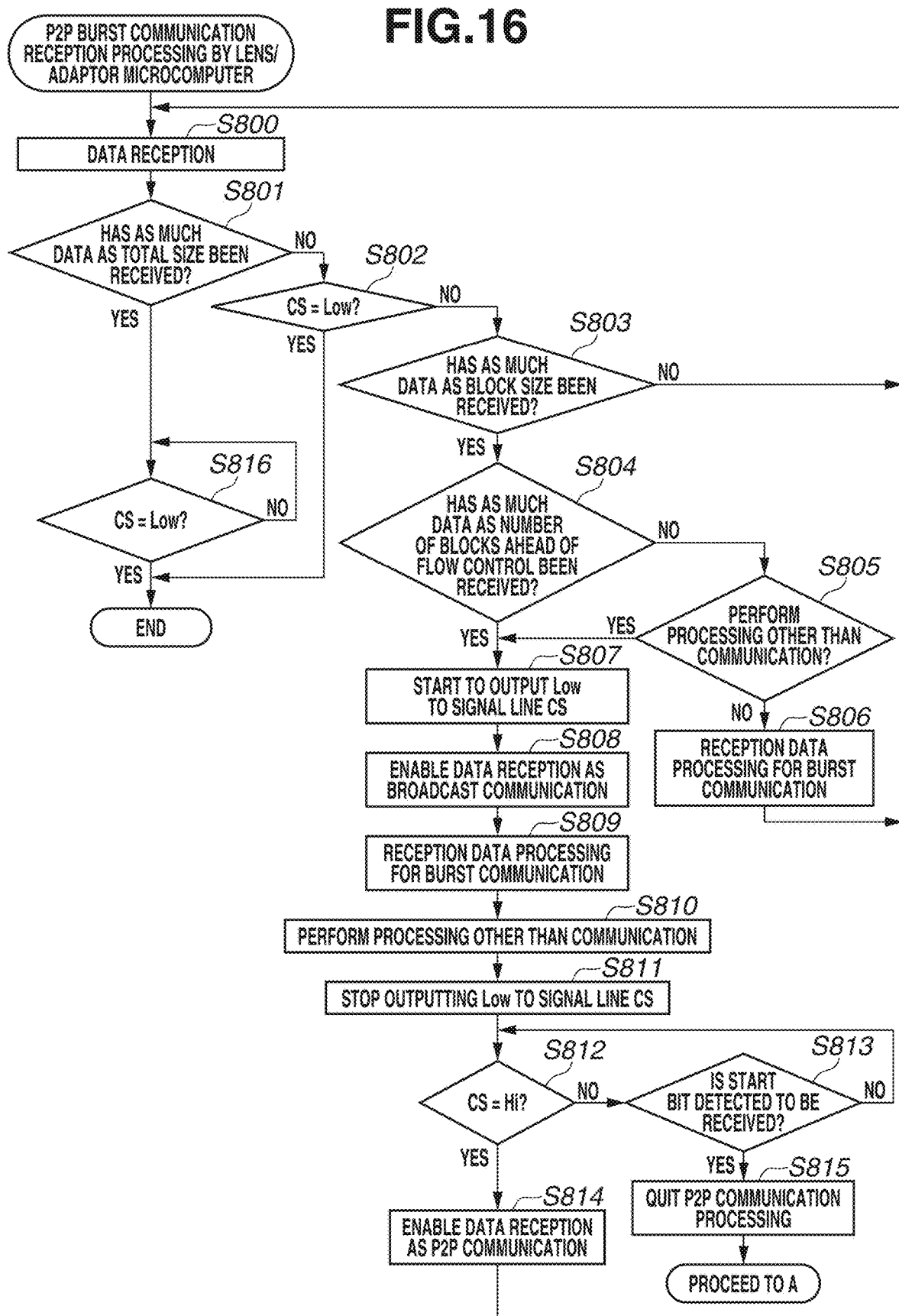
FIG. 16 is a flowchart for describing a communication procedure of a communication slave in master-initiated P2P burst communication.

FIG. 16 is a flowchart for describing the communication procedure of the adaptor microcomputer 302, or communication slave, in master-initiated P2P burst communication.

Details of the master-initiated P2P burst communication reception processing by the adaptor microcomputer 302 will now be described with reference to FIG. 16. Since the communication procedure of the lens microcomputer 111 is almost the same as that of the adaptor microcomputer 302, a description thereof will be omitted in the present exemplary embodiment.

In step S800, the adaptor microcomputer 302 performs data reception processing.

In step S801, the adaptor microcomputer 302 determines whether as much data as the total size has been received. If as much data has been received (YES in step S801), the processing proceeds to step S816. If not as much data has been received (NO in step S801), the processing proceeds to step S802.

In step S802, the adaptor microcomputer 302 determines whether the signal level of the signal line CS is Low. If the signal level is Low (YES in step S802), the processing ends. If the signal level is not Low (NO in step S802), the processing proceeds to step S803.

In step S803, the adaptor microcomputer 302 determines whether as much data as the block size has been received. If as much data has been received (YES in step S803), the processing proceeds to step S804. If not as much data has been received (NO in step S803), the processing proceeds to step S800.

In step S804, the adaptor microcomputer 302 determines whether as much data as the number of blocks ahead of flow control has been received. If as much data has been received (YES in step S804), the processing proceeds to step S807. If not as much data has been received (NO in step S804), the processing proceeds to step S805.

In step S805, the adaptor microcomputer 302 determines whether to perform processing other than communication. If processing other than communication is to be performed (YES in step S805), the processing proceeds to step S807. If no processing other than communication is to be performed (NO in step S805), the processing proceeds to step S806.

In step S806, the adaptor microcomputer 302 performs reception data processing for burst communication. The processing proceeds to step S800. This reception data processing is processing for saving the received data to enable reception of the next block. The reception data processing is desirably completed within the foregoing interblock wait time.

In step S807, the adaptor microcomputer 302 turns on (connects) the GND switch 2081 to start outputting Low to the signal line CS.

In step S808, the adaptor microcomputer 302 enables data reception from the signal line DATA as broadcast communication.

In step S809, the adaptor microcomputer 302 performs reception data processing similar to that of step S806.

In step S810, the adaptor microcomputer 302 performs the processing other than communication.

In step S811, the adaptor microcomputer 302 turns off (disconnects) the GND switch 2081 to stop outputting Low to the signal line CS.

In step S812, the adaptor microcomputer 302 determines whether the signal level of the signal line CS is Hi. If the signal level is Hi (YES in step S812), the processing proceeds to step S814. If the signal level is not Hi (NO in step S812), the processing proceeds to step S813.

In step S813, the adaptor microcomputer 302 determines whether the start bit ST is detected to be received from the signal line DATA. If the start bit ST is detected to be received (YES in step S813), the processing proceeds to step S815. If the start bit ST is not detected to be received (NO in step S813), the processing proceeds to step S812.

In step S814, the adaptor microcomputer 302 enables data reception from the signal line DATA as P2P communication.

In step S815, the adaptor microcomputer 302 quits the P2P communication processing. The processing then proceeds to step S205 of FIG. 8 to perform broadcast communication.

An operation of the lens microcomputer 111 while the camera microcomputer 205 and the adaptor microcomputer 302 are performing master-initiated P2P burst communication is similar to that performed during slave-initiated P2P burst communication. A description thereof will thus be omitted.

As described above, in the present exemplary embodiment, the camera system that performs communication using two lines, namely, the signal lines CS and DATA can implement master-initiated P2P burst communication with a small number of signal lines.

As illustrated in FIG. 14, processing using only the flow control via the signal line CS without the interblock wait time may be employed. In such a case, flow control can be performed each time the receiver has received as much data as the reception buffer size by specifying the number of blocks ahead of flow control to be one. This enables P2P burst communication using flow control even if the processing time of the processing for the receiver to save the reception data can vary from some reason, i.e., if the interblock wait time is not definable.

Alternatively, communication using only the interblock wait time-based control without flow control may be employed. For example, communication not using flow control can be implemented by specifying the number of blocks ahead of flow control to be zero. In such a case, the determination whether as much data as the number of blocks ahead of flow control has been communicated can always be negative at the conditional branches in step S504 of FIG. 12, step S603 of FIG. 13, step S703 of FIG. 15, and step S804 of FIG. 16.

Figure 12:
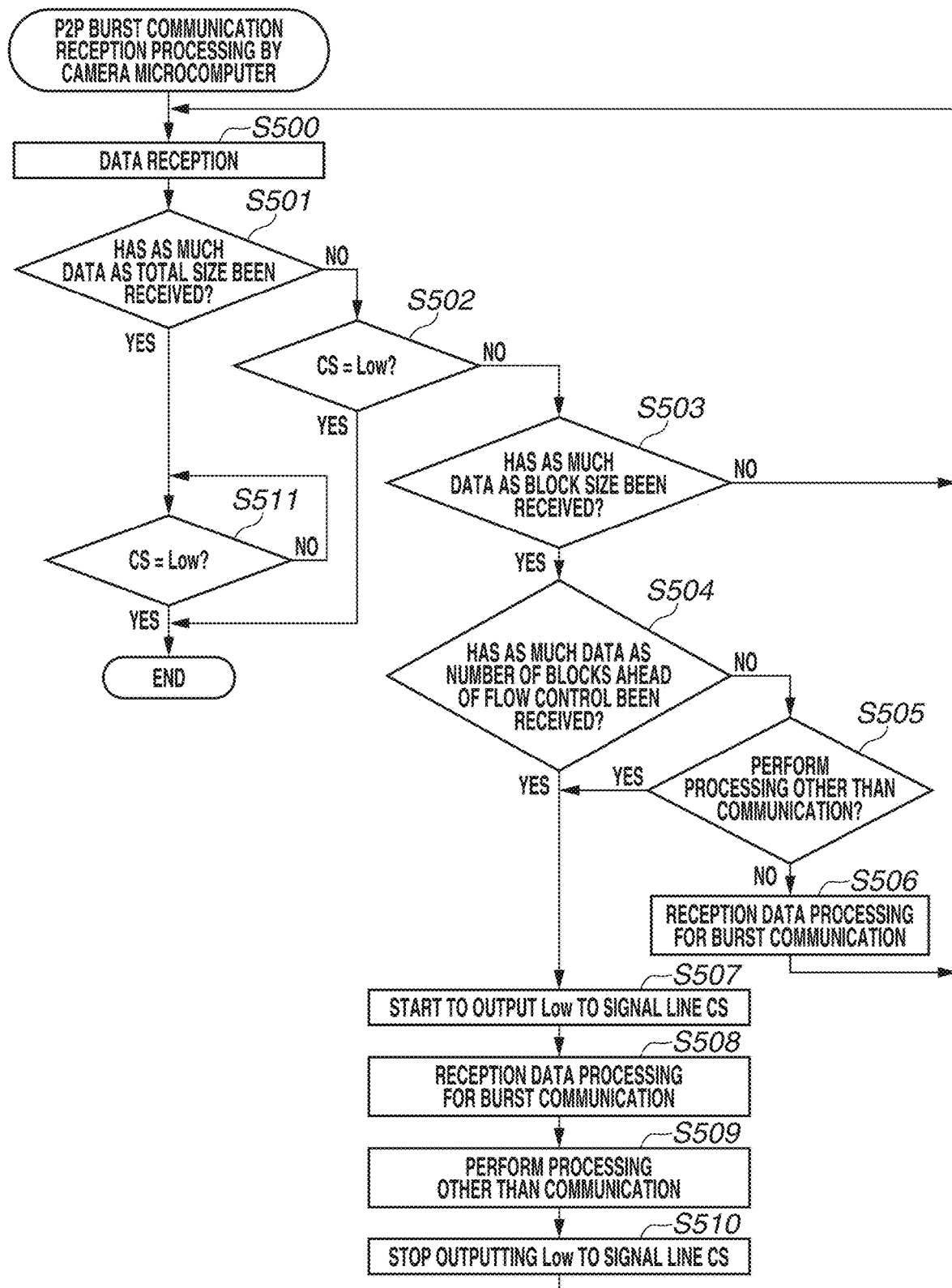
FIG. 12 is a flowchart for describing a communication procedure of the communication master in slave-initiated P2P burst communication.

Moreover, if processing other than communication is determined to be performed as illustrated in step S505 of FIG. 12 and step S805 of FIG. 16, the signal line CS is set to Low at the timing of the processing based on the interblock wait time. If the Low state of the signal line CS is detected in the processing for waiting the interblock wait time as illustrated in step S604 of FIG. 13 and the step S704 of FIG. 15, the sender of the P2P burst communication enters the processing for flow control using the signal line CS. In such a manner, flow control can be performed to secure time for the processing other than communication, if processing other than communication is determined to be performed at the timing of the interblock wait time-based processing.

In the present exemplary embodiment, the communication slave in P2P communication mode waits for the reception of broadcast communication while receiving a control signal indicating a standby request after data transmission, i.e., while the signal level of the signal line CS is Low. Specifically, as described in steps S404 and S415 of FIG. 10A, step S609 of FIG. 13, and step S808 of FIG. 16, the communication slave enables data reception from the signal line DATA as broadcast communication. As described in steps S407 and S418 of FIG. 10B, step S611 of FIG. 13, and step S813 of FIG. 16, the communication slave then determines whether data is received while data reception is enabled. If data is received, the communication slave can quit the P2P communication processing and enter the broadcast communication mode as described in step S420 of FIG. 10B, step S613 of FIG. 13, and step S815 of FIG. 16.

The camera microcomputer 205 can sometimes detect a discrepancy in the recognition of communication timing with the adaptor microcomputer 302 and the lens microcomputer 111 due to, for example, communication noise. In such a case, the camera microcomputer 205 can retry communication by using broadcast communication even in the process of P2P burst communication by the foregoing processing.

Figure 17:
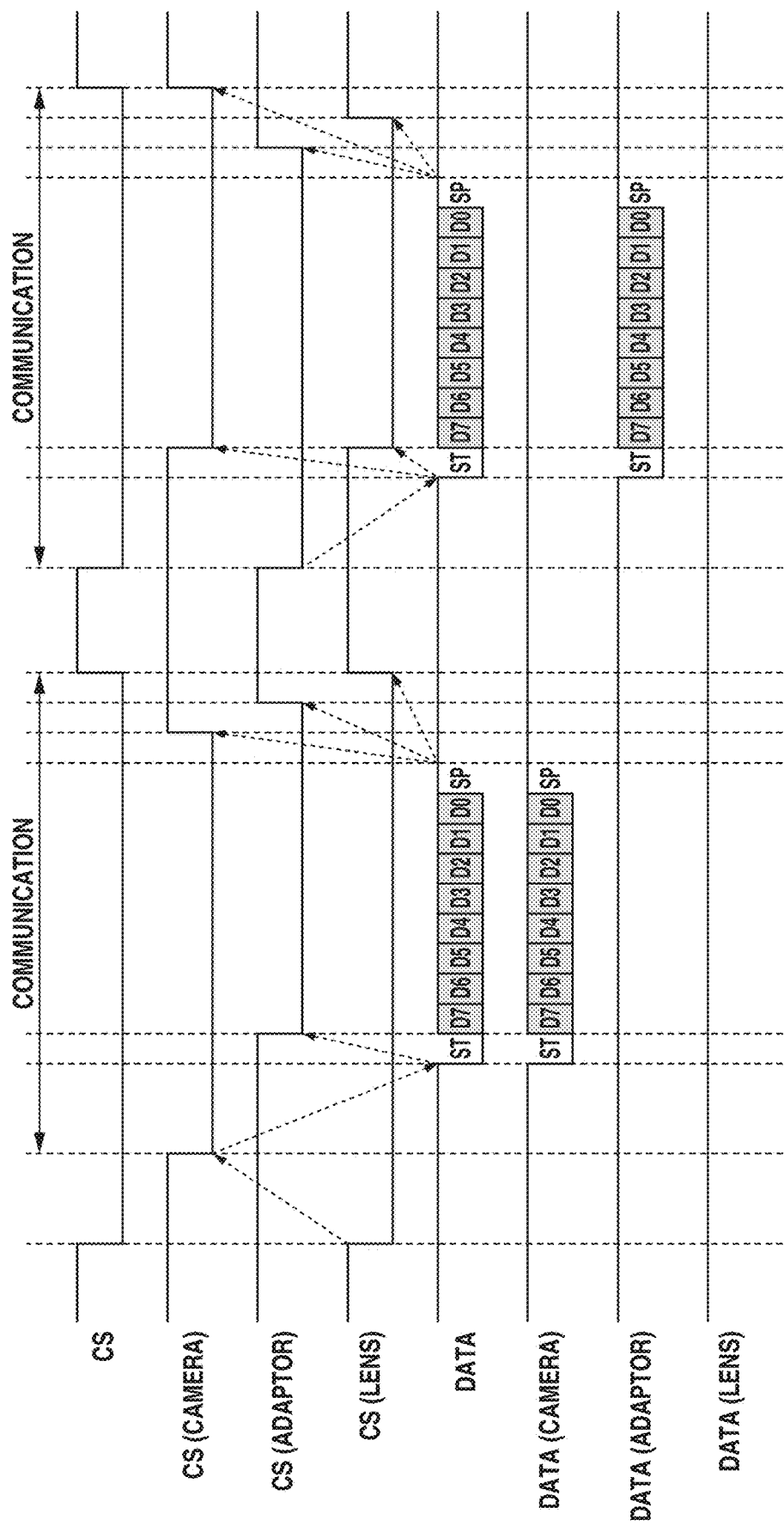
FIG. 17 is a diagram illustrating communication waveforms in broadcast communication.

Situations where the lens microcomputer 111 and the adaptor microcomputer 302, or communication slaves, start broadcast communication will now be described with reference to FIG. 17. FIG. 17 is a diagram illustrating signal waveforms in broadcast communication. That a communication slave starts broadcast communication will be referred to as a communication request. With broadcast communication from the camera microcomputer 205 to the communication slaves suspended, a communication request refers to that a communication slave resumes the broadcast communication on its own initiative. With communication from the camera microcomputer 205 to a communication slave suspended, a communication request to the camera microcomputer 205 is made when the communication slave resumes the communication with the camera microcomputer 205 on its own initiative. As an example, a case where the lens microcomputer 111 makes a notification of a start of broadcast communication, the camera microcomputer 205 performs broadcast communication, and the adaptor microcomputer 302 performs broadcast communication in response will be described.

Initially, the lens microcomputer 111 starts to output Low to the signal line CS to notify the camera microcomputer 205 and the adaptor microcomputer 302 of a start of broadcast communication. Next, the camera microcomputer 205 detects that the signal level of the signal line CS becomes Low, and starts to output Low to the signal line CS. At this point in time, the signal level of the signal CS remains unchanged since the lens microcomputer 111 has already started outputting Low to the signal line CS.

Next, the camera microcomputer 205 outputs data to be transmitted to the signal line DATA. Meanwhile, the adaptor microcomputer 302 starts to output Low to the signal ling CS at timing when the start bit ST input from the signal line DATA is detected. At this point in time, the signal level of the signal line CS remains unchanged since the camera microcomputer 205 has already started outputting Low to the signal line CS.

The camera microcomputer 205 completes outputting the data up to the stop bit SP, and stops outputting Low to the signal line CS. The lens microcomputer 111 and the adaptor microcomputer 302 receive the data input from the signal line DATA up to the stop bit SP, and then analyze the received data and perform internal processing linked with the received data. The lens microcomputer 111 and the adaptor microcomputer 302 then make preparations to receive next data, and stop outputting Low to the signal line CS. As described above, the signal level of the signal line CS becomes Hi when the camera microcomputer 205, the lens microcomputer 111, and the adaptor microcomputer 302 all stop outputting Low to the signal line CS. By checking that the signal level of the signal line CS is Hi, all the microcomputers can determine that the processing related to the current communication has been ended and preparations for next communication have been made.

After checking that the signal level of the signal line CS is restored to Hi, the adaptor microcomputer 302 starts to output Low to the signal line CS to notify the camera microcomputer 205 and the lens microcomputer 111 of a start of broadcast communication. The adaptor microcomputer 302 then outputs data to be transmitted to the signal line DATA. Meanwhile, the camera microcomputer 205 and the lens microcomputer 111 start to output Low to the signal line CS at timing when the start bit ST input from the signal line DATA is detected. At this point in time, the signal level of the signal line CS remains unchanged since the adaptor microcomputer 302 has already started outputting Low to the signal line CS.

The adaptor microcomputer 302 finishes outputting the data up to the stop bit SP, and then stops outputting Low to the signal line CS. Meanwhile, the camera microcomputer 205 and the lens microcomputer 111 receive the data input from the signal line DATA up to the stop bit SP, and then analyze the received data and perform internal processing linked with the received data. The camera microcomputer 205 and the lens microcomputer 111 then make preparations to receive next data, and stop outputting Low to the signal line CS.

Note that the lens microcomputer 111 and the adaptor microcomputer 302, or communication slaves, start broadcast communication only if the camera microcomputer 205, the lens microcomputer 111, and the adaptor microcomputer 302 are all in the broadcast communication mode.

If broadcast communication is started by a communication slave, the camera microcomputer 205, or communication master, is unable to determine which has turned the signal line CS to Low, the lens microcomputer 111 or the adaptor microcomputer 302. The camera microcomputer 205 therefore desirably performs communication with both the lens microcomputer 111 and the adaptor microcomputer 302 to obtain information about whether they have started the broadcast communication.

The timing at which the camera microcomputer 205 outputs Low to the signal line CS to start broadcast communication and the timing at which a communication slave outputs Low to the signal line CS to start broadcast communication can sometimes coincide. In such a case, the camera microcomputer 205 is unable to detect that the communication slave has output Low to the signal line CS. The camera microcomputer 205 can therefore be configured to issue a permission notification for permitting the communication slaves to start broadcast communication.

As described above, in the present exemplary embodiment, a communication slave in the camera system that performs communication using two lines, i.e., the signal lines CS and DATA can start the broadcast communication mode. This eliminates the need for the camera microcomputer 205 to continue communicating with the lens microcomputer 111 and the adaptor microcomputer 302 all the time. Useless communication can thus be inhibited to reduce communication traffic.

The burst communication information according to the present exemplary embodiment is described to include the block size, the interblock wait time, the number of blocks ahead of flow control, and the total size. However, this is not restrictive.

The interblock wait time and the number of blocks ahead of flow control do not need to be shared if the employed communication protocol involves processing using only the flow control via the signal line CS without the interblock wait time. Similarly, the number of blocks ahead of flow control does not need to be shared if only the interblock wait time-based control is used without flow control.

The foregoing values do not need to be directly shared, as long as values equivalent to such parameters can be shared among the microcomputers. For example, the number of bytes ahead of flow control can be shared instead of the number of blocks ahead of flow control, in which case the number of blocks ahead of flow control can be calculated based on the block size. Similarly, the total number of blocks can be shared instead of the total size, in which case a value equivalent to the total size can be calculated based on the block size. The burst communication information may be shared in terms of function-indicating identifiers (IDs) or communication generations.

Other information may be added to the burst communication information. For example, communication settings, such as the communication rate of P2P burst communication and the presence or absence of parity check, may be additionally shared. Parameters for identifying data to be transmitted by P2P burst communication, such as values for identifying the type of interchangeable lens 100 and the type of camera main body 200 and commands linked with obtained data, may be added. Parameters for checking communication reliability of data transmitted by P2P burst communication, such as a check sum, a cyclic redundancy check (CRC), and a hash value, may be shared in advance.

The burst communication information according to the present exemplary embodiment is described to be shared by P2P communication before P2P burst communication. However, this is not restrictive. For example, such information may defined as a communication protocol in advance. The camera microcomputer 205 may also notify the adaptor microcomputer 302 of the information by broadcast communication. The information may be shared by using other communication lines.

Effects of First Exemplary Embodiment

Suppose, for example, that the camera main body 200 and the accessory apparatuses transmit and receive optical information at the startup of the camera system. In such a case, processing other than the transmission and reception processing is also performed in parallel during startup. Examples include communication processing with the interchangeable lens 100 through another communication path to be described below, initialization processing on actuators of the accessory apparatuses, and startup processing for various members of the camera main body 200. Since the transmission and reception processing and various other types of processing are performed in parallel and their processing times affect the startup time, a greater amount of data is desirably obtained in a shorter time.

In transferring an enormous amount of data in a collective manner, the receiver desirably controls its reception buffer to not overflow. For example, if the camera main body 200 receives an enormous amount of data by using the first communication method or the second communication method, the camera main body 200 can request data in units of a size receivable in one session of reception processing. This gives rise to an issue of increased transfer time due to repetition of the data request and the reception processing.

By contrast, the third communication method according to the present exemplary embodiment is configured such that data is received from the accessory apparatuses by unidirectional communication using an interblock wait and flow control. A greater amount of data can thereby be obtained in a shorter time.

A second exemplary embodiment of the present invention will be described in detail below with reference to the drawings. A difference from the first exemplary embodiment is that flow control is performed by using the signal line DATA, not the signal line CS. In the drawings, similar members are designated by the same reference numerals, and a redundant description will be omitted. A description of components similar to those of the first exemplary embodiment will also be omitted.

Figure 18:
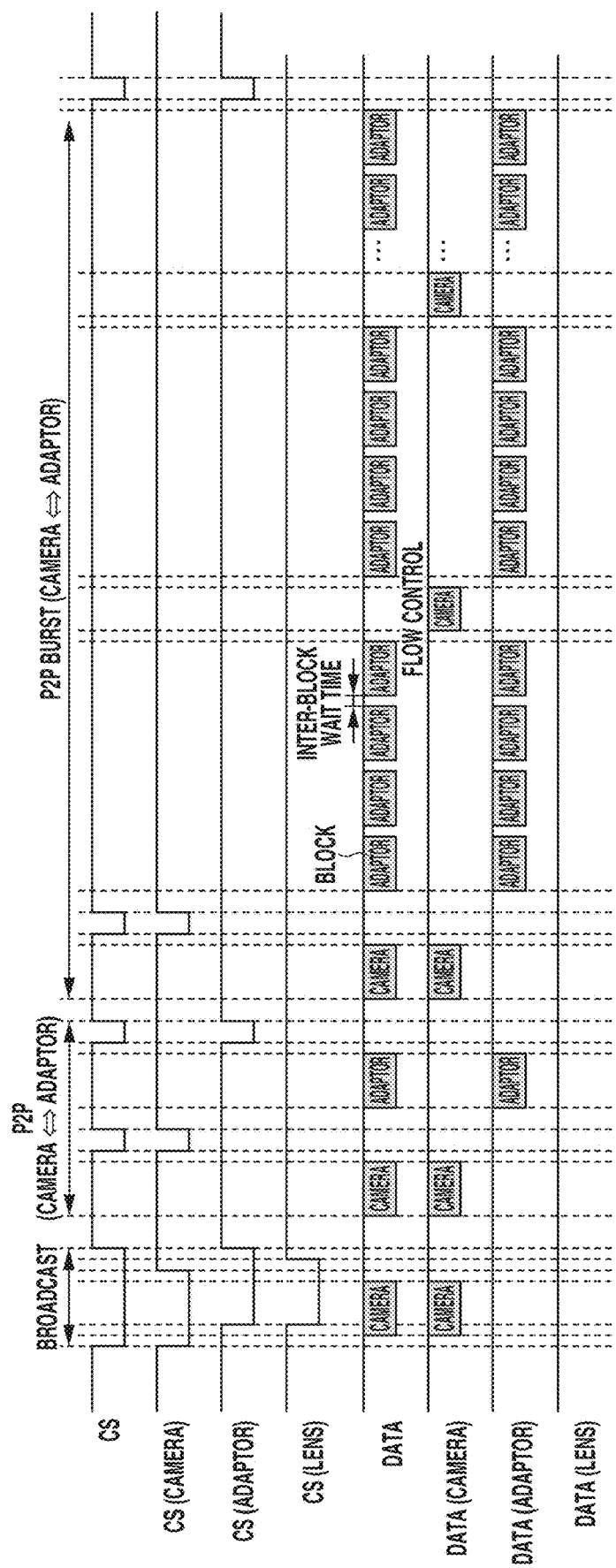
FIG. 18 is a diagram illustrating communication waveforms in slave-initiated P2P burst communication.

FIG. 18 is a diagram illustrating communication waveforms in slave-initiated P2P burst communication where the adaptor microcomputer 302 transfers data to the camera microcomputer 205. Unlike FIG. 11 of the first exemplary embodiment where the flow control is performed by using the signal line CS, the flow control in the present exemplary embodiment is performed by using the signal line DATA.

Suppose that the camera microcomputer 205 outputs two bytes of value to the signal line DATA for flow control, with the first byte corresponding to a fall of the signal line CS in the first exemplary embodiment and the second byte a rise of the signal line CS.

Figure 19:
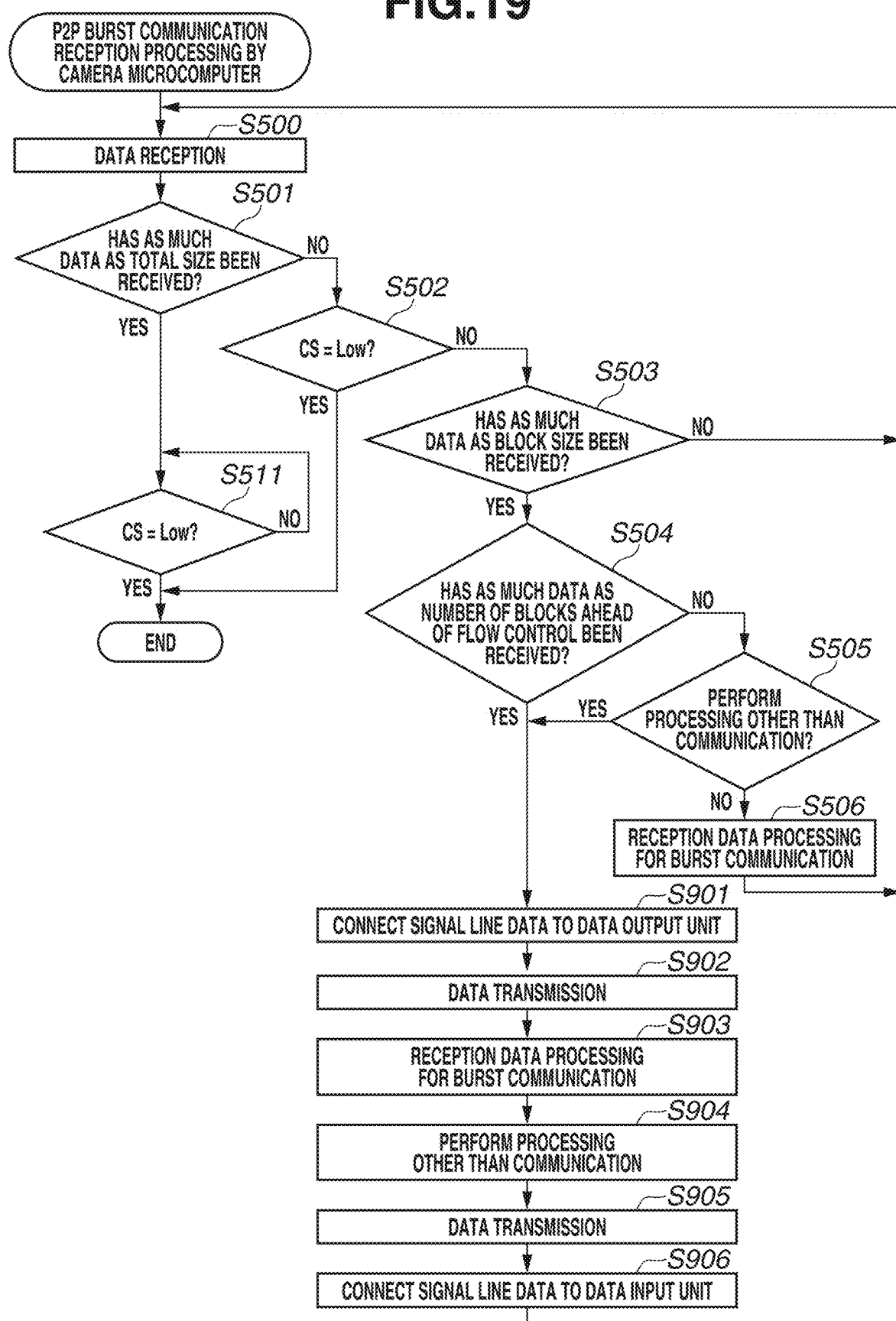
FIG. 19 is a flowchart for describing a communication procedure of the communication master in slave-initiated P2P burst communication.

Next, details of slave-initiated P2P burst communication reception processing by the camera microcomputer 205 will be described with reference to FIG. 19. Processes similar to those of FIG. 12 according to the first exemplary embodiment are designated by the same step numbers, and a description thereof will be omitted.

In step S901, the camera microcomputer 205 operates the input/output selection switch 2082 to connect the signal line DATA to the data output unit of the camera microcomputer 205.

In step S902, the camera microcomputer 205 outputs one byte of data.

In step S903, the camera microcomputer 205 performs reception data processing similar to that of step S506 in FIG. 12.

In step S904, the camera microcomputer 205 performs processing other than communication similar to that of step S509 in FIG. 12.

In step S905, the camera microcomputer 205 transmits one byte of data.

In step S906, the camera microcomputer 205 operates the input/output selection switch 2082 to connect the signal line DATA to the data input unit of the camera microcomputer 205.

Figure 20:
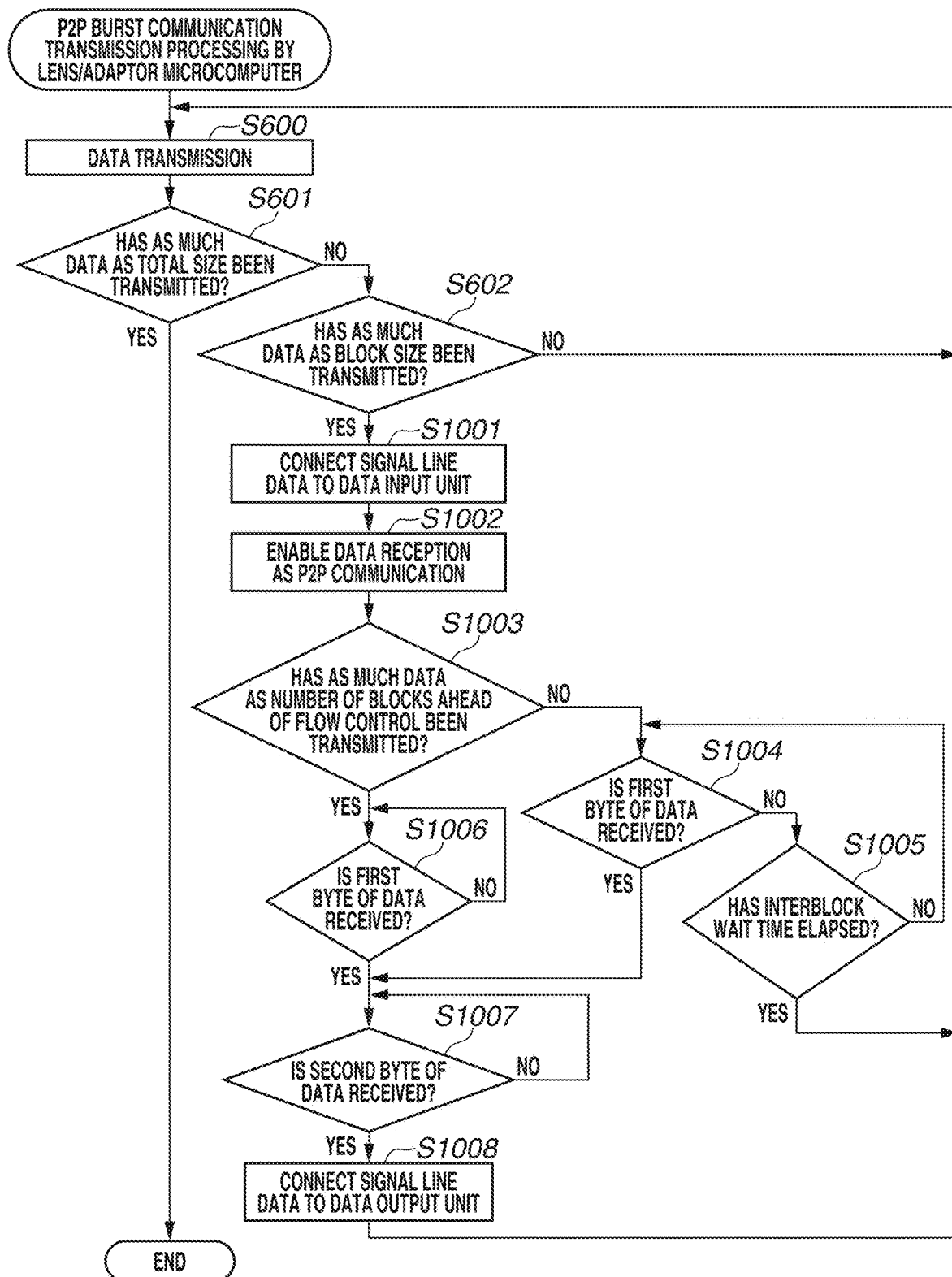
FIG. 20 is a flowchart for describing a communication procedure of a communication slave in slave-initiated P2P burst communication.

Next, details of slave-initiated P2P burst communication transmission processing by the adaptor microcomputer 302 will be described with reference to FIG. 20. Processes similar to those of FIG. 13 according to the first exemplary embodiment are designated by the same step numbers, and a description thereof will be omitted.

In step S1001, the adaptor microcomputer 302 operates the input/output selection switch 3032 to connect the signal line DATA to the data input unit of the adaptor microcomputer 302.

In step S1002, the adaptor microcomputer 302 enables data reception from the signal line DATA as P2P communication.

In step S1003, the adaptor microcomputer 302 determines whether as much data as the number of blocks ahead of flow control has been transmitted. If as much data has been transmitted (YES in step S1003), the processing proceeds to step S1006. If not as much data has been transmitted (NO in step S1003), the processing proceeds to step S1004.

In step S1004, the adaptor microcomputer 302 determines whether the first byte of data has been received. If the first byte of data has been received (YES in step S1004), the processing proceeds to step S1007. If the first byte of data has not been received (NO in step S1004), the processing proceeds to step S1005.

In step S1005, the adaptor microcomputer 302 determines whether the interblock wait time has elapsed. If the interblock wait time has elapsed (YES in step S1005), the processing proceeds to step S600. If the interblock wait time has not elapsed (NO in step S1005), the processing proceeds to step S1004.

In step S1006, similarly to step S1004, the adaptor microcomputer 302 determines whether the first byte of data has been received. If the first byte of data has been received (YES in step S1006), the processing proceeds to step S1007. If the first byte of data has not been received (NO in step S1006), the processing returns to step S1006 and the adaptor microcomputer 302 repeats the determination.

In step S1007, the adaptor microcomputer 302 determines whether the second byte of data has been received. If the second byte of data has been received (YES in step S1007), the processing proceeds to step S1008. If the second byte of data has not been received (NO in step S1007), the processing returns to step S1007 and the adaptor microcomputer 302 repeats the determination.

In step S1008, the adaptor microcomputer 302 operates the input/output selection switch 3032 to connect the signal line DATA to the data output unit of the adaptor microcomputer 302.

As described above, in the present exemplary embodiment, the flow control can be performed by using the signal line DATA in slave-initiated P2P burst communication.

As described in the first exemplary embodiment, the notification using the signal line CS also reaches the communication slave that is not the communication partner of P2P burst communication, like the lens microcomputer 111, and can affect operation. By contrast, in the present exemplary embodiment, P2P burst communication is performed without turning the signal line CS to Low. P2P burst communication can thus be performed without affecting the communication slave that is not the communication partner of the P2P burst communication, like the lens microcomputer 111.

Note that since the camera microcomputer 205 and the adaptor microcomputer 302 switch and use the output of the signal line DATA without the intervention of a notification using the signal line CS, the outputs to the signal line DATA are desirably prevented from conflicting with each other. Specifically, the adaptor microcomputer 302 desirably connects the signal line DATA to its data input unit in step S1001 of FIG. 20 before the camera microcomputer 205 connects the signal line DATA to its data output unit in step S901 of FIG. 19. Similarly, the camera microcomputer 205 desirably connects the signal line DATA to its data input unit in step S906 of FIG. 19 before the adaptor microcomputer 302 connects the signal line DATA to its data output unit in step S1008 of FIG. 20. In step S901 of FIG. 19 and step S1008 of FIG. 20, the processing for connecting the signal line DATA to the respective data output units are therefore desirably performed after waiting for a certain amount of time.

In the present exemplary embodiment, two bytes of data is described to be transmitted through the signal line DATA as flow control. However, this is not restrictive. The flow control can be performed by setting the signal line DATA to Low and then to Hi as with the signal line CS of the first exemplary embodiment.

Moreover, the flow control performed by using two bytes of data may be shortened to one byte in a case where the execution of processing other than communication does not desirably be taken into account at the timing of the interblock wait time-based processing. This case corresponds to a case where no determination is made by step S505 of FIG. 19. Specifically, since the conditional branch processing of step S1004 in FIG. 20 is not needed, the adaptor microcomputer 302, or sender of P2P burst communication, determines whether one byte of data has been received as a common process combining steps S1006 and S1007. In such a case, the camera microcomputer 205, or receiver, can omit step S902 as well as the determination in step S505 of FIG. 19.

The flow control using the signal line DATA is also similarly performed in master-initiated P2P burst communication. A description thereof will thus be omitted.

A third exemplary embodiment describes a procedure for receiving data from an accessory apparatus by using P2P burst communication (third communication method). Communication via the signal lines CS and DATA will be referred to as first communication. The present exemplary embodiment further includes a configuration for second communication. In the drawings, similar members are designated by the same reference numerals, and a redundant description will be omitted. A description of components similar to those of the first and second exemplary embodiments will also be omitted.

<Second Communication (FIGS. 23A and 23B)>

The second communication will be described with reference to FIGS. 23A and 23B. The second communication is a communication channel intended mainly for communication between the camera main body 200 and the interchangeable lens 100.

FIG. 23A illustrates a configuration for performing the second communication. In the present exemplary embodiment, clock synchronous communication is performed as second communication, whereas asynchronous communication may be performed instead. The mounts 401, 402, 403, and 404 respectively include LCLK terminals 401c, 402c, 403c, and 404c that are terminals of a clock line LCLK output from the camera second communication unit 209. In the present exemplary embodiment, the mounts 401, 402, 403, and 404 also include DCL terminals 401d, 402d, 403d, and 404d that are terminals of a data line DCL output from the camera second communication unit 209 in clock synchronous communication. The mounts 401, 402, 403, and 404 also include second communication DLC terminals 401e, 402e, 403e, and 404e that are terminals of a data line DLC output from the lens second communication unit 132 in clock synchronous communication.

As illustrated in FIG. 23A, the clock line LCLK and the data line DCL are pulled up in the interchangeable lens 100. The clock line LCLK and the data line DLC are pulled up in the camera main body 200.

The terminals 402c, 402d, and 402e and the terminals 403c, 403d, and 403e of the clock line LCLK, the data line DCL, and the data line DLC are respectively short-circuited inside the intermediate adaptor 300.

FIG. 23B illustrates waveforms of the clock line LCLK, the data line DCL, and the data line DLC during the second communication. The camera second communication unit 209 outputs a clock to the clock line LCLK, and outputs eight bits of data B7 to B0 to the data line DCL in synchronization with rising signals on the clock link LCLK. Similarly, the lens second communication unit 132 outputs eight bits of data B7 to B0 to the data line DLC in synchronization with the rising signals on the clock line LCLK. Moreover, the camera second communication unit 209 receives the eight bits of data B7 to B0 on the data line DLC in synchronization with rising signals on the clock line LCLK. Similarly, the lens second communication unit 132 receives the eight bits of data B7 to B0 on the data line DLC in synchronization with rising signals on the clock line LCLK. In such a manner, the camera second communication unit 209 and the lens second communication unit 132 can exchange communication data with each other. After receiving the eight bits of data B7 to B0 on the data line DCL, the lens second communication unit 132 outputs Low to the clock line LCLK for time Tbusy, and then stops outputting Low. The interchangeable lens 100 processes the received data during time Tbusy. The camera second communication unit 209 is configured to not transmit data until the clock line LCLK changes Low to Hi after data transmission. Flow control in the second communication can be performed by such a signal control. The foregoing processing can be repeated to transmit data between the camera second communication unit 209 and the lens second communication unit 132 by the second communication.

<Initial Communication and Data Communication by Third Communication Method (FIG. 24)>

Next, a procedure where the camera microcomputer 205 obtains identification information about the intermediate adaptor 300 and the interchangeable lens 100 by initial communication, and receives data from the accessory apparatuses (hereinafter, also referred to as accessories) by the third communication method of the first communication will be described with reference to FIG. 24. By the initial communication, the camera microcomputer 205 obtains information to be used for subsequent communication, such as authentication information to be described below, from the accessories attached to the camera main body 200, such as the interchangeable lens 100 and the intermediate adaptor 300. In the present exemplary embodiment, before communication using the third communication method of the first communication, the camera microcomputer 205 obtains information indicating whether the accessories support the third communication method as authentication information, and makes settings for the third communication method. The camera microcomputer 205 then receives data from the accessories by using the third communication method. Such a procedure will be described with reference to FIG. 24. The procedure illustrated in FIG. 24 is performed upon power-on with the intermediate adaptor 300 and the interchangeable lens 100 attached.

In step S2401, the camera main body 200 is activated. The processing proceeds to step S2402.

In step S2402, the camera main body 200 supplies power to the interchangeable lens 100 and the intermediate adaptor 300 via not-illustrated power supply mount contacts. The processing proceeds to steps S2403 and S2404.

In step S2403, the camera microcomputer 205 obtains authentication information from the lens microcomputer 111 by the second communication. The authentication information includes interchangeable lens identification information. The interchangeable lens identification information may be information such as a model number (ID) used to identify the type (model) of the interchangeable lens 100, or optical data identification information indicating optical data specific to the interchangeable lens 100. The interchangeable lens identification information may also include information indicating a function or functions of the interchangeable lens 100, and/or information indicating a production number (serial number) that can identify the individual lens among lenses of the same model.

The procedure of step (subprocess) S2403 for obtaining the authentication information about the interchangeable lens 100 by the second communication will be described below with reference to FIG. 25. In step S2404, the camera microcomputer 205 performs initial communication with the accessories by the first communication, and obtains authentication information about the accessories.

The authentication information about the accessories includes identification information about the accessories.

For example, the intermediate adaptor authentication information includes intermediate adaptor identification information as accessory identification information, if the authentication information about an accessory is intermediate adaptor authentication information.

The intermediate adaptor identification information may be information such as a model number (ID) used to identify the type (model) of the intermediate adaptor 300, or optical data identification information indicating optical data specific to the intermediate adaptor 300. The intermediate adaptor identification information may also include information indicating a function or functions of the intermediate adaptor 300, and/or information such as a production number (serial number) that can identify the individual adaptor among adaptors of the same model.

Since the identification information about the interchangeable lens 100 is obtained by the second communication, the identification information about the interchangeable lens 100 to be transmitted in the first communication may be a value not redundant with the identification information about the intermediate adaptor 300 (e.g., a value indicating that the accessory is an interchangeable lens). The reason why a value not redundant with the identification information about the intermediate adaptor 300 is transmitted is that the identification information is used to make a notification of the communication target of the first communication.

The procedure of step (subprocess) S2404 for obtaining the intermediate adaptor authentication information and the authentication information about the interchangeable lens by the first communication will be described below with reference to FIG. 26. Steps S2403 and S2404 use respective different communication paths, and can thus be performed in parallel or in succession.

After the acquisition of the authentication information about the interchangeable lens 100 and the authentication information about the attached accessories in steps S2403 and S2404, the processing proceeds to step S2405.

In step S2405, the camera microcomputer 205 obtains third communication method support information from the accessories by using the identification information about the respective accessories, obtained in step S2404. The third communication method support information is information indicating whether each accessory supports the third communication method. If the third communication method support information indicates that the third communication method is supported, the camera microcomputer 205 makes settings for the third communication method. The procedure of step (subprocess) S2405 for obtaining the third communication method support information about each accessory and making settings for the third communication method by the first communication will be described below with reference to FIG. 27.

After the completion of the settings for the third communication method, the processing proceeds to step S2406. In step S2406, if there is any accessory supporting the third communication method (YES in step S2406), the processing proceeds to step S2407. In step S2407, the camera microcomputer 205 receives data from the accessory or accessories by using the third communication method. The third communication method may be implemented by slave-initiated P2P burst communication described with reference to FIG. 11 where flow control is performed using the signal line CS, or slave-initiated P2P burst communication described with reference to FIG. 18 where flow control is performed using the signal line DATA. If no flow control is needed because of the use of first communication-dedicated microcomputers or direct memory access (DMA), a block control time can simply be set. If the camera first communication unit 208 has a sufficiently large reception buffer, block control is not needed, either.

If there is no accessory supporting the third communication method (NO in step S2406), the processing proceeds to step S2408.

In step S2407, the camera microcomputer 205 performs data reception by the third communication method. Here, the camera microcomputer 205 receives data from the accessory or accessories by the third communication method based on the settings made in step S2405. After the completion of the data reception by the third communication method in step S2407, the processing proceeds to step S2408. In step S2408, the camera microcomputer 205 ends the data reception from the accessory apparatus(es).

After the data acquisition by the third communication method, the second communication is used for communication for the camera main body 200 to control the interchangeable lens 100, and the first communication is mainly used for communication for the camera main body 200 to regularly obtain operation information about the intermediate adaptor 300. Communication for regularly obtaining operation information about the operation member (operation ring) 130 of the interchangeable lens 100 may use either of the first and second communications in consideration of the occupancy rates of the respective communication paths as well as communication and control responsivity.

<Processing for Obtaining Authentication Information by Second Communication Between Camera Main Body and Interchangeable Lens (FIG. 25)>

Figure 25:
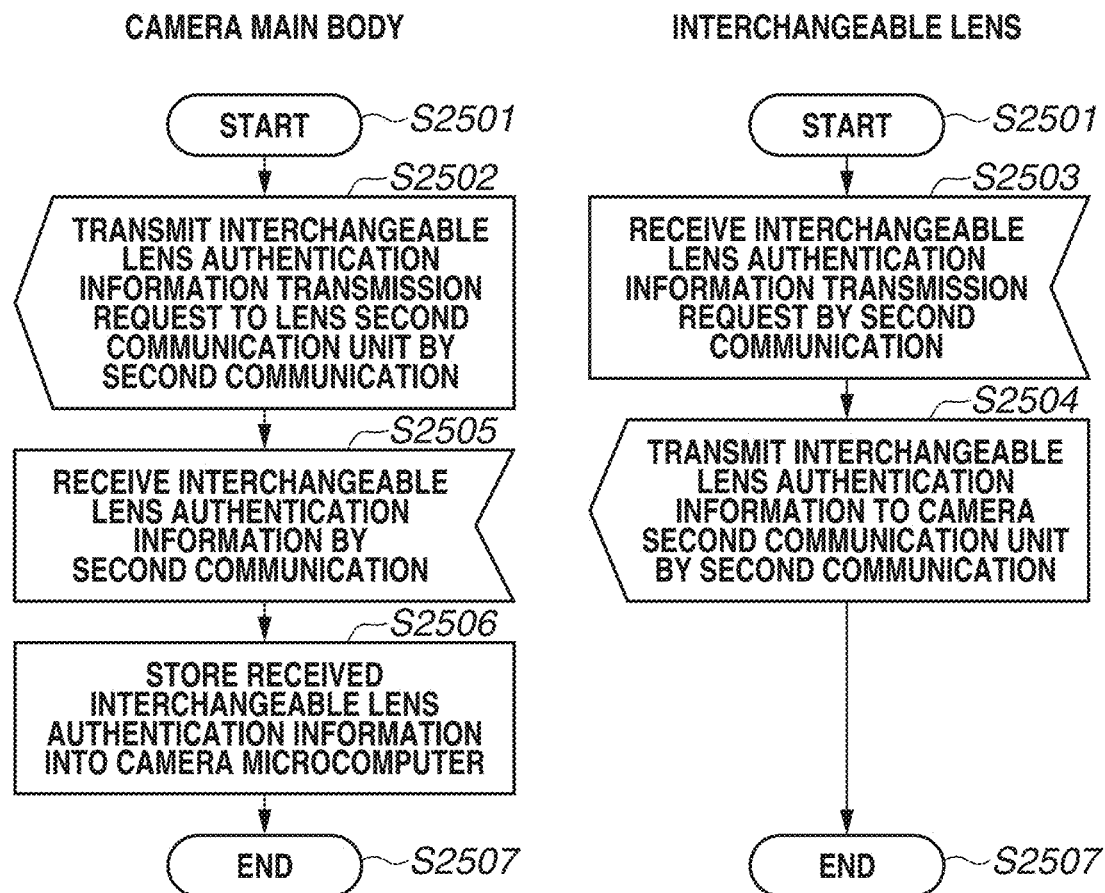
FIG. 25 is a flowchart illustrating a procedure of initial communication processing by second communication between a camera main body and an interchangeable lens.

FIG. 25 illustrates the procedure of subprocess S2403 that is initial communication processing the camera main body 200 performs with the interchangeable lens 100 in the camera system according to the third exemplary embodiment. In subprocess S2403, the camera microcomputer 205 obtains the authentication information about the interchangeable lens 100 from the lens microcomputer 111.

In step S2501, subprocess S2403 starts. The processing proceeds to step S2502.

In step S2502, the camera second communication unit 209 transmits an interchangeable lens authentication information transmission request to the lens second communication unit 132 by the second communication.

In step S2503, the lens second communication unit 132 receives the interchangeable lens authentication information transmission request. The processing proceeds to step S2504. In step S2504, the lens second communication unit 132 transmits the interchangeable lens authentication information to the camera second communication unit 209 by the second communication.

In step S2505, the camera second communication unit 209 receives the interchangeable lens authentication information. The processing proceeds to step S2506. In step S2506, the camera second communication unit 209 stores the received interchangeable authentication information into the camera microcomputer 205.

In step S2504, subprocess S2403 ends.

<Processing for Obtaining Authentication Information by First Communication Between Camera Main Body and Accessories (FIG. 26)>

Figure 26:
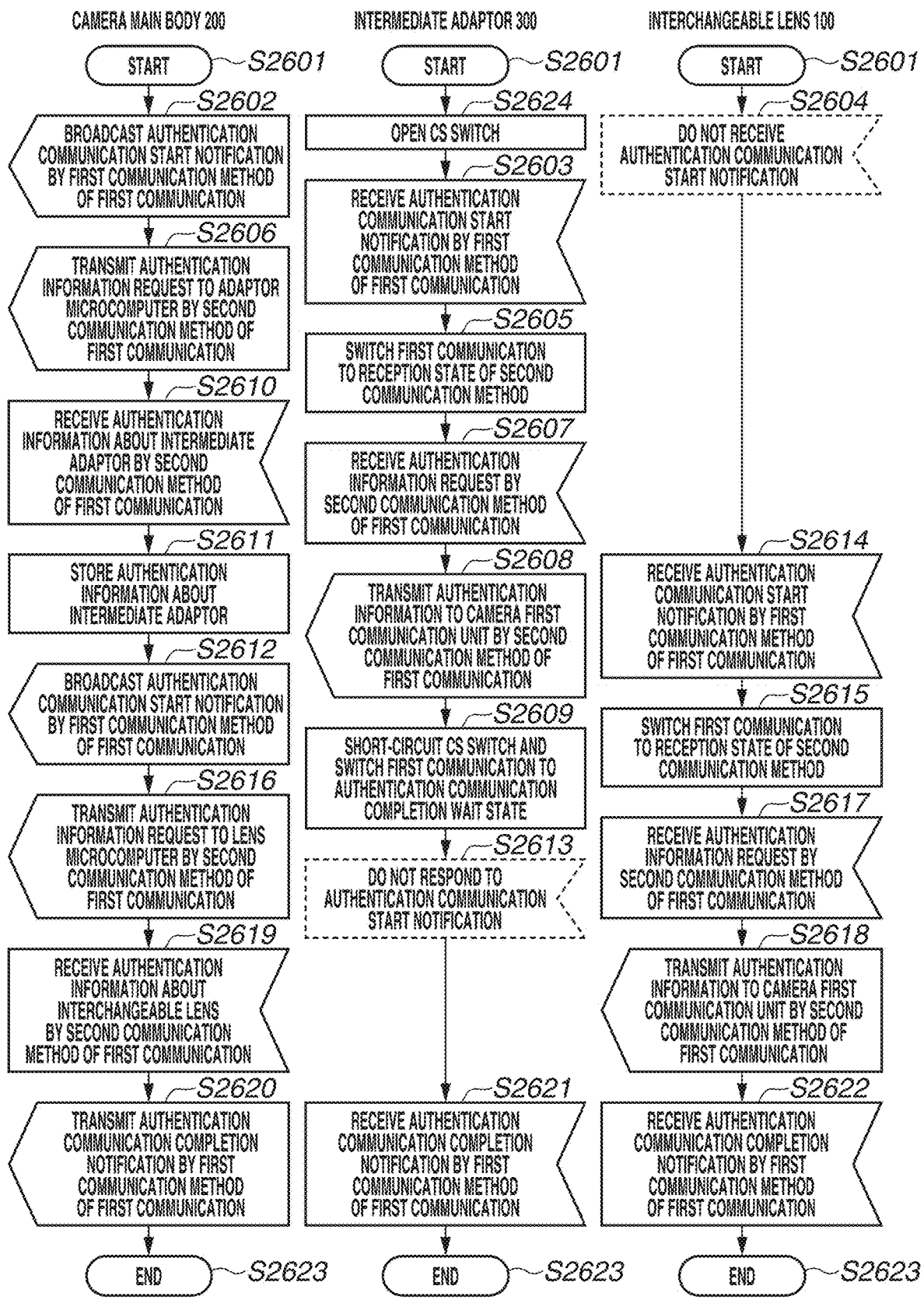
FIG. 26 is a flowchart illustrating a procedure of initial communication processing by first communication between the camera main body and the accessory apparatuses.

FIG. 26 is a diagram for describing the procedure of subprocess S2404 that is initial communication processing performed between the camera main body 200 and the accessories in the camera system according to the third exemplary embodiment. In subprocess S2404, the camera microcomputer 205 obtains authentication information about the accessories.

In step S2602, the camera microcomputer 205 broadcasts an authentication communication start notification by the first communication method of the first communication.

In step S2603, the adaptor microcomputer 302 receives the authentication communication start notification by the first communication method. The processing proceeds to step S2605. In step S2605, the adaptor microcomputer 302 switches the first communication to a reception state of the second communication method.

In the first communication, the camera main body 200 can communicate with one or more accessories. In such a one-to-many communication, the transmission destination can be specified, for example, by adding the identification information about the accessory to communicate with to the beginning of the communication data. However, the camera microcomputer 205 does not have authentication information about the accessories at the stage of step S2602, and thus is unable to specify the transmission target using the communication data.

Examples of means for the camera main body 200 to communicate with a plurality of accessories by turns in this subprocess include a method using the CS switch 3033 located on the CS line of the intermediate adaptor 300 illustrated in FIG. 2 in a manner described below. Suppose that the CS switch 3033 is short-circuited in a steady state.

In step S2601, the camera microcomputer 205 transmits a subprocess start information by the first communication. Since the CS switch 3033 is short-circuited, the accessories receive the subprocess start information. After receiving the subprocess start information, in step S2624, the adaptor microcomputer 302 opens the CS switch 3033. In such a state, only the adaptor communication unit 303 is connected to the camera first communication unit 208 and can receive data transmitted from the camera first communication unit 208. The adaptor microcomputer 302 finishes processing corresponding to the received data and short-circuits the CS switch 3033. This enables the lens first communication unit 112 to receive data transmitted from the camera first communication unit 208. With the CS switch 3033 short-circuited, the adaptor microcomputer 302 does not respond to information transmitted from the camera first communication unit 208 until an authentication communication completion notification transmitted from the camera microcomputer 205 in step S2621 is received at the end of this subprocess.

In such a manner, the camera microcomputer 205 can communicate with a plurality of accessories by turns.

In step S2604, since the CS switch 3033 is open, the lens microcomputer 111 does not receive the authentication communication start notification transmitted from the camera first communication unit 208 in step S2602.

After the transmission of the authentication communication start notification by adaptor microcomputer 302 in step S2602, the processing proceeds to step S2606. In step S2606, the camera microcomputer 205 switches the first communication to a transmission state of the second communication method, and transmits an authentication information request to the adaptor microcomputer 302. After the transmission, the camera microcomputer 205 switches the first communication to the reception state of the second communication method.

The authentication information request according to the present exemplary embodiment is a communication requesting to transmit authentication information including at least the identification information about the accessory and termination information to the camera microcomputer 205.

In step S2607, the adaptor communication unit 303 receives the authentication information request by the second communication method. The processing proceeds to step S2608.

In step S2608, the adaptor microcomputer 302 transmits the authentication information about the adaptor microcomputer 302 to the camera first communication unit 208 by the second communication method of the first communication.

Here, the authentication information that the intermediate adaptor 300 transmits to the camera microcomputer 205 includes at least the identification information about the accessory and the termination information.

In the present exemplary embodiment, the termination information is information indicating whether the accessory is the termination of the first communication as seen from the camera microcomputer 205. If the intermediate adaptor 300 is the termination of the first communication as seen from the camera microcomputer 205, the termination information indicates "being a termination". If the intermediate adaptor 300 is not the termination of the first communication as seen from the camera microcomputer 205, the termination information indicates "not being a termination".

After the transmission of the authentication information to the camera first communication unit 208 in step S2608, the processing proceeds to step S2609. In step S2609, the adaptor microcomputer 302 short-circuits the CS switch 3033. This enables the lens first communication unit 112 to receive data transmitted from the camera first communication unit 208. Since the transmission and reception of data to be exchanged by the initial communication is completed by step S2609, the adaptor microcomputer 302 switches the first communication to an authentication communication completion wait state. The adaptor microcomputer 302 then does not respond to the first communication until the authentication communication completion notification is received by the first communication method of the first communication in step S2621.

In step S2610, the camera microcomputer 205 receives the authentication information about the intermediate adaptor 300. The processing proceeds to step S2611. In step S2611, the camera microcomputer 205 stores the received authentication information.

After the acquisition of the authentication information about the intermediate adaptor 300 in the foregoing steps S2602 to S2611, the processing proceeds to step S2612. In steps S2612 and S2614 to S2619, the microcomputer 205 obtains authentication information about the interchangeable lens 100 in a similar manner to that in steps S2602, S2603, and S2605 to S2611.

In step S2613, the adaptor microcomputer 302 receives the authentication communication notification transmitted from the camera microcomputer 205 but makes no response since the authentication communication completion notification has not been received.

While the third exemplary embodiment deals with an example where a total of two accessories, namely, an interchangeable lens and an intermediate adaptor are connected, two or more intermediate adaptors may be connected. Since any number of intermediate adaptors can be attached, accessory termination information is desirably obtained in the processing for obtaining accessory information.

Methods for obtaining accessory termination information will now be described. For example, as in the present exemplary embodiment, the lens second communication unit 132 may return termination information notifying of being an interchangeable lens when the authentication information request is transmitted from the camera microcomputer 205. The termination accessory may detect that the own apparatus is the termination based on the connection state of a not-illustrated terminal, and notify the camera microcomputer 205 thereof. The present exemplary embodiment deals with the case where the termination information is notified by the lens microcomputer 111 returning the authentication information including the termination information in response to the authentication information request from the camera microcomputer 205.

In step S2616, the camera microcomputer 205 transmits an authentication information request by the second communication method of the first communication as in step S2606.

In step S2619, the camera microcomputer 205 receives the authentication information about the interchangeable lens 100. Since the authentication information includes the interchangeable lens identification information and the termination information, the current communication target is found to be an interchangeable lens and the termination accessory of the first communication. If the interchangeable lens identification information is to be stored, the camera microcomputer 205 stores the interchangeable lens identification information as in step S2611.

After the end of the authentication communication with the termination accessory, the processing proceeds to step S2620. In step S2620, the camera microcomputer 205 transmits the authentication communication completion notification by the first communication method of the first communication. In step S2621, the adaptor microcomputer 302 receives the authentication communication completion notification by the first communication method of the first communication, and enters the steady state. In step S2622, the lens microcomputer 111 receives the authentication communication completion notification by the first communication method of the first communication, and enters the steady state. In the steady state, the adaptor microcomputer 302 and the lens microcomputer 111 switch the first communication to the reception state of the second communication method upon receiving their own identification information from the camera microcomputer 205 by the first communication method of the first communication.

The processing for obtaining the authentication information by the first communication between the camera main body 200 and the accessories is thus completed, and the processing proceeds to step S2623. Subprocess S2404 thereby ends.

In the present exemplary embodiment, processing using the means for communicating with a plurality of accessories by turns using a second communication connection switch (CS switch) has been described. However, other means capable of communicating with a plurality of accessories can be used. For example, what number an accessory is in the order of attachment from the camera main body 200 can be found out by the accessory detecting the voltage level of a not-illustrated terminal connected thereto. In such a case, the accessory counts the number of information transmission requests transmitted from the camera main body 200, and transmits information to the camera main body 200 only when the number matches its own order of attachment.

<Subprocess for Obtaining Third Communication Method Support Information and Making Settings (FIG. 27)>

Figure 27:
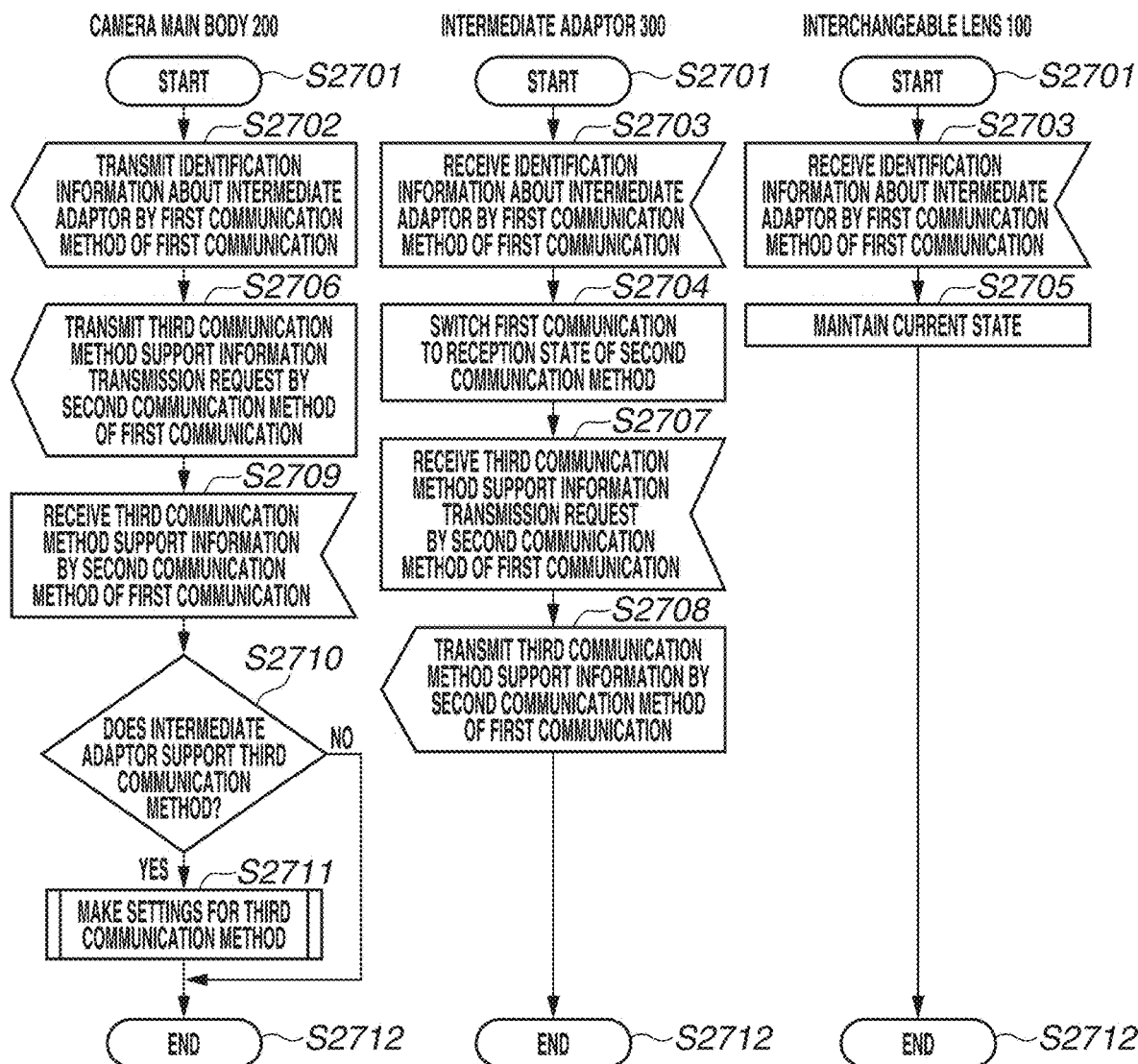
FIG. 27 is a flowchart illustrating a procedure for obtaining third communication method support information and making settings for the third communication method.

The procedure of subprocess S2405 where the camera main body 200 makes communication settings for the third communication method of an accessory supporting the third communication method of the first communication through communication in the third exemplary embodiment will be described with reference to FIG. 27.

In this subprocess, the intermediate adaptor 300 supports the third communication method. Incidentally, to obtain third communication method support information about the interchangeable lens 100 and make settings, communication similar to that with the intermediate adaptor 300 can be performed with the interchangeable lens 100 before the end of this subprocess in step S2712.

In step S2701, subprocess S2405 starts. The processing proceeds to step S2702.

In step S2702, the camera microcomputer 205 transmits the identification information about the intermediate adaptor 300 by the first communication method of the first communication. In step S2703, both the adaptor microcomputer 302 and the lens microcomputer 111 receive the identification information about the intermediate adaptor 300 since the first communication method is broadcast communication.

In step S2704, the adaptor microcomputer 302 of the intermediate adaptor 300 receiving its own identification information switches the first communication to the reception state of the second communication method. By contrast, in step S2705, the interchangeable lens 100 receiving information different from its own identification information maintains the current state.

After the transmission of the identification information about the intermediate adaptor 300 in step S2702, the camera microcomputer 205 switches to the second communication method to communicate with the adaptor microcomputer 302 by the second communication method of the first communication.

In step S2706, the camera microcomputer 205 transmits a third communication method support information transmission request by the second communication method of the first communication.

In step S2707, the adaptor microcomputer 302 receives the third communication method support information transmission request. The processing proceeds to step S2708. In step S2708, the adaptor microcomputer 302 transmits the third communication method support information by the second communication method of the first communication.

In step S2709, the camera microcomputer 205 receives the third communication method support information by the second communication method of the first communication. The processing proceeds to step S2710.

In step S2710, the camera microcomputer 205 determines whether the intermediate adaptor 300 supports the third communication method based on the third communication method support information received from the adaptor microcomputer 302 in step S2709. If the intermediate adaptor 300 does not support the third communication method (NO in step S2710), the processing proceeds to step S2712. Subprocess S2405 ends.

If the intermediate adaptor 300 supports the third communication method (YES in step S2710), the processing proceeds to step S2711. In step S2711, the camera microcomputer 205 makes settings for the third communication method. The procedure of step (subprocess) S2711 for making settings for the third communication method will be described below with reference to FIG. 28.

After the settings for the third communication method are made in step S2711, the processing proceeds to step S2712. Subprocess S2405 ends.

<Subprocess for Making Settings for Third Communication Method (FIG. 28)>

Figure 28:
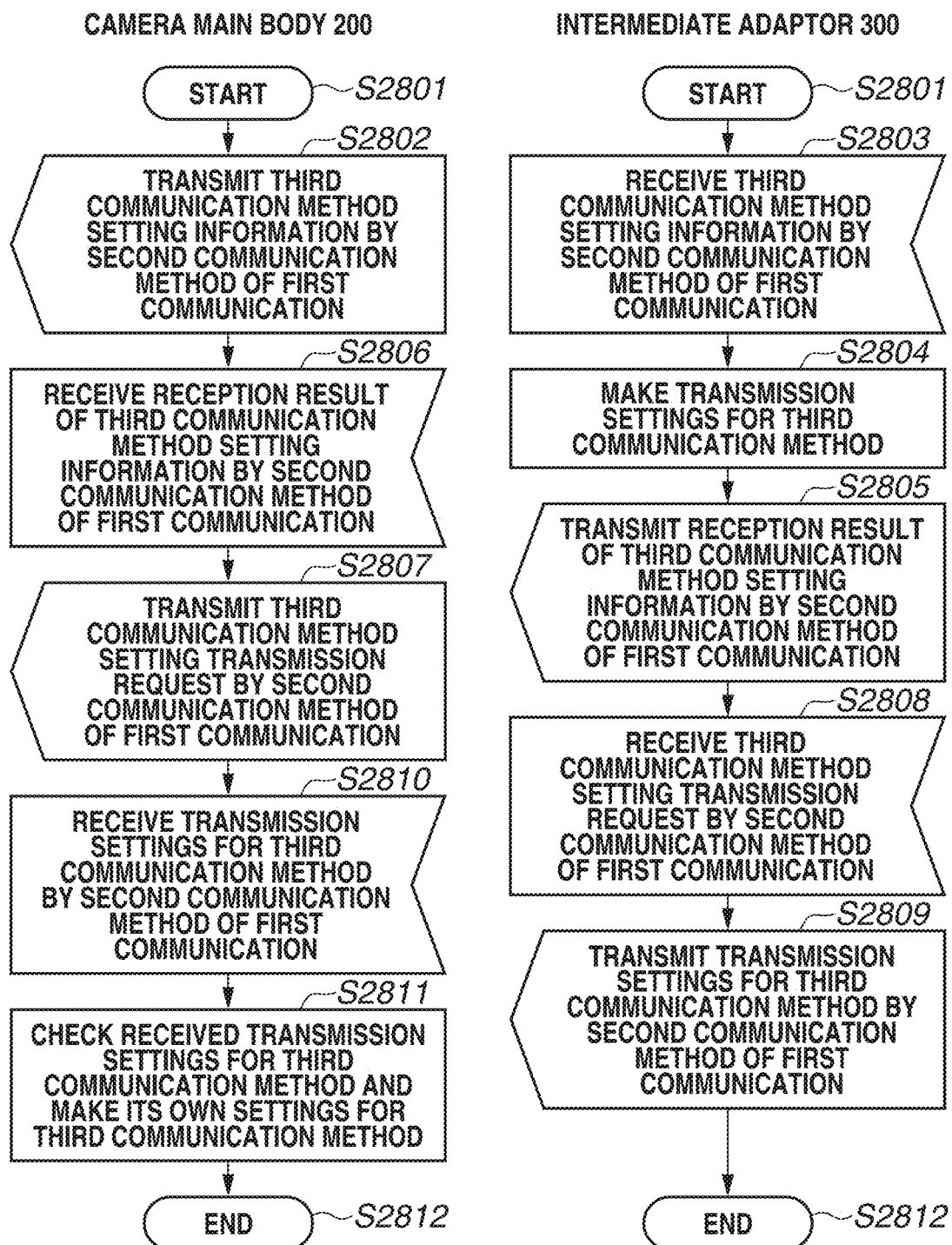
FIG. 28 is a flowchart illustrating a detailed procedure for making the settings for the third communication method.

The procedure of subprocess S2711 where the camera main body 200 makes settings for third communication method of an accessory supporting the third communication method of the first communication through communication in the third exemplary embodiment will be described with reference to FIG. 28.

In this subprocess, the camera main boy 200 makes settings for the intermediate adaptor 300. Suppose that before starting this subprocess, the camera microcomputer 205 specifies the intermediate adaptor 300 as the communication partner of the second communication method by using the first communication method of the first communication. Settings for the interchangeable lens 100 can also be made in a similar manner to in this subprocess.

In step S2801, subprocess S2711 starts. The processing proceeds to step S2802.

In step S2802, the camera microcomputer 205 transmits third communication method setting information by the second communication method of the first communication. In the present exemplary embodiment, the third communication method setting information includes the block size, the interblock wait time, and the number of blocks ahead of flow control included in the foregoing burst communication information. The third communication method setting information may include the identification information about the interchangeable lens 100. Information to be received from the intermediate adaptor 300 can sometimes be linked with the mounted interchangeable lens 100, like optical information obtained by correcting the optical characteristics of the interchangeable lens 100 with an optical member of the intermediate adaptor 300. In such a case, the identification information about the interchangeable lens 100 is desirably transmitted to the intermediate adaptor 300. The identification information about the interchangeable lens 100 to be transmitted here is desirably identification information capable of model identification, obtained by the second communication.

In step S2803, the adaptor microcomputer 302 receives the third communication method setting information. The processing proceeds to step S2804.

In step S2804, the adaptor microcomputer 302 makes transmission settings for the third communication method based on the third communication method setting information received in step S2803. The adaptor microcomputer 302 also makes preparations to transmit, to the camera microcomputer 205, optical information obtained by the adaptor microcomputer 302 correcting the interchangeable lens product based on the identification information about the interchangeable lens 100 received in step S2803.

After the completion of the transmission settings, the processing proceeds to step S2805. In step S2805, the adaptor microcomputer 302 transmits a reception result of the third communication method setting information by the second communication method. Here, the adaptor microcomputer 302 returns not the setting states of the third communication method but information indicating whether the third communication method setting information is normally received in step S2803. With such a configuration, the reception result can be communicated in a similar manner even if the items to be included in the third communication method setting information increase in the future, for example.

In step S2806, the camera microcomputer 205 receives the reception result of the third communication method setting information. If the third communication method setting information is confirmed to be normally received by the adaptor microcomputer 302, the processing proceeds to step S2807. If not, this subprocess is retried from step S2802 again. If the third communication method setting information fails to be normally communicated after several retries, the camera microcomputer 205 resets the power supplied to the accessory apparatus and makes a retry from the acquisition of the authentication information.

In step S2807, the camera microcomputer 205 transmits a third communication method setting transmission request by the second communication method.

In step S2808, the adaptor microcomputer 302 receives the third communication method setting transmission request. The processing proceeds to step S2809. In step S2809, the adaptor microcomputer 302 transmits the transmission settings made for the third communication method in step S2804 by the second communication method. The transmission settings for the third communication method according to the present exemplary embodiment include the number of bytes of the header of the optical information in addition to the block size, the number of blocks ahead of flow control, and the interblock wait time included in the foregoing burst communication information.

The header includes the sizes and storage addresses of respective pieces of data in the entire optical information. Only a desired piece of data can be obtained by specifying the address and size at the beginning of burst communication. The entire optical information can be obtained by specifying the top address as the address and the total number of bytes as the size.

The header may include a simplified conversion table of the optical information. This enables simplified conversion of the optical information about the interchangeable lens 100 by obtaining the header information before obtaining the entire optical information.

In step S2810, the camera microcomputer 205 receives the transmission settings for the third communication method. The processing proceeds to step S2811. In step S2811, the camera microcomputer 205 checks the received transmission settings of the intermediate adaptor 300, and makes its own settings for the third communication method. After the completion of the settings of the came main body 200 for the third communication method in step S2811, the processing proceeds to step S2812. Subprocess S2711 ends.

Effects of Third Exemplary Embodiment

As described above, the reception buffer size of the receiver is defined as the block size. One block of data transfer is followed by a time where no communication is performed as long as the interblock wait time for the receiver to perform data reception processing for burst communication. This enables normal reception even if data is continuously transferred.

Flow control is performed after as many blocks of data transfer as the number of blocks ahead of flow control. This can suspend data transfer from the sender as long as desirable for the receiver, so that processing other than communication can be performed in parallel.

In P2P burst communication, unlike P2P communication, the sender, i.e., either one of the communication master and the communication slave simply outputs an enormous amount of data while only the receiver issues notifications using the signal line CS. This can reduce the communication time compared to that in P2P communication.

Since the signal line CS-based flow control by the receiver of P2P burst communication is notified to both the communication master and the communication slave, the signal line CS is desirably maintained at Low over a certain period of time. The transfer time of the entire P2P burst communication can therefore be reduced by increasing the block size and the number of blocks ahead of flow control as much as possible and reducing the number of times of flow control.

The camera microcomputer 205 can also obtain information linked with the mounted interchangeable lens 100 from the intermediate adaptor 300 by making settings for the third communication method with the identification information about the interchangeable lens 100 obtained by the second communication included.

Next, a processing procedure where the camera main body 200 controls the interchangeable lens 100 and the intermediate adaptor 300 will be described with reference to FIG. 29. Since the configuration of the camera system and the configuration for communication illustrated in FIGS. 1 to 23 also apply to the same in this fourth exemplary embodiment, a description thereof will be omitted. In the present exemplary embodiment, the adaptor microcomputer 302 of the intermediate adaptor 300 includes a not-illustrated adaptor data storage unit. The adaptor data storage unit is a data storage unit for storing a plurality of groups of optical information data corresponding to lens specific information. An example of the adaptor data storage unit is a flash memory. The groups of optical information data corresponding to the lens specific information will be described below.

<Acquisition of Optical Information and Processing for Determining Optical Data>

Figure 29:
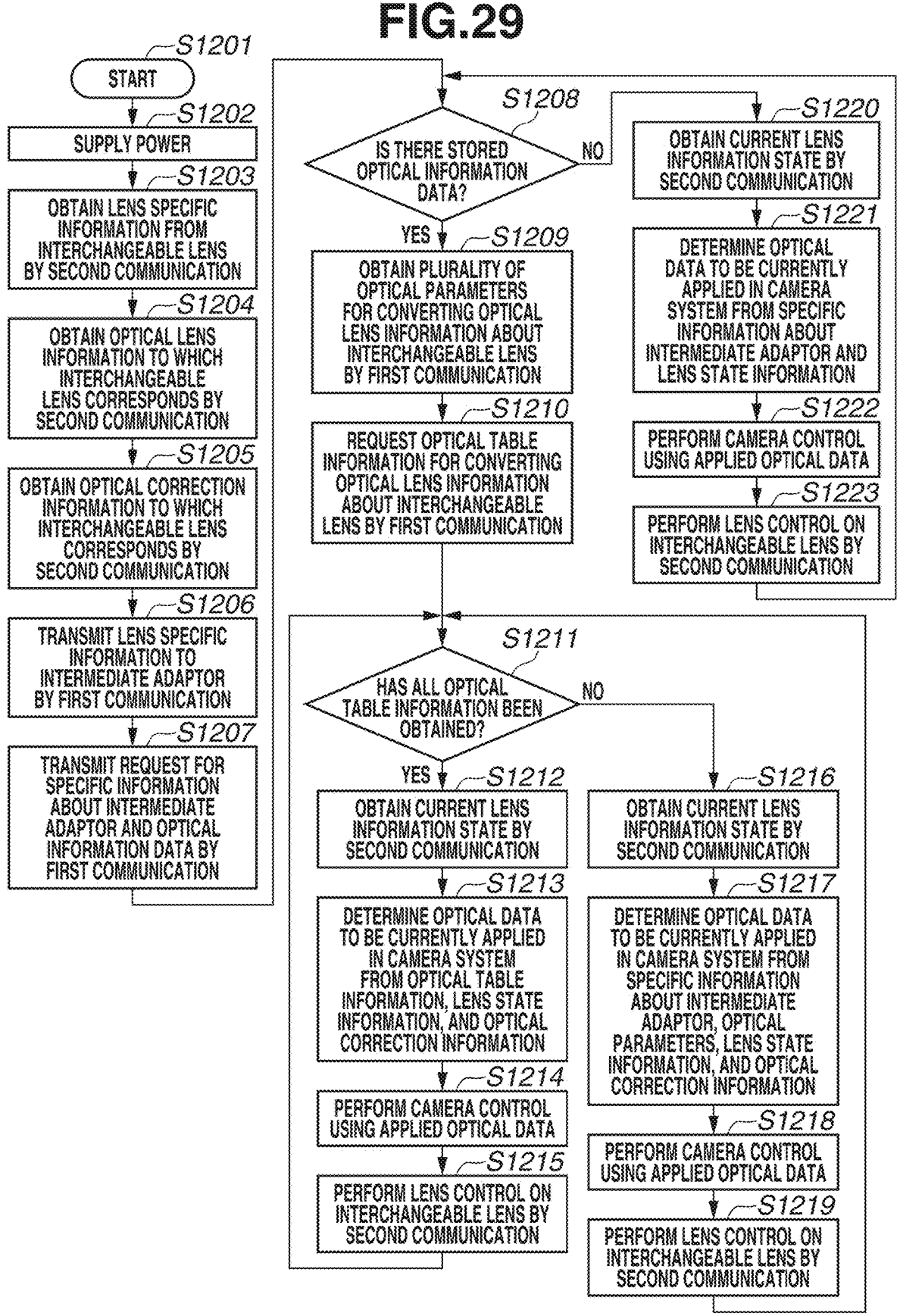
FIG. 29 is a flowchart illustrating processing by an imaging system according to a fourth exemplary embodiment.

FIG. 29 illustrates a procedure of processing where the camera main body 200 controls the interchangeable lens 100 and the intermediate adaptor 300 in the camera system according to the fourth exemplary embodiment.

In step S1201, the camera main body 200 is activated. The processing proceeds to step S1202.

In step S1202, the camera microcomputer 205 supplies power to the interchangeable lens 100 and the intermediate adaptor 300 via not-illustrated power supply contacts displaced on the mount 403. The processing proceeds to step S1203.

In step S1203, the camera microcomputer 205 transmits a request for lens specific information about the interchangeable lens 100, including lens identification information, to the interchangeable lens 100 by the second communication.

The lens microcomputer 111 receives the request for the lens specific information by the second communication, and transmits the lens specific information about the interchangeable lens 100 to the camera main body 200 by the second communication.

The camera microcomputer 205 receives the lens specific information about the interchangeable lens 100 by the second communication. The processing proceeds to step S1204.

In step S1204, the camera microcomputer 205 transmits a request for optical lens information to which the interchangeable lens 100 corresponds, to the interchangeable lens 100 by the second communication.

As employed herein, the optical lens information to which the interchangeable lens 100 corresponds refers to the types of optical lens information that the camera main body 200 can obtain from the interchangeable lens 100 via the second communication. One of the types of optical lens information is lens state information indicating the current state of the interchangeable lens 100. The lens state information is information indicating a state or states obtained from the interchangeable lens 100. Examples of the lens state information include position information about the focus lens 104, the zoom lens 102, and the diaphragm unit 114, and imaging conditions such as the current object distance, focal length, and f-number. Another type of optical lens information is optical correction information about the interchangeable lens 100 itself. Examples of the optical correction information include information for determining a focus correction amount, a magnification chromatic aberration correction amount, a marginal illumination correction amount, and a distortion correction amount. The optical correction information will be described below.

The lens microcomputer 111 receives the request for the corresponding optical lens information by the second communication, and transmits the optical lens information to which the interchangeable lens 100 corresponds, to the camera main body 200 by the second communication.

The camera microcomputer 205 receives the optical lens information to which the interchangeable lens 100 corresponds. The processing proceeds to step S1205.

In step S1205, the camera microcomputer 205 checks for optical correction information to which the interchangeable lens 100 corresponds based on the corresponding optical lens information, and transmits an acquisition request for the corresponding optical correction information to the interchangeable lens 100 by the second communication.

The lens microcomputer 111 receives the acquisition request for the optical correction information by the second communication, and transmits the optical correction information to the camera main body 200 by the second communication.

The camera microcomputer 205 receives the optical correction information. The processing proceeds to step S1206.

In step S1206, the camera microcomputer 205 transmits the lens specific information obtained in step S1203 to the intermediate adaptor 300 by the first communication. The processing proceeds to step S1207.

Here, the intermediate adaptor 300 records the lens specific information received by the first communication.

In step S1207, the camera microcomputer 205 transmits a request for specific information about the intermediate adaptor 300 and optical information data to the intermediate adaptor 300 by the first communication. The processing proceeds to step S1208. Examples of the specific information about the intermediate adaptor 300 include the name, specific number, and function information of the intermediate adaptor 300, adaptor magnification information and other specific information about the magnification lens (hereinafter, referred to as an adaptor optical member) 301, and optical information corresponding to the lens specific information.

The adaptor microcomputer 302 receives the request for the specific information about the intermediate adaptor 300 and optical information data by the first communication. The adaptor microcomputer 302 then checks the presence or absence of optical information data corresponding to the lens specific information received in step S1206 based on the lens specific information in addition to the foregoing specific information about the intermediate adaptor 300. If there is found to be stored optical information data corresponding to the lens specific information, the adaptor microcomputer 302 replies the camera main body 200 by the first communication that there is stored optical information data. In contrast, if there is stored no optical information data corresponding to the lens specific information, the adaptor microcomputer 302 replies the camera main body 200 that there is stored no optical information data. The optical information data is data for taking into account the effect of an optical member on the interchangeable lens 100 if the intermediate adaptor 300 includes the optical member. Examples of the optical information data include optical parameters and optical table information described below.

In step S1208, the camera microcomputer 205 checks the reply, from the intermediate adaptor 300, corresponding to the request for the optical information data issued in step S1207.

If the optical information data is stored in the intermediate adaptor 300 (YES in step S1208), the processing proceeds to step S1209. In step S1209, the camera microcomputer 205 requests a plurality of optical parameters for converting the optical lens information about the interchangeable lens 100 from the adaptor microcomputer 302. Here, the adaptor microcomputer 302 receives the request for the plurality of optical parameters by the first communication, and transmits the plurality of optical parameters for converting the optical lens information about the interchangeable lens 100 to the camera main body 200 by the first communication.

In step S1210, the camera microcomputer 205 requests optical table information for converting the optical lens information about the interchangeable lens 100. Here, the adaptor microcomputer 302 receives the request for the optical table information by the first communication, and transmits the optical table information for converting the optical lens information about the interchangeable lens 100 to the camera main body 200 by the first communication.

The optical table information includes a large amount of data since all the optical lens information about the interchangeable lens 100 is covered. For example, 500 Kbytes of optical table information can take as long as approximately 5 sec to obtain. Waiting for the completion of acquisition of the entire data on the optical table information can thus cause a delay of the activation of the camera system, or display or lens control can be executed by erroneous optical data information even after the activation. From step S1211 on, the camera microcomputer 205 therefore changes optical data to be applied in the camera system depending on whether all the optical table information has been obtained. Optical data is information that the camera main body 200 uses for processing such as AF processing, automatic exposure (AE) processing, and image processing, and the optical data includes parameters related to the characteristics and states of the interchangeable lens 100. Examples of the optical data may include the lens state information and information obtained by correcting the lens state information in consideration of the effect of the optical member of the intermediate adaptor 300.

In step S1211, the camera microcomputer 205 determines whether all the optical table information has been obtained.

If all the optical table information has been obtained (YES in step S1211), the processing proceeds to step S1212. In step S1212, the camera microcomputer 205 transmits an acquisition request for the lens state information to the interchangeable lens 100 by the second communication.

The lens microcomputer 111 receives the acquisition request for the lens state information, and transmits the current lens state information to the camera main body 200.

The camera microcomputer 205 receives the lens state information. The processing proceeds to step S1213.

In step S1213, the camera microcomputer 205 determines optical data to be currently applied in the camera system from the optical table information obtained in step S1210, the lens state information, and the optical correction information. The processing proceeds to step S1214. A method for determining the optical data to be currently applied in the camera system from the optical table information, the lens state information, and the optical correction information will be described below.

In step S1214, the camera microcomputer 205 displays the focal length and the f-number on the display unit 206 in a superimposed manner, and performs AF, AE, and other camera controls based on operations from a camera operation member 207. If driving control on the focus lens 104, the zoom lens 102, the diaphragm unit 114, or the image stabilization lens 103 of the interchangeable lens 100 is intended, then in step S1215, the camera microcomputer 205 transmits a lens driving request to the interchangeable lens 100 by the second communication.

In step S1215, the lens microcomputer 111 receives the lens driving request and determines the optical member to be driven among the focus lens 104, the zoom lens 102, the diaphragm unit 114, and the image stabilization lens 103. The lens microcomputer 111 drives the determined optical member as requested by the camera main body 200.

A lens driving request for the interchangeable lens 100 will be described below.

Steps S1212, S1213, S1214, and S1215 are then repeated to update the optical data to be applied in the camera system as appropriate.

In step S1216, the camera microcomputer 205 transmits an acquisition request for the lens state information to the interchangeable lens 100 by the second communication.

The lens microcomputer 111 receives the acquisition request for the lens state information, and transmits the current lens state information to the camera main body 200.

The camera microcomputer 205 receives the lens state information. The processing proceeds to step S1217.

In step S1217, the camera microcomputer 205 determines the optical data to be currently applied in the camera system from the specific information about the intermediate adaptor 300 obtained in step S1207, the optical parameters obtained in step S1209, the lens state information, and the optical correction information. The processing proceeds to step S1218. A method for determining the optical data to be currently applied in the camera system from the specific information about the intermediate adaptor 300, the plurality of optical parameters, the lens state information, and the optical correction information will be described below.

In step S1218, the camera microcomputer 205 displays the focal length and the f-number on the display unit 206 in a superimposed manner, and performs AF, AE, and other camera controls based on operations from the camera operation member 207. If driving control on the focus lens 104, the zoom lens 102, the diaphragm unit 114, or the image stabilization lens 103 of the interchangeable lens 100 is intended, then in step S1219, the camera microcomputer 205 transmits a lens driving request to the interchangeable lens 100 by the second communication.

In step S1219, the lens microcomputer 111 receives the lens driving request and determines the optical member to be driven among the focus lens 104, the zoom lens 102, the diaphragm unit 114, and the image stabilization lens 103. The lens microcomputer 111 drives the determined optical member as requested by the camera main body 200.

Steps S1216, S1217, S1218, and S1219 are then repeated to update the optical data to be applied in the camera system as appropriate.

The camera system can thus be activated at high speed by converting the optical data to be applied in the camera system in a fixed manner until all the optical table information including a large amount of data is obtained. In addition, processing can be performed without using erroneous optical information for camera display or control after activation, so that the user can perform appropriate camera control.

In step S1208, if there is no optical information data stored (NO in step S1208), the processing proceeds to step S1220. In step S1220, the camera microcomputer 205 transmits an acquisition request for the lens state information to the interchangeable lens 100 by the second communication.

The lens microcomputer 111 receives the acquisition request for the lens state information, and transmits the current lens state information to the camera main body 200.

In step S1221, the camera microcomputer 205 determines the optical data to be currently applied in the camera system from the specific information about the intermediate adaptor 300 and the lens state information. The processing proceeds to step S1222.

In steps S1222 and S1223, processing similar to that of steps S1214 and S1215 or steps S1218 and S1219 is performed.

Steps S1220, S1221, S1222, and S1223 are then repeated to update the optical data to be applied as appropriate.

The optical data thus determined to be applied in the camera system as appropriate is used for camera control. For example, the optical data thus determined is used for the current imaging conditions displayed on the display unit 206. The optical data thus determined is also used in setting the imaging conditions using the camera operation member 207. Moreover, in making a focus correction during AF operation, the focus position is determined based on the optical data thus determined. Magnification chromatic aberration correction, marginal illumination correction, and distortion correction on a video image captured by the camera main body 200 are also performed based on the optical data thus determined.

In the present exemplary embodiment, the lens state information is obtained from the interchangeable lens 100. However, information about an initial position may be obtained from the interchangeable lens 100, and the lens state information may subsequently be determined based on the initial position and driving command values from the camera main body 200.

For example, suppose that the camera main body 200 gives the interchangeable lens 100 a command to drive the diaphragm unit 114 to its initial position. After the driving, the camera main body 200 can calculate what position the diaphragm unit 114 is currently moved to from the initial position based on driving command values from the camera main body 200, and determine the current position of the diaphragm unit 114.

<Configuration of Optical Information Data>

Optical information data that varies from one model of interchangeable lens 100 to another will now be described.

In the present exemplary embodiment, the optical information data includes the optical parameters requested to be obtained in step S1209 and the optical table information requested to be obtained in step S1210.

FIGS. 30A and 30B illustrate structures of a plurality of pieces of optical information data stored in the not-illustrated adaptor data storage unit.

FIG. 30A illustrates optical information data related to optical data linked with interchangeable lenses 100 to be mounted. The exemplary embodiment deals with an example where optical information data related to three types of interchangeable lenses 100 to be mounted, namely, a lens A, a lens B, and a lens C is stored. Such optical information data is referred to as optical table information.

FIG. 30B illustrates conversion coefficients for correcting optical information in a fixed manner when an interchangeable lens 100 is combined with the adaptor optical member 301. The conversion coefficients will be referred to as optical parameters. The optical parameters also include data addresses on the pieces of optical information about the respective interchangeable lenses 100 illustrated in FIG. 30A, whereby the optical table information can be searched easily.

The optical table information includes lens specific information, lens state information, and optical correction information.

The lens specific information includes, for example, identification numbers for uniquely identifying the lenses, assigned for respective lens types.

The lens state information includes, for example, object distance information, sensitivity information, focal length information, and f-number information.

The optical correction information includes, for example, focus correction information, magnification chromatic aberration correction information, marginal illumination correction information, and distortion correction information.

The lens state information and the optical correction information include information for determining the lens states and optical correction values of the optical members in the combinations of the interchangeable lenses 100 and the intermediate adaptor 300.

After receiving the request for optical information data from the camera main body 200, the adaptor microcomputer 302 determines corresponding optical information data based on the lens specific information received from the camera main body 200. The adaptor microcomputer 302 transmits the determined optical information data to the camera main body 200 when an optical table information acquisition request is received.

For example, if the lens specific information is the identification number indicating the lens A, the adaptor microcomputer 302 transmits the corresponding lens state information and optical correction information to the camera main body 200. The lens state information corresponding to the lens A includes object distance information FA, sensitivity information SA, focal length information ZA, and f-number information IA. The optical correction information corresponding to the lens A includes focus correction information PCA, magnification chromatic aberration correction information ACA, marginal illumination correction information SCA, and distortion correction information DCA.

In the present exemplary embodiment, the lens state information is described to include object distance information, sensitivity information, focal length information, and f-number information. However, items other than those of the present exemplary embodiment may be included as long as the items are about imaging conditions to be affected by the optical members of the interchangeable lens 100 and intermediate adaptor 300. Examples of the lens state information include a t-value, a defocus amount, sensitivity, vignetting on the imaging plane at each image height, exit pupil position information, and incident pupil information. Information indicating a relationship between the moving amount of the image stabilization lens 103 and the amount of image shift on the imaging plane may also be included.

<First Method for Determining Optical Data>

A method for determining the optical data to be currently applied in the camera system from the optical table information and the lens state information will now be described.

FIG. 31 illustrates a data structure of the optical table information obtained in step S1210 among the pieces of optical information data.

In the present exemplary embodiment, the optical table information has a data structure indexed with a focus position, a zoom position, and an iris position indicating the positions of the focus lens 104, the zoom lens 102, and the diaphragm unit 114, respectively. The optical table information has a table structure of which the optical data to be currently applied is determined from the indices.

The focus lens 104, the zoom lens 102, and the diaphragm unit 114 have L possible positions F1 to FL, M possible positions Z1 to ZM, and N possible positions I1 to IN, respectively.

The positions of the focus lens 104, the zoom lens 102, and the diaphragm unit 114 used here are divided based on positions where optical information changes when the interchangeable lens 100 and the intermediate adaptor 300 are combined. Optical information is thus identified from a plurality of pieces of lens state information. Moreover, high-resolution lens state information is used as the lens state information obtainable from the interchangeable lens 100 so that appropriate control can be performed even with such corrections as optical corrections that sharply affect high-definition image quality.

The camera microcomputer 205 determines an object distance, sensitivity, a focal length, and an f-number from the object distance information F, the sensitivity information S, the focal length information Z, and the f-number information I based on the combination of the positions of the focus lens 104, the zoom lens 102, and the diaphragm unit 114.

For example, if the focus lens 104, the zoom lens 102, and the diaphragm unit 114 are located at positions F1, Z1, and I1, respectively, the object distance is determined to be F111, the sensitivity S111, the focal length Z111, and the f-number I111 in value.

These values may be determined to represent a plurality values each. For example, object distance F000 may represent two values, namely, a closest object distance and an infinity object distance.

The camera microcomputer 205 also determines a focus correction amount and a magnification chromatic aberration amount from the focus correction information PC and the magnification chromatic aberration correction information AC based on the combination of the positions of the focus lens 104, the zoom lens 102, and the diaphragm unit 114.

The camera microcomputer 205 further determines a marginal illumination correction amount and a distortion correction amount from the marginal illumination correction information SC and the distortion correction information DC based on the combination of the positions of the focus lens 104, the zoom lens 102, and the diaphragm unit 114.

For example, if the focus lens 104, the zoom lens 102, and the diaphragm unit 114 are located at positions F1, Z1, and I1, respectively, the focus correction value is determined to be PC111, and the magnification chromatic aberration value AC111. Moreover, the marginal illumination correction amount is determined to be SC111, and the distortion correction amount DC111 in value.

Each correction amount includes a plurality of parameters for a multi-dimensional function for calculating the correction amount with respect to the image height.

In such a manner, the camera microcomputer 205 can determine the optical data to be currently applied in the camera system from the optical table information and the lens state information.

In the present exemplary embodiment, the method for determining the optical data to be currently applied in the camera system based on the positions of the focus lens 104, the zoom lens 102, and the diaphragm unit 114 has been described. However, other pieces of information may be used as the indices of the optical table information as long as the information indicates the state of the interchangeable lens 100. For example, position information about the image stabilization lens 103 may be included. Moreover, the pieces of information indicating the state of the interchangeable lens 100 as indices may be reduced as appropriate. For example, the soptical data to be currently applied in the camera system may be determined based only on the position of the diaphragm unit 114. Furthermore, the optical table information may have a table structure in which the number of indices varies from one item to another. For example, the object distance may be determined by L focus positions, and the sensitivity by M focus positions.

In the present exemplary embodiment, the optical table information is described to have a table structure indexed with the lens state information. However, the optical data to be currently applied in the camera system may be uniquely determined from the lens state information by using calculation formulas.

<Second Method for Determining Optical Data>

A method for determining the optical data to be currently applied in the camera system from the specific information about the intermediate adaptor 300, the plurality of optical parameters, and the lens state information will now be described.

As illustrated in FIG. 30B, the plurality of optical parameters includes, for example, an f-number conversion correction value indicating a change in the f-number due to the adaptor optical member 301. The plurality of optical parameters further includes a focus driving conversion coefficient value and a focus speed conversion coefficient value for converting focus driving and focus speed specifications, respectively.

For example, in determining a focal length, the focal length included in the lens state information obtained from the interchangeable lens 100 is multiplied by a magnifying or reducing power value of the adaptor optical member 301 as the specific information about the intermediate adaptor 300 obtained in step S1207 of FIG. 29. The focal length that is optical data to be currently applied in the camera system can thus be determined.

In determining an f-number, the f-number included in the lens state information obtained from the interchangeable lens 100 is changed as much as the f-number conversion correction value indicating a change in the number of steps of the F-number due to the adaptor optical member 301. The f-number that is optical data to be currently applied in the camera system can thus be determined.

The focus driving conversion coefficient value is a coefficient value for converting the focus sensitivity. The sensitivity that is optical data to be currently applied in the camera system can be determined by multiplying the sensitivity included in the lens state information obtained from the interchangeable lens 100 by the focus driving conversion coefficient value indicating a change in sensitivity due to the adaptor optical member 301.

The focus speed conversion coefficient value is a coefficient value for converting a not-illustrated focus moving speed on the image sensor 201. For example, if the adaptor optical member 301 has a power of 0.7×, the focus speed conversion coefficient value is the square of the power, i.e., 0.49.

Examples of the information about the focus moving speed on the imaging plane, obtained from the interchangeable lens 100 include a maximum speed and a minimum speed at which the interchangeable lens 100 can be driven for focusing. The maximum speed and the minimum speed are multiplied by the focus speed conversion coefficient value indicating a change in the focus moving speed due to the adaptor optical member 301. In such a manner, the maximum and minimum speeds of the focus driving speed that are optical data to be currently applied in the camera system can be determined.

As described above, the optical data to be currently applied in the camera system can be determined by arithmetically operating the lens state information obtained from the interchangeable lens 100 based on the specific information about the intermediate adaptor 300 and the plurality of optical parameters.

Note that the plurality of optical parameters used here are used to correct respective specific pieces of lens state information obtainable from the interchangeable lens 100. The correction using the plurality of optical parameters is affected by the resolution of the specific pieces of lens state information obtainable from the interchangeable lens 100, and is thus more erroneous than the conversion of the optical data using the foregoing optical table information.

The optical correction information described with reference to FIG. 30A is described to include the information for determining the lens states and optical correction values of the optical members in the combinations of the interchangeable lenses 100 and the intermediate adaptor 300. However, optical correction information only about the intermediate adaptor 300 may be stored as the optical correction information included in the optical table information, and the optical data to be currently applied in the camera system may be determined from optical correction information about the interchangeable lens 100 itself and the optical correction information only about the intermediate adaptor 300.

<Third Method for Determining Optical Data>

A method for determining the optical data to be currently applied in the camera system from the specific information about the intermediate adaptor 300 and the lens state information in step S1221 will now be described.

The processing using the specific information about the intermediate adaptor 300 is a method for converting a change in the optical information due to the adaptor optical member 301 in a simplified manner if there is stored no optical information data on the mounted interchangeable lens 100.

In such a case, the magnification value of the adaptor optical member 301 is used as the specific information about the intermediate adaptor 300.

For example, if the adaptor optical member 301 has a power of 1.4×, the f-number included in the lens state information obtained from the interchangeable lens 100 is converted into a value one step larger.

The focal length that is optical data to be currently applied in the camera system can be determined by multiplying the focal length included in the lens state information obtained from the interchangeable lens 100 by the magnification value of the adaptor optical member 301.

The focus sensitivity that is optical data to be currently applied in the camera system can be determined by multiplying the focus sensitivity included in the lens state information obtained from the interchangeable lens 100 by the square of the magnification value.

The focus moving speed on the imaging plane that is optical data to be currently applied in the camera system can be determined by multiplying the focus moving speed included in the lens state information obtained from the interchangeable lens 100 by the square of the magnification value.

As described above, the optical data to be currently applied in the camera system can be determined in a simplified manner by calculating the optical parameters from the lens state information obtained from the interchangeable lens 100 using only the magnification value of the adaptor optical member 301.

The reason for the term being in a simplified manner is that the optical information is converted by using only the magnification value that is specific information about the intermediate adaptor 300. The calculations do not have precision higher than or equal to the resolution of the lens state information obtained from the interchangeable lens 100, and are only capable of fixed conversion.

Instead of using the magnification value of the adaptor optical member 301, specific information about the adaptor optical member 301, such as an adaptor name and an adaptor ID, may be used if the magnification value of the adaptor optical member 301 and the conversion value of the f-number can be uniquely determined by such specific information.

<Lens Driving>

A method for performing lens driving on the interchangeable lens 100 in steps S1215, S1219, and S1223 will now be described.

Lens driving requests are desirably given to the interchangeable lens 100 by taking into account the amount of change in the optical information due to the intermediate adaptor 300. A method for performing lens driving where the camera microcomputer 205 makes settings for the interchangeable lens 100 will now be described.

Suppose that the f-number is used as a lens driving parameter. In steps S1215 and S1219, the camera microcomputer 205 calculates the f-number to be set into the interchangeable lens 100 by adding the f-number conversion correction value illustrated in FIG. 30B to the f-number of the combination of the combination of the interchangeable lens 100 and the intermediate adaptor 300. The camera microcomputer 205 thereby transmits a lens driving request to the interchangeable lens 100.

In step S1223, the camera microcomputer 205 calculates the f-number by using the magnification value in the specific information about the intermediate adaptor 300. For example, if the adaptor optical member 301 has a power of 1.4×, the f-number to the light incident from the interchangeable lens 100 has a value one step larger because of the adaptor optical member 301. For example, in setting the f-number to the light incident on the camera main body 200 to f/2.8, the camera microcomputer 205 transmits a lens driving request to set the position of the diaphragm unit 114 of the interchangeable lens 100 to one step smaller, or f/2.0, to the interchangeable lens 100.

Similarly, in setting the focus moving speed on the image sensor 201 into the interchangeable lens 100, the focus moving speed to be set into the interchangeable lens 100 can be set based on the amount of change in the focus moving speed due to the adaptor optical member 301.

In step S1215 and S1219, the camera microcomputer 205 calculates the focus moving speed to be requested of the interchangeable lens 100 by multiplication by the focus speed conversion coefficient value that is an optical parameter. The camera microcomputer 205 thereby transmits a lens driving request to the interchangeable lens 100.

In step S1223, using the magnification value in the specific information about the intermediate adaptor 300, the camera microcomputer 205 divides the focus moving speed of the interchangeable lens 100 by the square of the magnification value of the adaptor optical member 301. The camera microcomputer 205 transmits the result to the interchangeable lens 100.

In such a manner, the camera main body 200 can set proper lens driving requests to the interchangeable lens 100 in the state where the interchangeable lens 100 and the intermediate adaptor 300 are connected to the camera main body 200.

A modification (fifth exemplary embodiment) of the processing related to the camera control in steps S1212 to S1215 according to the fourth exemplary embodiment will be described with reference to the flowchart illustrated in FIG. 32.

Step S1501 starts when the processing of step S1212 in FIG. 29 is executed. The processing proceeds to step S1502. In step S1502, the camera microcomputer 205 transmits an acquisition request for the lens state information to the interchangeable lens 100 by the second communication.

The lens microcomputer 111 receives the acquisition request for the lens state information, and transmits the current lens state information to the camera main body 200.

The camera microcomputer 205 receives the lens state information. The processing proceeds to step S1503.

In step S1503, the camera microcomputer 205 determines whether there is any change in the lens state information obtained in step S1502. If any one of the zoom lens position, the focus lens position, and the f-number has changed (YES in step S1503), the processing proceeds to step S1504. In step S1504, the camera microcomputer 205 determines the optical data to be currently applied in the camera system from the obtained optical table information, the lens state information, and the optical correction information. The processing proceeds to step S1505.

In step S1505, the camera microcomputer 205 displays the focal length and the f-number on the display unit 206 in a superimposed manner, or performs AF, AE, and other camera controls based on operations from the camera operation member 207. If driving control on the focus lens 104, the zoom lens 102, the diaphragm unit 114, or the image stabilization lens 103 of the interchangeable lens 100 is intended, then in step S1506, the camera microcomputer 205 transmits a lens driving request to the interchangeable lens 100 by the second communication.

In step S1506, the lens microcomputer 111 receives the lens driving request, and determines the optical member to be driven among the focus lens 104, the zoom lens 102, the diaphragm unit 114, and the image stabilization lens 103. The lens microcomputer 111 drives the determined optical member as requested by the camera main body 200.

In step S1507, the processing ends. The processing returns to the end of step S1215. Steps S1212, S1501 to S1507, and S1215 are repeated to update the optical data to be applied in the camera system as appropriate.

Steps S1216 to S1219 and steps S1220 to S1223 can similarly be performed to determine the optical data to be applied in the camera system only if any of the zoom lens position, the focus lens position, and the f-number has changed.

In such a manner, the processing load of the camera control can be reduced by making reference only if the optical table information to be referred to has changed.

In steps S1212, S1216, and S1220 of FIG. 29 and step S1502 of FIG. 32, the camera microcomputer 205 requests the current lens state information from the interchangeable lens 100, and the lens microcomputer 111 receives the acquisition request for the lens state information, by the second communication. After the processing for transmitting the current lens state information to the camera main body 200, the lens state information is updated and then the processing proceeds to that for determining the optical data to be currently applied in the camera system.

This can omit useless processing for determining the optical data to be currently applied in the camera system despite the absence of a change in the lens state information.

The present exemplary embodiment is configured such that the lens microcomputer 111 transmits the optical lens information about the interchangeable lens 100 to the camera microcomputer 205 by the second communication when the camera main body 200 is activated. The camera microcomputer 205 then transmits the lens specific information to the intermediate adaptor 300 by the first communication, and the intermediate adaptor 300 receives the lens specific information by the first communication. However, this is not restrictive, and modifications may be made as appropriate.

Some of the data on the optical table information may be configured to obtain by the second communication while steps S1212 to S1215 are repeated.

In such a case, the second communication for obtaining predetermined optical table information is performed in synchronization with timing when the current lens state information is obtained by the first communication.

The reason is that the optical data to be currently applied in the camera system in the latest lens state of the interchangeable lens 100 fails to be reflected due to lack of realtimeness if the acquisition timing by the first communication and that by the second communication are asynchronous with each other.

In step S1209 of FIG. 29, the optical parameters are obtained by using a communication method other than P2P burst communication. In step S1210, the optical table information is obtained by P2P burst information. For example, the optical parameters are obtained by P2P communication. Data not particularly large in size, such as the identification information and the lens state information, is also obtained by P2P communication. Using appropriate communication methods based on the amount of data can accelerate data reception, and the data can be quickly reflected on the processing for determining the optical data to be applied to the current camera control.

In the fourth and fifth exemplary embodiments of the present invention as described above, the camera microcomputer 205 obtains a large amount of optical information about the combination with interchangeable lenses 100 from the intermediate adaptor 300, in a case where the interchangeable lens 100 is combined with the intermediate adaptor 300.

In such a case, the camera microcomputer 205 obtains simplified conversion information on the optical information about the adaptor optical member 301 from the intermediate adaptor 300 before obtaining the large amount of optical information. This enables various types of processing after camera activation even if the large amount of optical information takes long to obtain, for example. This can also prevent the optical information obtained from the interchangeable lens 100 from being displayed on the screen of the camera main body 200 in a superimposed manner even if the optical information has been changed by the optical member of the intermediate adaptor 300, for example. This can also prevent erroneous driving commands from being given to the interchangeable lens 100 due to the optical information obtained from the interchangeable lens 100 even if the optical information has been changed by the optical member of the intermediate adaptor 300, for example. As described above, an imaging system capable of appropriate operations with a less sense of incongruity can be provided.

For example, similar effects can be obtained from data transfer between a sender apparatus and a receiver apparatus having a notification channel through which the receiver notifies the sender of flow control and a data communication channel through which the sender transfers data to the receiver.

Figure 21:
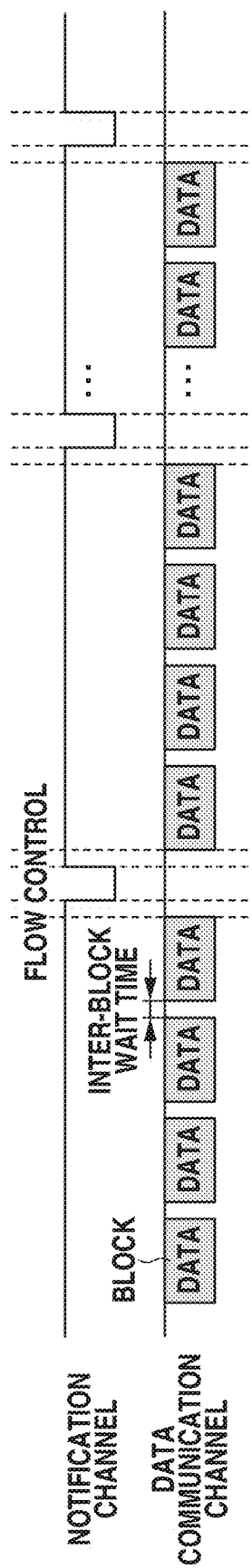
FIG. 21 is a diagram illustrating communication waveforms in a communication method using a notification channel and a data communication channel.

Specifically, as illustrated in FIG. 21, the sender apparatus transmits a block of data and then suspends communication for the interblock wait time. The sender apparatus performs such an operation as many times as the number of blocks ahead of flow control, and waits for flow control by the receiver apparatus. The receiver apparatus receives a block of data and then makes preparations to receive the next block within the interblock wait time. The receiver apparatus performs such an operation as many times as the number of blocks ahead of flow control, performs predetermined processing, and then requests for the next data by flow control. Data can be transferred from the sender to the receiver by repeating such processing.

Similar effects can also be obtained from, for example, data transfer between a sender apparatus and a receiver apparatus where the receiver notifies the sender of flow control and the sender transfers data to the receiver by using the same notification and data channel.

Specifically, as illustrated in FIG. 22, the sender apparatus transmits a block of data and then suspends communication for the interblock wait time. The sender apparatus performs such an operation as many times as the number of blocks ahead of flow control, switches the notification and data channel to input, and waits for flow control from the receiver apparatus. The receiver apparatus receives a block of data and then makes preparations to receive the next block within the interblock wait time. The receiver apparatus performs such an operation as many times as the number of blocks ahead of flow control, and then switches the notification and data channel to output, performs predetermined processing, and requests the next data by flow control. Data can be transferred from the sender to the receiver by repeating such processing.

In the foregoing exemplary embodiments, P2P burst communication is described to be performed between the camera microcomputer 205 of the camera main body 200 and the adaptor microcomputer 302 of the intermediate adaptor 300. Similarly, P2P burst communication may be applied to the communication between the camera microcomputer 205 of the camera main body 200 and the lens microcomputer 111 of the interchangeable lens 100.

The foregoing exemplary embodiments have dealt with the cases where clock synchronous communication is performed by the second communication. Similar effects can be obtained if three-line asynchronous communication implemented using three lines of second communication is employed instead.

Figure 33:
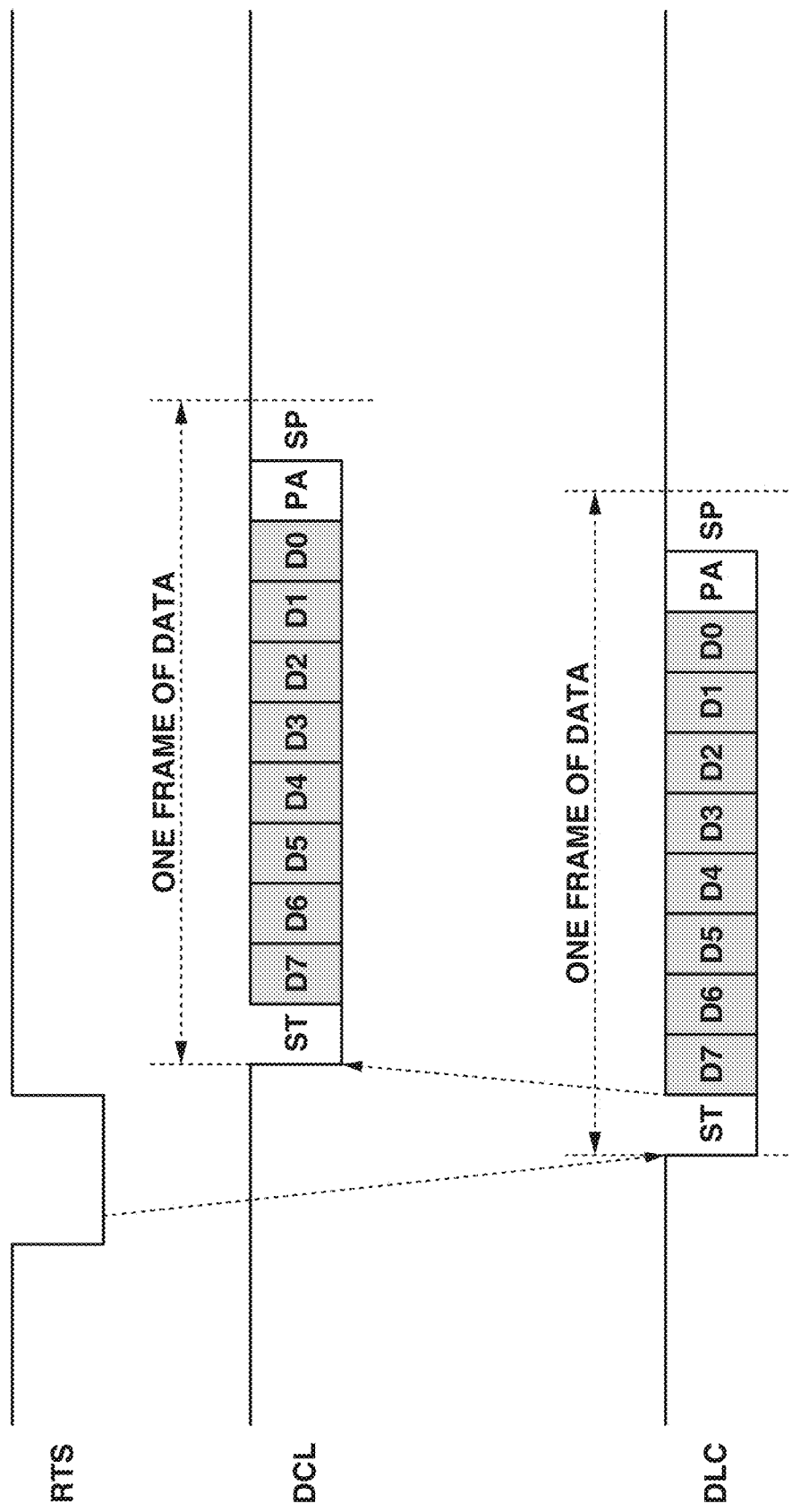
FIG. 33 is a diagram for describing a case where second communication is performed by asynchronous communication.

FIG. 33 illustrating signal waveforms in three-line asynchronous communication. In the case of three-line asynchronous communication, a transmission request line RTS is included instead of the foregoing clock line LCLK. The transmission request line RTS is a signal line for transmitting a signal for controlling the timing of communication through the data line DCL and communication through the data line DLC from the camera microcomputer 205 to the lens microcomputer 111. For example, the camera microcomputer 205 uses the transmission request line RTS to notify the lens microcomputer 111 of a transmission request for lens data and a switching request for communication processing. The notifications using the transmission request channel are issued by switching the signal level of the transmission request channel between Hi and Low.

In the following description, a signal supplied to the transmission request line RTS will be referred to as a transmission request signal RTS. The transmission request signal RTS is transmitted from the camera microcomputer 205 serving as a communication master to the lens microcomputer 111 serving as a communication slave.

As illustrated in FIG. 33, the lens microcomputer 111, after receiving the transmission request signal RTS, sets the signal level of the data line DLC to Low for one bit period to notify the camera microcomputer 205 of a start of transmission of one frame of data via the data line DLC. The one bit period is referred to as a start bit ST indicating a start of one frame. In other words, the transmission of one frame of data starts with the start bit ST. The start bit ST is located as the first bit of each frame of a data line DLC.

The lens microcomputer 111 subsequently transmits one byte of lens data to the camera microcomputer 205 in the following second to ninth, eight bit periods. The data bits are arranged in an MSB first format, starting with MSB data D7, successively followed by data D6, data D5, . . . , with LSB data D0 at the end. The lens microcomputer 111 adds one-bit parity information PA as the tenth bit, and sets the signal level of the data line DLC to Hi in the period of a stop bit SP indicating the end of one frame. The one frame of data starting with the start bit ST is thereby ended.

Meanwhile, the camera microcomputer 205 detects the start bit ST on the data line DLC and starts to transmit one frame of data in response via the data line DCL. The one frame of data has the same format as that of the data line DLC.

As described above, the second communication can implement three-line asynchronous communication instead of clock synchronous communication.

The foregoing exemplary embodiments are merely representative examples, and various changes or modifications can be made to the exemplary embodiments in practicing the present invention.

While the exemplary embodiments of the present invention have been described above, the present invention is not limited to these exemplary embodiments and various changes and modifications can be made without departing from the gist thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-155590, filed Sep. 16, 2020, which is hereby incorporated by reference herein in its entirety.

What is claimed is:

1. An imaging apparatus between an interchangeable lens and the imaging apparatus is detachably attached an accessory apparatus including an optical member, the imaging apparatus comprising:
   at least one processor; and
   at least one memory coupled to the at least one processor and storing instructions that, when executed by the at least one processor, cause the at least one processor to function as:

a control unit configured to communicate with the accessory apparatus by first communication via a first signal line and a second signal line, the first signal line being configured to communicate data via a first terminal, the second signal line being configured to communicate, via a second terminal, a signal for performing flow control on communication via the first terminal, wherein the control unit is configured to perform the first communication in a first communication mode where the signal for performing the flow control is received via the second signal line if one frame of data is received, or a second communication mode where the signal for performing the flow control is transmitted via the second signal line each time a predetermined number of blocks of data is received, and wherein the control unit is configured to transmit identification information about the interchangeable lens in the first communication mode, receive first information for correcting lens state information about the interchangeable lens in the first communication mode, the first information corresponding to the identification information about the interchangeable lens, and receive second information for correcting the lens state information about the interchangeable lens in the second communication mode after reception of the first information.

2. The imaging apparatus according to claim 1, further comprising a display unit configured to display information about the interchangeable lens,
wherein the display unit is configured to display an f-number corrected with the first information or the second information.

3. The imaging apparatus according to claim 2,
wherein the lens state information is information corresponding to an f-number of the interchangeable lens,
wherein the first information is an coefficient for correcting the f-number by taking into account an effect of the optical member on the f-number, and
wherein the second information is a table for correcting the f-number by taking into account the effect of the optical member on the f-number.

4. The imaging apparatus according to claim 2,
wherein aperture control on the interchangeable lens is performed by using the lens state information and the first information before reception of the second information, and
wherein the aperture control on the interchangeable lens is performed by using the lens state information and the second information after the reception of the second information.

5. The imaging apparatus according to claim 2,
wherein the lens state information is information corresponding to a focal length of the interchangeable lens,
wherein the first information is a coefficient for correcting an effect of a magnification of the optical member on the focal length, and
wherein the second information is a table for correcting the effect of the magnification of the optical member on the focal length.

6. The imaging apparatus according to claim 1,
wherein the first information is an optical parameter for correcting the lens state information.

7. The imaging apparatus according to claim 1,
wherein the second information is optical table information for correcting the lens state information.

8. The imaging apparatus according to claim 1,
wherein a data size of the second information is larger than a data size of the first information.

9. An accessory apparatus detachably attached between an imaging apparatus and an interchangeable lens, the accessory apparatus comprising:
an optical member;
at least one processor; and
at least one memory coupled to the at least one processor and storing instructions that, when executed by the at least one processor, cause the at least one processor to function as:
a control unit configured to communicate with the imaging apparatus via a first signal line and a second signal line, the first signal line being configured to communicate data via a first terminal, the second signal line being configured to communicate, via a second terminal, a signal for performing flow control on communication via the first terminal, wherein the control unit is configured to perform first communication in a first communication mode where the signal for performing the flow control is transmitted via the second signal line if one frame of data is transmitted, or a second communication mode where the signal for performing the flow control is received via the second signal line each time a predetermined number of blocks of data is transmitted, and wherein the control unit is configured to receive identification information about the interchangeable lens in the first communication mode, transmit first information for correcting lens state information about the interchangeable lens in the first communication mode based on the identification information about the interchangeable lens, and transmit second information for correcting the lens state information about the interchangeable lens in the second communication mode after transmission of the first information.

10. The accessory apparatus according to claim 9,
wherein the lens state information is information corresponding to an f-number of the interchangeable lens,
wherein the first information is a coefficient for correcting the f-number by taking into account an effect of the optical member on the f-number, and
wherein the second information is a table for correcting the f-number by taking into account the effect of the optical member on the f-number.

11. The accessory apparatus according to claim 6,
wherein aperture control on the interchangeable lens is performed by using the lens state information and the first information before transmission of the second information, and
wherein the aperture control on the interchangeable lens is performed by using the lens state information and the second information after the transmission of the second information.

12. The accessory apparatus according to claim 9,
wherein the lens state information is information corresponding to a focal length of the interchangeable lens,
wherein the first information is a coefficient for correcting an effect of a magnification of the optical member on the focal length, and
wherein the second information is a table for correcting the effect of the magnification of the optical member on the focal length.

13. The accessory apparatus according to claim 9,
wherein the first information is an optical parameter for correcting the lens state information.

14. The accessory apparatus according to claim 9,
wherein the second information is optical table information for correcting the lens state information.

15. The accessory apparatus according to claim 9,
wherein a data size of the second information is larger than a data size of the first information.

16. A method for controlling an imaging apparatus between an interchangeable lens and the imaging apparatus is detachably attached an accessory apparatus including an optical member, the imaging apparatus including a control unit configured to communicate with the accessory apparatus by first communication via a first signal line and a second signal line, the first signal line being configured to communicate data via a first terminal, the second signal line being configured to communicate, via a second terminal, a signal for performing flow control on communication via the first terminal, the first communication being performed in a first communication mode where the signal for performing the flow control is received via the second signal line if one frame of data is received, or a second communication mode where the signal for performing the flow control is transmitted via the second signal line each time a predetermined number of blocks of data is received, the method comprising:

transmitting identification information about the interchangeable lens in the first communication mode;

receiving first information for correcting lens state information about the interchangeable lens in the first communication mode based on the identification information about the interchangeable lens; and receiving second information for correcting the lens state information about the interchangeable lens in the second communication mode after the receiving of the first information.

17. A method for controlling an accessory apparatus detachably attached between an imaging apparatus and an interchangeable lens, the accessory apparatus including an optical member and a control unit configured to communicate with the imaging apparatus via a first signal line and a second signal line, the first signal line being configured to communicate data via a first terminal, the second signal line being configured to communicate, via a second terminal, a signal for performing flow control on communication via the first terminal, first communication being performed in a first communication mode where the signal for performing the flow control is transmitted via the second signal line if one frame of data is transmitted, or a second communication mode where the signal for performing the flow control is received via the second signal line each time a predetermined number of blocks of data is transmitted, the method comprising:

receiving identification information about the interchangeable lens in the first communication mode;

transmitting first information for correcting lens state information about the interchangeable lens in the first communication mode based on the identification information about the interchangeable lens; and transmitting second information for converting the lens state information about the interchangeable lens in the second communication mode after the transmitting of the first information.

* * * * *